United States Patent
Wakazono et al.

(10) Patent No.: US 8,417,064 B2
(45) Date of Patent: Apr. 9, 2013

(54) IMAGE PROCESSING DEVICE AND METHOD, PROGRAM AND RECORDING MEDIUM

(75) Inventors: Masafumi Wakazono, Kanagawa (JP); Naoya Katoh, Chiba (JP); Nobuyuki Matsushita, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/734,878

(22) PCT Filed: Dec. 4, 2008

(86) PCT No.: PCT/JP2008/072009
§ 371 (c)(1),
(2), (4) Date: May 26, 2010

(87) PCT Pub. No.: WO2009/072537
PCT Pub. Date: Jun. 11, 2009

(65) Prior Publication Data
US 2010/0310189 A1 Dec. 9, 2010

(30) Foreign Application Priority Data
Dec. 4, 2007 (JP) ............................... P2007-313711

(51) Int. Cl.
*G06K 9/32* (2006.01)
*G06K 9/40* (2006.01)
*G06K 9/00* (2006.01)

(52) U.S. Cl. ......... 382/298; 382/299; 382/260; 382/167

(58) Field of Classification Search ................. 382/298, 382/299, 260, 167
See application file for complete search history.

(56) References Cited

U.S. PATENT DOCUMENTS

| | | |
|---|---|---|
| 6,437,792 B1 | 8/2002 | Ito et al. |
| 6,724,943 B2 | 4/2004 | Tsuchiya et al. |
| 6,987,544 B2 * | 1/2006 | Ogata et al. .................... 348/678 |
| 7,127,122 B2 * | 10/2006 | Ogata et al. .................... 382/260 |

(Continued)

FOREIGN PATENT DOCUMENTS

| | | |
|---|---|---|
| EP | 1404120 A1 | 3/2004 |
| EP | 1784005 A2 | 5/2007 |

(Continued)

OTHER PUBLICATIONS

F. Durand and J. Dorsey, "Fast Bilateral filtering for the Display of High-Dynamic-Range Images", Proc. SIGGRAPH 02, pp. 257-266, 2002.

(Continued)

*Primary Examiner* — Bhavesh Mehta
*Assistant Examiner* — Utpal Shah
(74) *Attorney, Agent, or Firm* — Lerner, David, Littenberg, Krumholz & Mentlik, LLP

(57) ABSTRACT

The present invention relates to an image processing device and method, program and recording medium for achieving grayscale compression capable of suppressing image quality degradation using a simple configuration. A detection section 63 performs a detection process of a signal Y' that has been subjected to the processes of a luminance signal generating section 61 and perception equalization section 62, thus finding average intensities of lighting in bright and dark areas of an input image. A control MPU 64 finds adaptation gains kAr and kBr based on the average intensities. Processing the signal Y' with an edge-preserving LPF 65 provides a lighting component signal Y'lp. A detail extraction section 66 computes the difference between the signal Y' and lighting component signal Y'lp, thus extracting a detail component signal Y'de of the image of the signal Y'. Thereafter, the lighting component of the signal Y' is subjected to grayscale compression by a tone curve process section 68, while the detail component of the image of the signal Y' is subjected to grayscale compression by a detail adjustment section 67.

10 Claims, 51 Drawing Sheets

U.S. PATENT DOCUMENTS

| | | | |
|---|---|---|---|
| 7,570,390 B2 * | 8/2009 | Mitsunaga | 358/1.9 |
| 7,843,493 B2 * | 11/2010 | Katagiri et al. | 348/222.1 |
| 8,107,123 B2 * | 1/2012 | Ono et al. | 358/1.9 |
| 8,228,397 B2 * | 7/2012 | Katagiri et al. | 348/222.1 |
| 2005/0226526 A1 * | 10/2005 | Mitsunaga | 382/274 |
| 2006/0221214 A1 * | 10/2006 | Yanof et al. | 348/246 |
| 2007/0071355 A1 * | 3/2007 | Imai | 382/266 |
| 2007/0103570 A1 | 5/2007 | Inada et al. | |
| 2007/0127836 A1 * | 6/2007 | Subbotin | 382/260 |

FOREIGN PATENT DOCUMENTS

| | | |
|---|---|---|
| JP | 02-216422 A | 8/1990 |
| JP | 09-331469 A | 12/1997 |
| JP | 2000-278546 A | 10/2000 |
| JP | 2001-298621 A | 10/2001 |
| JP | 2003-008898 A | 1/2003 |
| JP | 2003-008935 A | 1/2003 |
| JP | 2004-221644 A | 8/2004 |
| JP | 2007-128206 A | 5/2007 |

OTHER PUBLICATIONS

J. Kopf, M. Cohen, D. Lischinski and M. Uyttendaele, "Joint Bilateral Upsampling", ACM Transactions on Graphics, vol. 26, No. 3, Article 96, pp. 96-1-96-5, 2007.

Z. Rahman, D.J. Jobson and G.A. Woodell, "Multi-Scale Retinex for Color Image Enhancement", Proceedings of International Conference on Image Processing, 1996.

R. Sobol, "Improving the Retinex Algorithm for Rendering Wide Dynamic Range Photographs," Journal of Electronic Imaging, vol. 13(1), pp. 65-74, 2004.

L. Wang, T. Horiuchi and H. Kotera, "HDR Image Compression Based on Local Adaptation for Scene and Display Using Retinal Model", 14th Color Imaging Conference Final Program and Proceedings, pp. 327-332, 2006.

Supplementary European Search Report EP08857216, dated Nov. 15, 2010.

Ogata M et al: "Dynamic Range Compression Based on Illumination Compensation" IEEE Transactions on Consumer Electronics, IEEE Service Center, New York, NY, US LNKD-DOI: 10.1109/30.964145, vol. 47, No. 3, Aug. 1, 2001, pp. 548-558, XP002368441.

Doo Hyun Choi et al: "Color Image Enhancement Based on Single-Scale Retinex With a JND-Based Nonlinear Filter" Circuits and Systems, 2007. ISCAS 2007. IEEE International Symposium o n, IEEE, PI, May 1, 2007, pp. 3948-3951, XP031182172.

* cited by examiner a  b

FIG.12
 1/16 
FIG.13
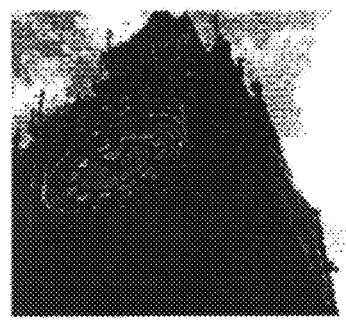
FIG.14
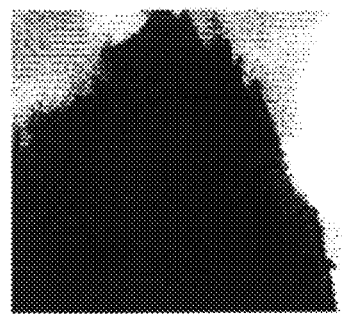

FIG.50
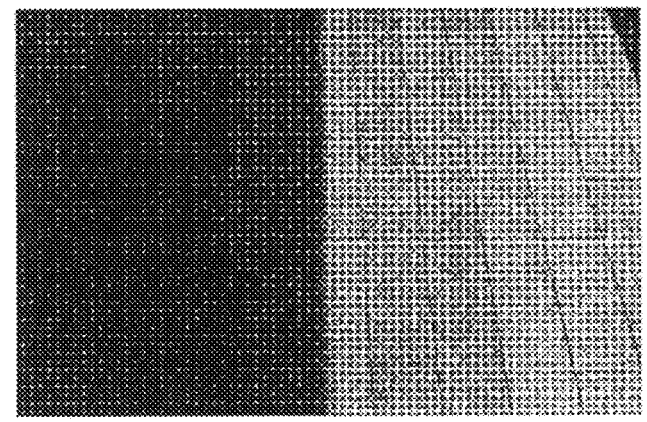
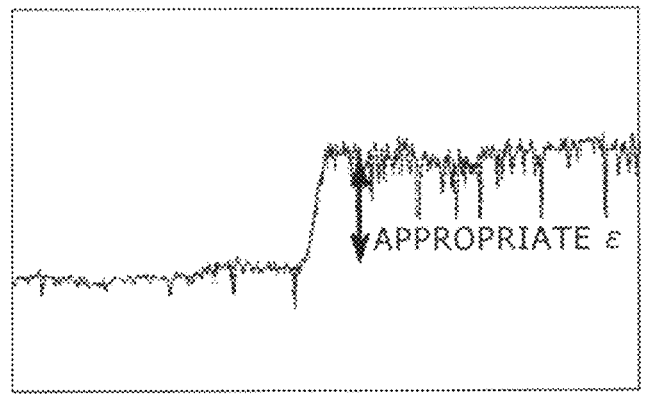
PIXEL VALUE GRAPH FOR ONE
HOLIZONTAL LINE AT THE VERTICAL
CENTER OF THE IMAGE FIG.51
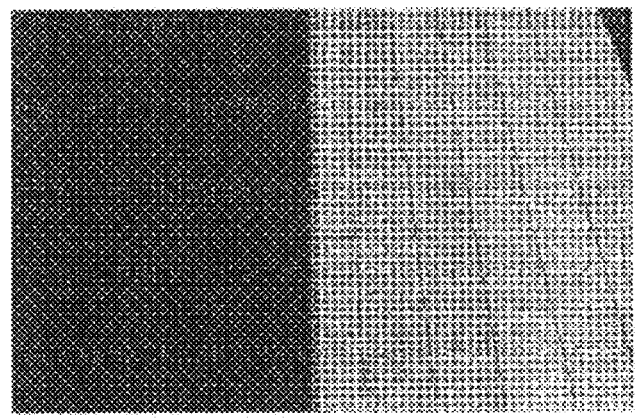
SMALLER DIFFERENCE IN CONTRAST
PIXEL VALUE GRAPH FOR ONE
HOLIZONTAL LINE AT THE VERTICAL
CENTER OF THE IMAGE FIG.52
GREATER DIFFERENCE IN CONTRAST
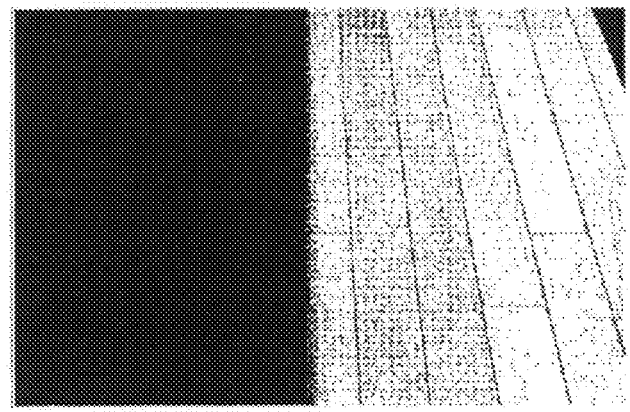
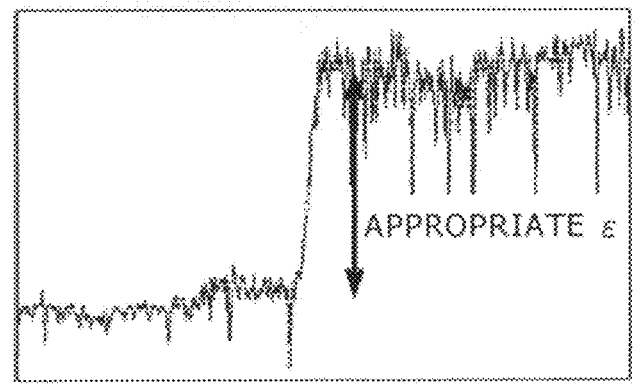
PIXEL VALUE GRAPH FOR ONE
HOLIZONTAL LINE AT THE VERTICAL
CENTER OF THE IMAGE FIG.53
EQUAL DIFFERENCE IN CONTRAST DESPITE
DIFFERENCE IN OVERALL BRIGHTNESS
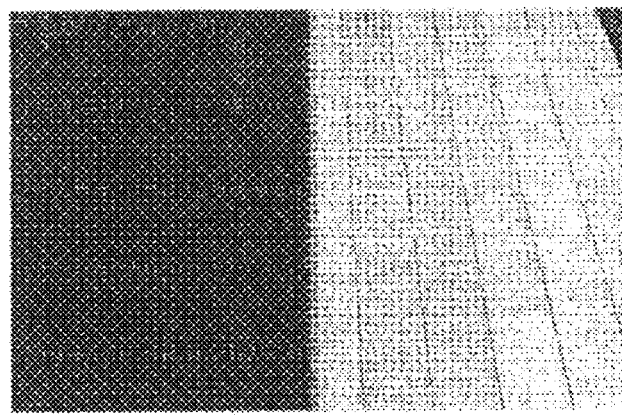
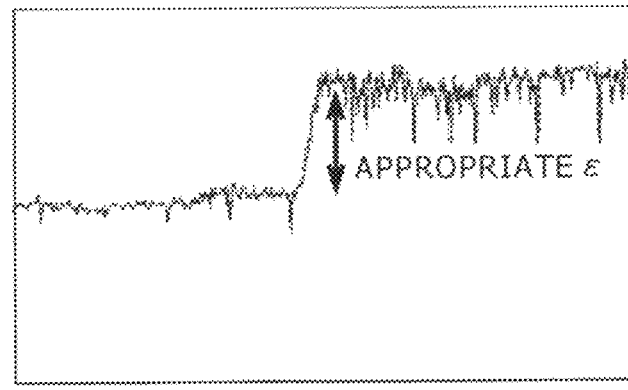
PIXEL VALUE GRAPH FOR ONE
HOLIZONTAL LINE AT THE VERTICAL
CENTER OF THE IMAGE

PIXEL VALUE GRAPH FOR ONE
HOLIZONTAL LINE AT THE VERTICAL
CENTER OF THE IMAGE

PIXEL VALUE GRAPH FOR ONE
HOLIZONTAL LINE AT THE VERTICAL
CENTER OF THE IMAGE

PIXEL VALUE GRAPH FOR ONE
HOLIZONTAL LINE AT THE VERTICAL
CENTER OF THE IMAGE

IMAGE PROCESSING DEVICE AND METHOD, PROGRAM AND RECORDING MEDIUM

CROSS-REFERENCES TO RELATED APPLICATIONS

The present application is a national phase entry under 35 U.S.C. §371 of International Application No. PCT/JP2008/072009 filed Dec. 4, 2008, published on Jun. 11, 2009 as WO 2009/072537 A1, which claims priority from Japanese Patent Application No. JP 2007-313711 filed in the Japanese Patent Office on Dec. 4, 2007.

TECHNICAL FIELD

The present invention relates to an image processing device and method, program and recording medium, and more particularly to an image processing device and method, program and recording medium for achieving grayscale compression capable of suppressing image quality degradation using a simple configuration.

BACKGROUND ART

Conventional cameras using an imaging element such as CCD are likely overexposed or underexposed, for example, during imaging in a backlighted condition because of their narrower dynamic range as compared with cameras using optical films. Overexposure causes a loss of grayscale in the bright area, while underexposure causes a loss of grayscale in the dark area. However, recent advances in solid-state imaging elements (lower noise) and bracket exposure synthesis technique have made it possible to obtain a RAW image signal having luminance grayscale with a wide dynamic range comparable to that of an optical film photograph.

On the other hand, the file formats (e.g., JPEG and MPEG) used to store captured moving and still images and common display devices such as CRTs, LCDs and printers even today have their limitations in luminance grayscale levels that can be expressed. That is, the images that can be expressed by a display device are narrow in dynamic range. Therefore, even if a RAW image signal of an image having luminance grayscale levels with a wide dynamic range comparable to that of an optical film photograph (hereinafter referred to as a wide dynamic range image) is obtained, it is impossible to store or express (e.g., display or print) the image. It should be noted that the RAW image signal is a so-called imager output signal.

As a result, a dynamic range compression technique is required which compresses the luminance grayscale levels of a wide dynamic range image into a narrower dynamic range so as to convert the wide dynamic range image into an image that can be expressed by display devices and other conventional equipment (hereinafter referred to as a narrow dynamic range image).

For example, a technique is available which determines the redistribution of grayscale levels in an adaptable manner based on the luminance histogram of a wide dynamic range image (refer to Patent Document 1). This technique transforms, for example, the grayscale levels of a wide dynamic range image into a histogram, thus redistributing the grayscale levels in accordance with those of a display device or other equipment having a narrower dynamic range and generating a narrow dynamic range image. Further, this technique determines a grayscale conversion curve by which the luminance values near the peak of the histogram are assigned to as many grayscale levels as possible, thus suppressing the decline in essential subject contrast. An approach designed to determine the output luminance in response to the input image luminance in an across-the-board manner as with this technique is called a global grayscale compression technique.

However, a global grayscale compression technique leads to a small luminance change at a luminance level at which the derivative of the grayscale conversion curve is small (luminance level at which the grayscale range is reduced), resulting in a poor-looking image devoid of small amplitude contrast and three-dimensional appearance of the subject (these will be hereinafter collectively referred to as a sense of texture or detail).

As a result, a local grayscale compression technique is available as a grayscale compression technique which solves the problem of poor appearance accompanied by a global grayscale compression technique. This technique narrows the dynamic range by compressing only the grayscale levels for the lighting component based on the knowledge that an image with a large dynamic range commonly occurs due to high contrast lighting rather than the contrast of the subject itself. This technique does not determine the output luminance in response to the input image luminance in an across-the-board manner, but instead the relationship between the input luminance and output luminance changes from one pixel to another. This is the reason why the technique is called a local grayscale compression technique, compared to a global grayscale compression technique.

Among techniques using a local grayscale compression technique is that adapted to compensate for the components other than the lighting component after temporarily performing grayscale compression of an image by means of a global grayscale compression technique (refer, for example, to Patent Document 2). In addition to the above, another technique is disclosed, for example, in document: Z. Rahman, D. J. Jobson and G. A. Woodell, "Multi-Scale Retinex for Color Image Enhancement", Proc. of International Conference on Image Processing 1996, 1996, pp. 19P9." This technique separates a wide dynamic range image into a plurality of frequency component images, subjects these images to amplitude modulations different from each other and adds up and combines the images into a single image.

These techniques divide an image into frequency bands using low-pass filters and treat the low-frequency image components as lighting components based on the characteristic that the common lighting distribution is gently sloping in areas other than the edges.

Patent Document 1: Japanese Patent Laid-Open No. Hei 9-331469

Patent Document 2: Japanese Patent Laid-Open No. 2004-221644

DISCLOSURE OF INVENTION

Technical Problem

However, simple division of an image into frequency bands using low-pass filters alone may lead to a low separation accuracy at the lighting component edges, causing grayscale inversion along the outline of the subject and resulting in degraded image quality. Because this inversion resembles a halo, this degradation is called halo artifact (or simply halo).

In order to resolve this halo artifact, a local grayscale compression technique is disclosed, for example, in document: F. Durand and J. Dorsey, "Fast bilateral filtering for the display of High-dynamic-range images", Proc. SIGGRAPH 02, pp. 257-266, 2002." and document: R. Sobol, "Improving the Retinex algorithm for rendering wide dynamic range photographs", Journal of Electronic Imaging, Vol. 13 (1), pp. 65-74, 2004." This technique uses an edge-preserving nonlinear low-pass filter (bilateral filter) to separate the lighting components. However, even these techniques are problematic in terms of implementation in that the calculation cost of the nonlinear filtering is excessively high and that, due to lack of guidelines for determining a threshold for use in edge determination for the filter, the threshold parameter cannot be automatically adjusted.

Further, when a color image is subjected to grayscale compression, problems specific to a color image occur. These problems include loss of part of color grayscale after grayscale compression, as a result of which the image looks flat, deviation in tint and some unnatural tints.

A flat-looking image resulting from loss of part of color grayscale is caused by the saturation of an RGB signal when the result of the grayscale compression of the luminance is reflected onto the input color image. Deviation in tint is also caused by the signal saturation. Saturation of one of the three RGB channel signals leads to unbalanced RGB, resulting in color deviation.

For this reason, the technique proposed by document: L. Wang, T. Horiuchi and H. Kotera, "HDR Image Compression based on Local Adaptation for Scene and Display Using Retinal Model", Proc. $14^{th}$ Color Imaging Conference, pp. 327-332, 2006 modulates the RGB signals nonlinearly so as to adjust the degree of saturation in the grayscale compression algorithm. This technique is advantageous in that it can adjust the degree of saturation using a simple mathematical expression, but is disadvantageous in that it offers poor performance as color gamut compression and has a low degree of freedom in adjustment. Nonlinear modulation may lead to unbalanced RGB and thereby to unnatural tints or inappropriate correction of the color gamut of the output device.

Further, compression of a color image leads to unnatural brightness in the high chroma area. This problem is caused by the fact that when the brightness of lighting is estimated using a luminance signal, this estimation has a large error in the high chroma area, as a result of which the brightness of that area is estimated to be darker than it really is.

Still further, the above grayscale compression techniques implicitly assume an ideal system in which the dynamic range is sufficiently large. Therefore, if any of the above techniques is incorporated in the camera signal processing for operation, a problem occurs due to the input image or signal processing limitations.

One of the problems is an image quality failure caused by the saturation of the imaging element. No matter how well an area saturated in the imaging element is compressed in grayscale (suppressed in luminance), the grayscale of this area does not become evident. If anything, the white spots of the image become darker, resulting in degraded image quality. Further, in the area where some colors of the color sensor are saturated, colors other than those of the subject may manifest themselves as a result of grayscale compression, resulting in degraded image quality.

Among other problems is image quality degradation resulting from lack of coordination with the camera signal processing parameter. In the camera signal processing, a more or less global grayscale compression is originally performed by adjusting the grayscale curve in the high luminance area when the RAW signal is developed. The imaging exposure is determined according to the global grayscale compression. If a different grayscale compression is added here, the relationship between the imaging exposure setting and grayscale curve is disturbed, preventing the development from proceeding as intended. In addition to the above, noise reduction is not as effective as expected because of increased noise caused by grayscale compression, resulting in a poorer sense of noise.

Further, although many local grayscale compression techniques have been proposed, the compression method of the lighting components in all these techniques is defined by a given algorithm. This leads to a low degree of freedom in image quality setting at the time of application to the camera signal processing.

In light of the foregoing, it is an object of the present invention to achieve grayscale compression capable of suppressing image quality degradation using a simple configuration.

Technical Solution

An aspect of the present invention is an image processing device. The image processing device includes an edge-preserving low-pass filter, average luminance calculation means and threshold calculation means. The edge-preserving low-pass filter determines whether each of pixels adjacent to a target pixel to be processed in an input image is valid based on a reference pixel value determined for the target pixel to be processed and a threshold. Then, the edge-preserving low-pass filter performs smoothing using the values of the adjacent pixels that have been determined to be valid. The average luminance calculation means divides the input image into a plurality of areas based on a luminance distribution of the input image to calculate an average luminance value for each of the areas. The threshold calculation means calculates the threshold to be set in the edge-preserving low-pass filter based on the average luminance value for each of the areas calculated by the average luminance calculation means.

The threshold calculation means can calculate the threshold by multiplying an absolute difference between average luminance values, one for each of the areas, by a predetermined fixed value.

The image processing device can further include extraction means, identification means and detail component correction means. The extraction means extracts a lighting component having a large amplitude periodicity of a luminance signal from the input image using the edge-preserving low-pass filter to extract a detail component as a difference between the luminance signal of the input image and the lighting component. The identification means identifies a gain which is determined commensurate with the lighting component. The detail component correction means multiplies the detail component by the gain identified by the identification means to correct the detail component.

The identification means can identify each of the plurality of areas associated with the luminance values of the image based on a gain characteristic. The gain characteristic is obtained based on a complete adaptation gain. The complete adaptation gain, found by an arithmetic operation based on the average luminance value for each of the areas, is a multiplier for complete adaptation.

The identification means can identify each of the plurality of areas associated with the luminance values of the image based on a gain characteristic. The gain characteristic is obtained based on a correction gain. The correction gain is found by performing a predetermined arithmetic operation on a complete adaptation gain. The complete adaptation gain, found by an arithmetic operation based on the average luminance value for each of the areas, is a multiplier for complete adaptation.

In the arithmetic operation adapted to find the correction gain, an adaptation level can be used. The adaptation level is identified based on a preset adaptation level characteristic which is determined according to a dynamic range value. The dynamic range value is calculated based on the average luminance value for each of the plurality of areas associated with the luminance values of the image.

The identification means can determine the gain characteristic by setting a first value as an upper limit of the correction gain and a second value as a lower limit of the correction gain. The first value is obtained by correcting a complete adaptation gain associated with the darkest of all the plurality of areas based on the adaptation level. The second value is obtained by correcting a complete adaptation gain associated with the brightest of all the plurality of areas based on the adaptation level.

The image processing device can further include thinning-out means and increasing means. The thinning-out means thins out the number of pixels in the input image. The increasing means increases the number of pixels of the image whose pixels have been thinned out by the thinning-out means to the original number. The image whose pixels have been thinned out by the thinning-out means can be fed to the edge-preserving low-pass filter. An image associated with a signal output from the edge-preserving low-pass filter can be fed to the increasing means.

Another aspect of the present invention is an image processing method. The image processing method includes a step of determining whether each of pixels adjacent to a target pixel to be processed in an input image is valid based on a reference pixel value determined for the target pixel to be processed and a threshold. The image processing method further includes a step of performing smoothing using the values of the adjacent pixels that have been determined to be valid. The image processing method still further includes a step of dividing the input image into a plurality of areas based on a luminance distribution of the input image to calculate an average luminance value for each of the areas. The image processing method still further includes a step of calculating the threshold based on the average luminance value for each of the areas.

Still another aspect of the present invention is a program which causes a computer to execute image processing. The image processing includes a step of determining whether each of pixels adjacent to a target pixel to be processed in an input image is valid based on a reference pixel value determined for the target pixel to be processed and a threshold. The image processing further includes a step of performing smoothing using the values of the adjacent pixels that have been determined to be valid. The image processing still further includes a step of dividing the input image into a plurality of areas based on a luminance distribution of the input image to calculate an average luminance value for each of the areas. The image processing still further includes a step of calculating the threshold based on the average luminance value for each of the areas.

Still another aspect of the present invention is a recording medium on which a program is recorded. The program causes a computer to execute image processing. The image processing includes a step of determining whether each of pixels adjacent to a target pixel to be processed in an input image is valid based on a reference pixel value determined for the target pixel to be processed and a threshold. The image processing further includes a step of performing smoothing using the values of the adjacent pixels that have been determined to be valid. The image processing still further includes a step of dividing the input image into a plurality of areas based on a luminance distribution of the input image to calculate an average luminance value for each of the areas. The image processing still further includes a step of calculating the threshold based on the average luminance value for each of the areas.

In an aspect of the present invention, it is determined whether each of pixels adjacent to a target pixel to be processed in an input image is valid based on a reference pixel value determined for the target pixel to be processed and a threshold. Further, smoothing is performed using the values of the adjacent pixels that have been determined to be valid. Still further, the input image is divided into a plurality of areas based on a luminance distribution of the input image to calculate an average luminance value for each of the areas. Still further, the threshold is calculated based on the average luminance value for each of the areas.

Advantageous Effect

The present invention achieves grayscale compression capable of suppressing image quality degradation using a simple configuration.

BRIEF DESCRIPTION OF DRAWINGS

FIG. 12 is a diagram illustrating an example of an image generated by the process of the edge-preserving LPF shown in FIG. 11.

FIG. 13 is a diagram illustrating another example of an image generated by the process of the edge-preserving LPF shown in FIG. 11.

FIG. 14 is a diagram illustrating still another example of an image generated by the process of the edge-preserving LPF shown in FIG. 11.

FIG. 50 is a diagram describing an example of an appropriate threshold.

FIG. 51 is a diagram describing another example of the appropriate threshold.

FIG. 52 is a diagram describing still another example of the appropriate threshold.

FIG. 53 is a diagram describing still another example of the appropriate threshold.

EXPLANATION OF THE REFERENCE NUMERALS

10: Imaging device, 31: CCD, 32: White balance section, 33: Demosaicing section, 34: Grayscale compression section, 35: Linear matrix section, 36: RGB gamma correction section, 37: BT.601 matrix section, 38: Y gamma correction section, 39: Color difference matrix section, 40: Device color gamut compression section, 42: sRGB gamma correction section, 43: RGB delta/gamma correction section, 61: Luminance signal generating section, 62: Perception equalization section, 63: Detection section, 64: Control MPU, 65: Edge-preserving LPF, 66: Detail extraction section, 67: Detail adjustment section, 68: Tone curve process section, 69: Adder, 70: NR process section, 71: RGB modulation section, 351: Downsampler, 352: Buffer, 353: Multiscale filter, 354: Buffer, 356: Edge-preserving upsampler, 361: Ultrawide band edge-preserving LPF, 362: Wide band edge-preserving LPF, 601: Addition coefficient determination process section, 602: Coefficient normalization process section, 605: Integration section, 606: Integration end determination section, 611: Reference level calculation section, 613: Addition coefficient calculation section, 622: Integration section, 623: Integration end determination section

BEST MODE FOR CARRYING OUT THE INVENTION

A description will be given below of the preferred embodiments of the present invention with reference to the accompanying drawings.

Figure 1:
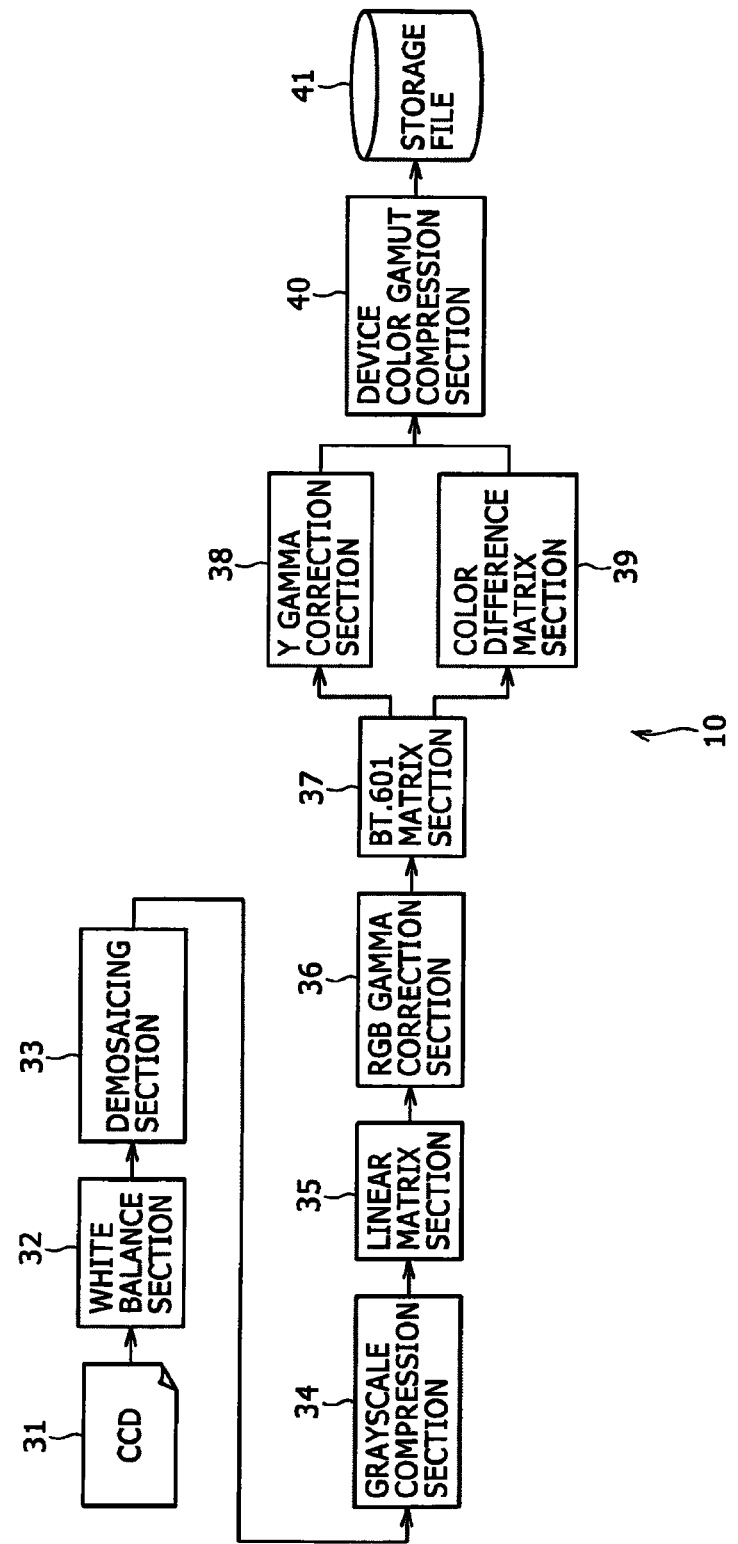
FIG. 1 is a diagram illustrating a configuration example of an imaging device according to an embodiment of the present invention.

FIG. 1 is a block diagram illustrating a configuration example, according to an embodiment of the present invention, of an imaging device 10 according to the embodiment.

A CCD 31 shown in FIG. 1 outputs an image obtained from a CCD imaging element to a white balance section 32.

The white balance section 32 adjusts the white balance of the image by multiplying each of the pixel values of the image output from the CCD 31 by an appropriate coefficient so that the color balance of the achromatic areas of the subject actually becomes achromatic. The white balance section 32 supplies the image with adjusted white balance to a demosaicing section 33.

The demosaicing section 33 obtains a mosaiced image. The mosaiced image is image data obtained by A/D conversion of the image supplied from the white balance section 32, for example, by an A/D converter. The mosaiced image is an image in which data associated with one of the R, G and B color components is stored in a pixel so that the pixels are arranged in a color pattern called a Bayer pattern. Then, the demosaicing section 33 converts (demosaics) the mosaiced image into an RGB signal and outputs the RGB signal to a grayscale compression section 34.

The grayscale compression section 34 subjects the RGB signal supplied from the demosaicing section 33 to grayscale compression as described later and supplies the RGB signal, that has been subjected to a grayscale compression process, to a linear matrix section 35.

The linear matrix section 35 generates an RGB signal with coloration whose characteristic is closely analogous to that of a human eye by computing the RGB signal according to a preset equation and based on a predetermined matrix coefficient.

An RGB gamma correction section 36 subjects the RGB signal output from the linear matrix section 35 to gamma correction and outputs the resultant signal to a BT.601 matrix section 37. The BT.601 matrix section 37 converts the RGB signal output from the RGB gamma correction section 36 to a form compatible with the ITU-R BT.601 Standard.

The BT.601 matrix section 37 separates the image data signal into a luminance signal and color difference signal and outputs the luminance signal to a Y gamma correction section 38. The Y gamma correction section 38 subjects the luminance signal to gamma correction. The color difference signal is output to a color difference matrix section 39 where the image data of the color difference signal is subjected to a matrix operation process to correct the coloration.

The pieces of image data of the signals output from the Y gamma correction section 38 and color difference matrix section 39 are combined and subjected to a color gamut compression process by a device color gamut compression section 40 according to the color gamut of the output device. Here, an arbitrary method can be used as a color gamut compression process. For example, the method disclosed in Japanese Patent Laid-Open No. 2000-278546 (associated U.S. Pat. No. 6,437,792), for example, is used to compress the color gamut in such a manner as to prevent deviation in tint or loss of grayscale. It should be noted that if the color gamut of the output device is yet to be determined, the device color gamut compression section 40 proceeds with a color gamut compression process in accordance with the color gamut of the output image format such as sRGB, AdobeRGB or scRGB.

In the present embodiment, an image with a compressed dynamic range (compressed grayscale) is generated by the grayscale compression section 34, after which the image is subjected to a color gamut compression process by the device color gamut compression section 40 in accordance with the color gamut of the output device. As will be described later, the grayscale compression section 34 extracts a signal representing the brightness from the RGB and multiplies the signal representing the brightness by a gain to proceed with the grayscale compression process. Therefore, when an RGB signal is generated from a signal that has been subjected to the grayscale compression process, this signal will exceed the color reproduction range of the device, possibly resulting in a hue different from that of the original image. Generating an image with compressed grayscale followed by color gamut compression process as done in the present embodiment prevents problems such as a flat-looking image resulting from loss of part of color grayscale or deviation in tint.

Then, the image data output from the device color gamut compression section 40 is stored in a storage file 41.

Figure 2:
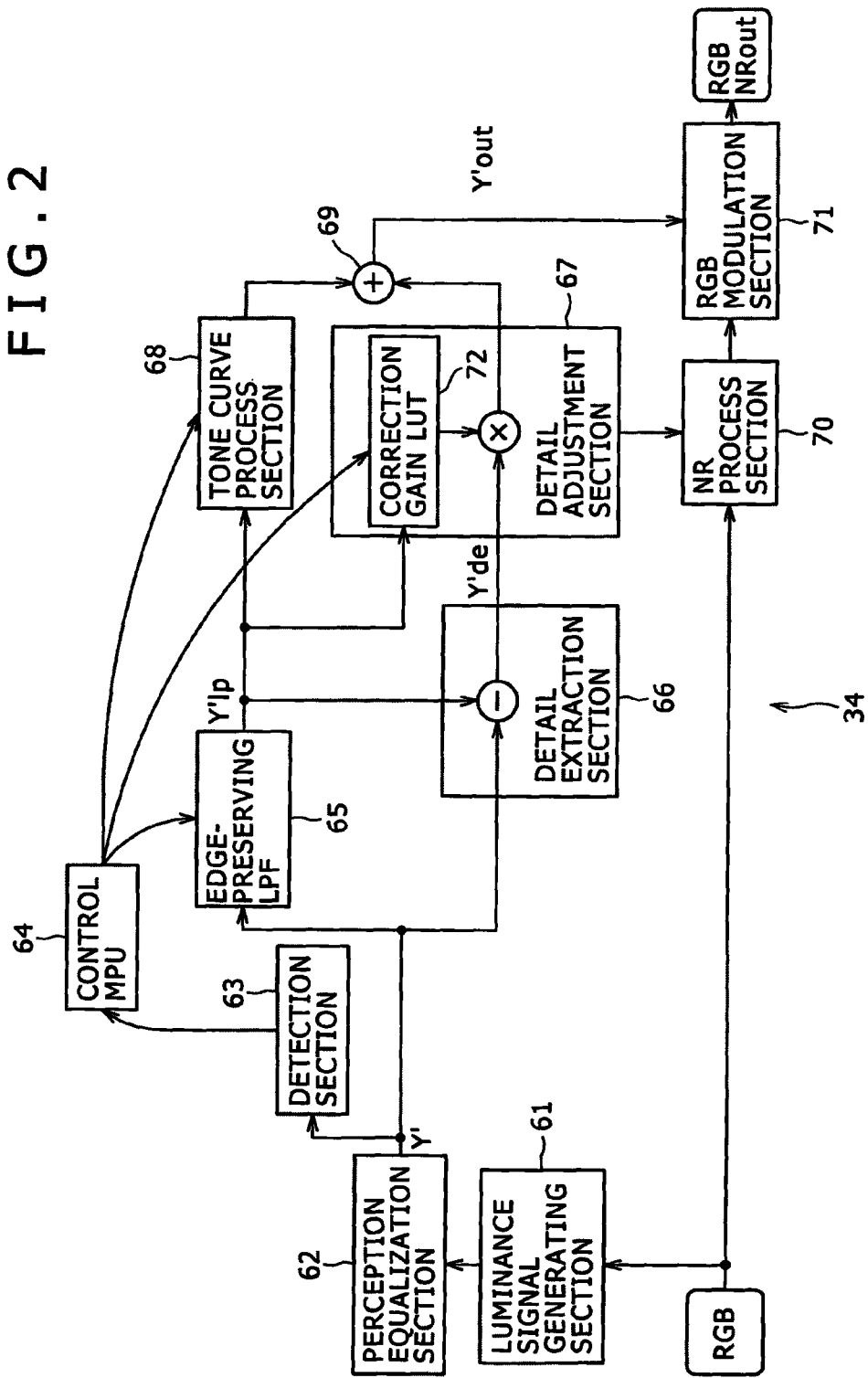
FIG. 2 is a diagram illustrating a detailed configuration example of a grayscale compression section shown in FIG. 1.

FIG. 2 is a block diagram illustrating a detailed configuration example of the grayscale compression section 34.

A luminance signal generating section 61 shown in FIG. 2 extracts a signal Y representing the brightness in consideration of the reflectance of the object from the RGB signal fed to the grayscale compression section 34. It should be noted that a luminance signal obtained by computing the linear sum of the RGB signal may be used 'as-is' as the signal Y. Alternatively, the signal obtained by performing the following computation on the luminance signal may be used as the signal Y.

For example, the signal Y may be obtained by performing a predetermined computation on the luminance signal using the channel with the maximum value of the R, G and B channels and the weighted sum of the luminance signal.

Alternatively, the signal Y may be obtained by performing a computation adapted to correct the luminance signal using chromaticity information of the subject which is obtained using an exposure meter. It should be noted that detailed information about an exposure meter is disclosed, for example, in U.S. Pat. No. 2,634,897.

Still alternatively, the signal Y may be obtained by recognizing the subject based on a captured image and performing a computation adapted to correct the luminance signal based on the preset reflectance associated with the recognized subject.

A perception equalization section 62 nonlinearly converts the signal Y to generate a perceptibly equal brightness signal Y' so as to ensure signal processing that matches human perception in the subsequent detection process and low-pass filtering process. For example, if the input RGB signal is a linear signal, nonlinear conversion is performed using an sRGB gamma curve.

The gamma curve can be obtained by using an equation adapted to convert linear RGB to nonlinear RGB. The equation is used, for example, in sRGB (IEC61966-2-1). In addition to the above, nonlinear conversion may be performed by means, for example, of nonlinear conversion, logarithmic conversion (Y'=log(Y)) and involution (Y'=Y^(1/2.2)) used in the 1976 CIE L*a*b* color space.

It should be noted that, in the description given below, a variable with a prime denotes a nonlinear value, and a variable with no prime a linear value, unless otherwise specified.

A detection section 63 performs a detection process of the signal Y'.

First, the detection section 63 performs low-pass filtering of the input signal (signal Y'). This removes the component of the input signal higher in frequency than the predetermined level. This process is designed to detect broad spatial patterns of the signal Y' while ignoring fine spatial patterns thereof.

This prevents the detection result from becoming tilted toward extreme values as a result of detection based on fine spatial patterns of the image.

As a result of the process performed by the detection section 63, the average intensity of lighting in the bright area of the input image and that of the dark area thereof are estimated, as will be described later. Further, as a result of the process performed by the detection section 63, the number of pixels having a value equal to or greater than the saturation level is counted, as will be described later. Whether the imaging exposure is appropriate is determined based on the number of pixels. If it is determined that the imaging exposure is inappropriate, the imaging device 10 is controlled by a control MPU 64 so as to reduce the exposure. Still further, as will be described later, the control MPU 64 finds the threshold to be set in a filter of an edge-preserving LPF 65 based on the average intensities of lighting in the bright and dark areas estimated by the detection section 63.

A detailed description will be given below of the process performed by the detection section 63 with reference to FIG. 3.

The signal of an original image 91 fed to the detection section 63 is converted to a thinned-out image 93 by a down-sampler 92. In this example, the 10M pixel original image 91 made up of 3888 by 2608 pixels is thinned out and converted to the thinned-out image 93 made up of X by Y pixels.

Figure 3:
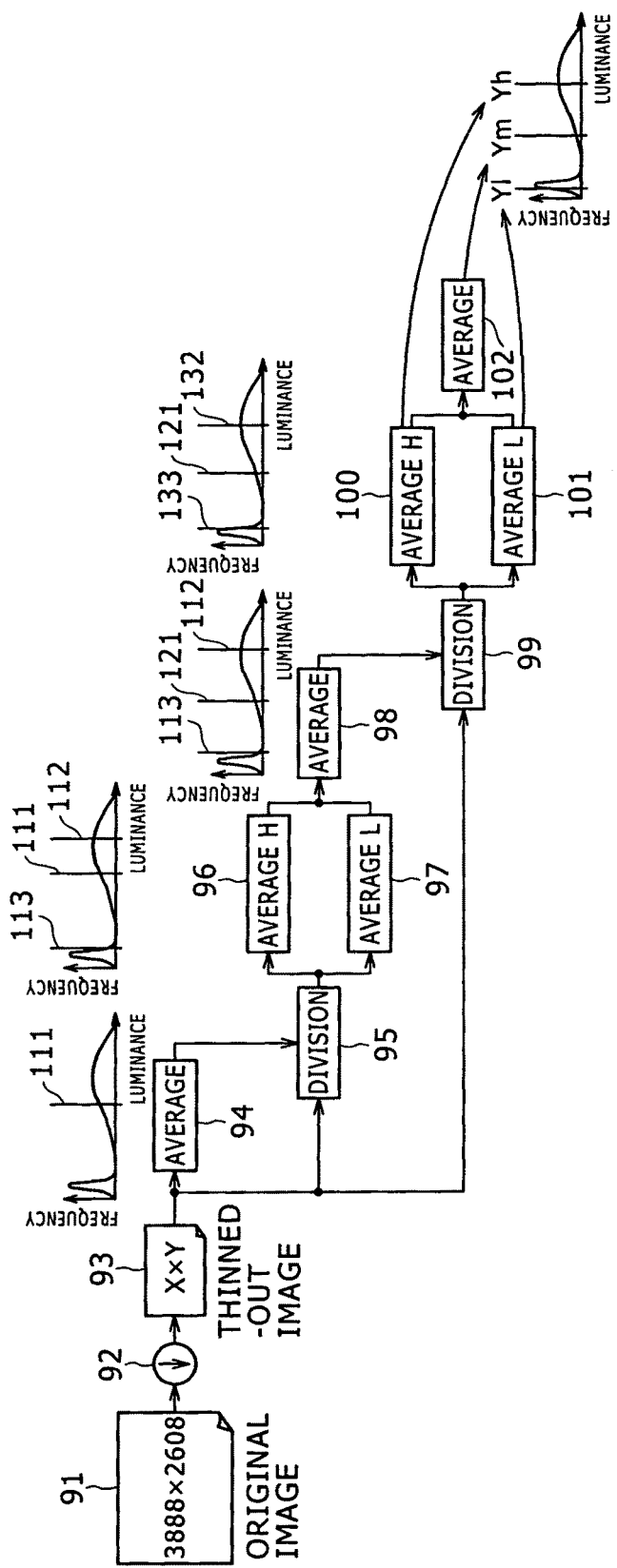
FIG. 3 is a diagram illustrating the processes performed during detection.

The signal of the thinned-out image 93 is supplied to an arithmetic operator 94 shown in FIG. 3 where a histogram as shown above the arithmetic operator 94 is generated. This histogram shows the pixel luminance value on the horizontal axis and the frequency (pixel count) on the vertical axis. The arithmetic operator 94 computes the average luminance value (bar 111 in FIG. 3) of all the pixels of the thinned-out image 93. The average luminance value obtained here serves as the initial value of a value Ym which will be described later.

An arithmetic operator 95 divides the histogram generated by the arithmetic operator 94 with the bar 111 (namely, average luminance value). This divides all the pixels of the thinned-out image 93 into those having a luminance value greater than the average value and others having a luminance value smaller than the average value.

Of the pixels divided by the process of the arithmetic operator 95, those having a luminance value greater than the average value (bar 111) are supplied to an arithmetic operator 96 where the average value of the pixels is computed. On the other hand, of the pixels divided by the process of the arithmetic operator 95, those having a luminance value smaller than the average value (bar 111) are supplied to an arithmetic operator 97 where the average value of the pixels is computed. As a result, as shown in the histogram above the arithmetic operator 96 in FIG. 3, a bar 112 (average value of the pixels having a luminance value greater than the bar 111) and a bar 113 (average value of the pixels having a luminance value smaller than the bar 111) are found. The average value of the pixels having a large luminance value and that of the pixels having a small luminance value obtained here serve respectively as initial values of values Yh and Yl which will be described later.

Further, the values obtained as the computation results of the arithmetic operators 96 and 97 are supplied to an arithmetic operator 98 where the average value of the two values is computed. The average value obtained here is associated with a bar 121 of the histogram shown above the arithmetic operator 98 in FIG. 3.

Then, an arithmetic operator 99 divides this histogram again with the bar 121. Arithmetic operators 100 and 101 respectively compute the average values of the pixels having a luminance value larger than the bar 121 and that of the pixels having a luminance value smaller than the bar 121. As a result, as shown in the histogram above the arithmetic operator 100 in FIG. 3, a bar 132 (average value of the pixels having a luminance value greater than the bar 121) and a bar 133 (average value of the pixels having a luminance value smaller than the bar 121) are found.

Further, the values obtained as the computation results of the arithmetic operators 100 and 101 are supplied to an arithmetic operator 102 where the average value of the two values is computed. The above process is repeated until the average value obtained here converges. It should be noted that the term "converge" used here refers to the fact that the absolute difference between the average value computed by the arithmetic operator 98 and that computed by the arithmetic operator 102 becomes equal to or less than the predetermined threshold.

The average value that has converged as a result of the process as described above is set as a value Ym. The average value of the pixels having a luminance value greater than the value Ym, i.e., the average value of the pixels in the bright area of the image, is set as the value Yh. The average value of the pixels having a luminance value smaller than the value Ym, i.e., the average value of the pixels in the dark area of the image, is set as the value Yl. These values are stored, for example, in an internal memory.

It should be noted that although, in the above description, histograms were generated here for the calculations by the arithmetic operators 94 to 102 for the sake of description, these calculations are intended to calculate the average values using the thresholds. In reality, therefore, none of the arithmetic operators 94 to 102 generates any histogram, but instead performs an average value calculation or division.

From here onward, the values Yh and Yl obtained as described above are respectively assumed to be equal to an average intensity LA of the lighting of the bright area of the image, and an average intensity LB of the lighting of the dark area of the image.

The process performed by the detection section 63 finds the average intensity LA of the lighting of the bright area of the image and the average intensity LB of the lighting of the dark area of the image, and the control MPU 64 finds a dynamic range size DR of the image in the following manner.

Figure 4:
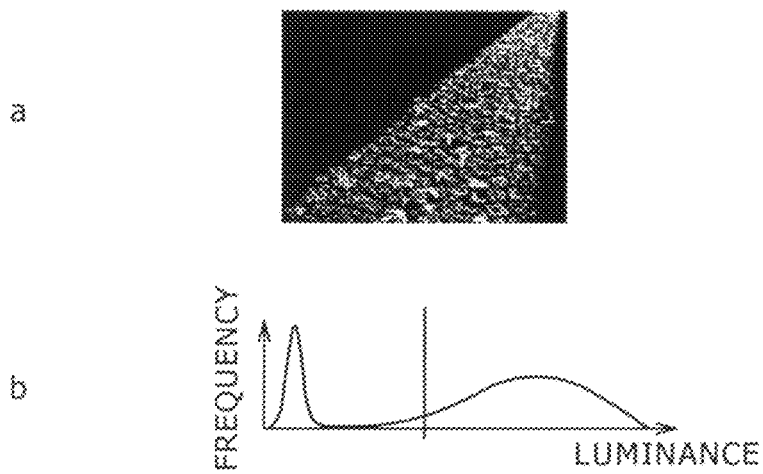
FIGS. 4a and 4b are diagrams describing an image histogram.

We assume, for example, that the image of the signal fed to the detection section 63 is as illustrated in FIG. 4*a*, and that the histogram of the image is as illustrated in FIG. 4*b*. It should be noted that FIG. 4*b*, which shows the pixel luminance value on the horizontal axis, and the frequency (pixel count) on the vertical axis, is the histogram of the pixel values of the image shown in FIG. 4*a*.

Figure 5:
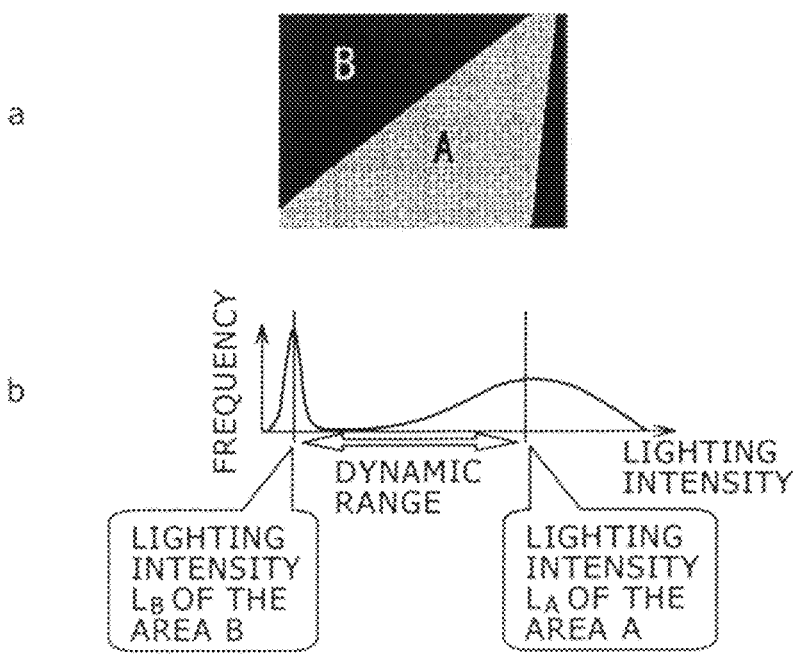
FIGS. 5a and 5b are diagrams describing bright and dark areas and a dynamic range of the image shown in FIG. 4.

After the process performed by the detection section 63, the image illustrated in FIG. 4*a* is divided into two areas, a bright area A of the image and a dark area B thereof as shown in FIG. 5*a* to find the detection values. Then, as illustrated in the histogram of FIG. 5*b*, the dynamic range DR of the image is obtained by the equation shown below based on the average intensities LA and LB of the lighting of the areas A and B of the image, respectively.

$$DR = \log_2(Yh/Yl)$$

Further, the process performed by the detection section 63 finds the average intensity LA of the lighting of the bright area of the image and the average intensity LB of the lighting of the dark area of the image, and the control MPU 64 finds adaptation levels of the bright and dark areas of the image. Here, the term "adaptation level" refers, for example, to a coefficient used to control the exposure value adapted to properly obtain the subject image commensurate with the lighting intensity in the bright or dark area.

First, the control MPU 64 obtains a default exposure value EV0, for example, by computation using the equation shown below.

$$EV0 = -\log_2(2Ym)$$

Alternatively, the default exposure value EV0 need not be computed. Instead, an exposure value set in advance in the imaging device 10 may be obtained as the default exposure value EV0. It should be noted that the default exposure value EV0 represents the standard exposure value of the imaging device 10 (camera).

After the default exposure value EV0 is obtained, the control MPU 64 computes a gain K0 using the equation shown below. The gain K0 is used to convert the captured image into an image with the default exposure value.

$$K0 = 2^{EV0}$$

Further, the control MPU 64 finds an exposure value EVh completely adapted to the bright area of the image, and an exposure value EVl completely adapted to the dark area thereof using the equations shown below.

$$EVh = -\log_2(2Yh)$$

$$EVl = -\log_2(2Yl)$$

Capturing an image using the completely adapted exposure values provides an image that shows the subject properly commensurate with the lighting intensities of the respective areas. For example, if a subject located in a bright area is imaged with the exposure value set to EVh, and another subject located in a dark area with the exposure value set to EVl, both of the images show their subject with the same brightness on condition that the subjects have the same reflectance.

Still further, the control MPU 64 finds a complete adaptation gain kA for the bright area of the image, and a complete adaptation gain kB for the dark area thereof, using the equations shown below.

$$kA = 2^{EVh}$$

$$kB = 2^{EVl}$$

Using the gains kA and kB makes it possible to convert the captured image into an image with the exposure value completely adapted to the bright area and another image with the exposure value completely adapted to the dark area.

However, when the images, one completely adapted to the bright area and another to the dark area, are displayed, there is no difference in contrast between the bright and dark areas in these images, making them look unnatural. For this reason, the gains kA and kB are corrected using an adaptation level in the present embodiment.

An adaptation level is a value equal to or less than 1 which is determined commensurate with the image dynamic range. For example, the adaptation level is stored in advance in the control MPU 64 in the form of a lookup table (LUT).

Figure 6:
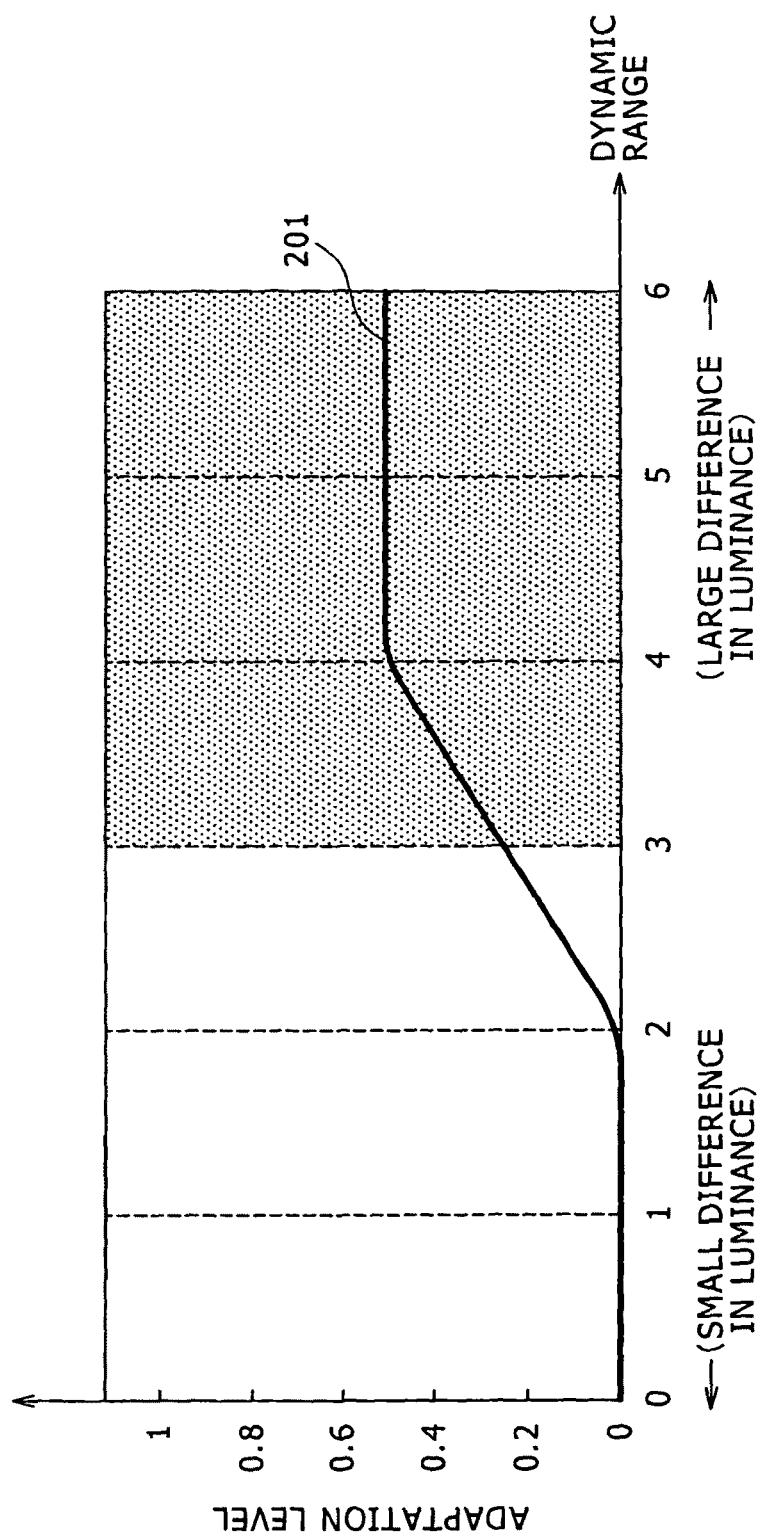
FIG. 6 is a diagram illustrating an example of an adaptation gain LUT.

FIG. 6 is a diagram illustrating an example of content of an LUT adapted to identify the adaptation level. This figure shows the dynamic range value on the horizontal axis, and the adaptation level on the vertical axis, with a line 201 representing an adaptation level for each dynamic range value.

As illustrated in FIG. 6, the larger the image dynamic range, that is, the larger the difference between the average intensities of the bright and dark areas of the image, the closer the adaptation level is to 1, so that a strong adaptation is applied.

Here, the term "strong adaptation" refers to adaptation closer to complete adaptation.

Further, as illustrated in FIG. 6, the line 201 becomes horizontal when the dynamic range value is 4 or greater. That is, when the dynamic range grows to a certain extent or more, the adaptation level will no longer increase.

The control MPU 64 corrects the complete adaptation gain kA for the bright area of the image, and the complete adaptation gain kB for the dark area thereof using an adaptation level Adl identified by the LUT shown in FIG. 6 by means of the equations shown below to find a corrected adaptation gain kAr for the bright area of the image and a corrected adaptation gain kBr for the dark area thereof, respectively.

$$kAr = 2^{(EV0 - Adl \times (EVh - EV0))}$$

$$kBr = 2^{(EV0 - Adl \times (EVl - EV0))}$$

Figure 7:
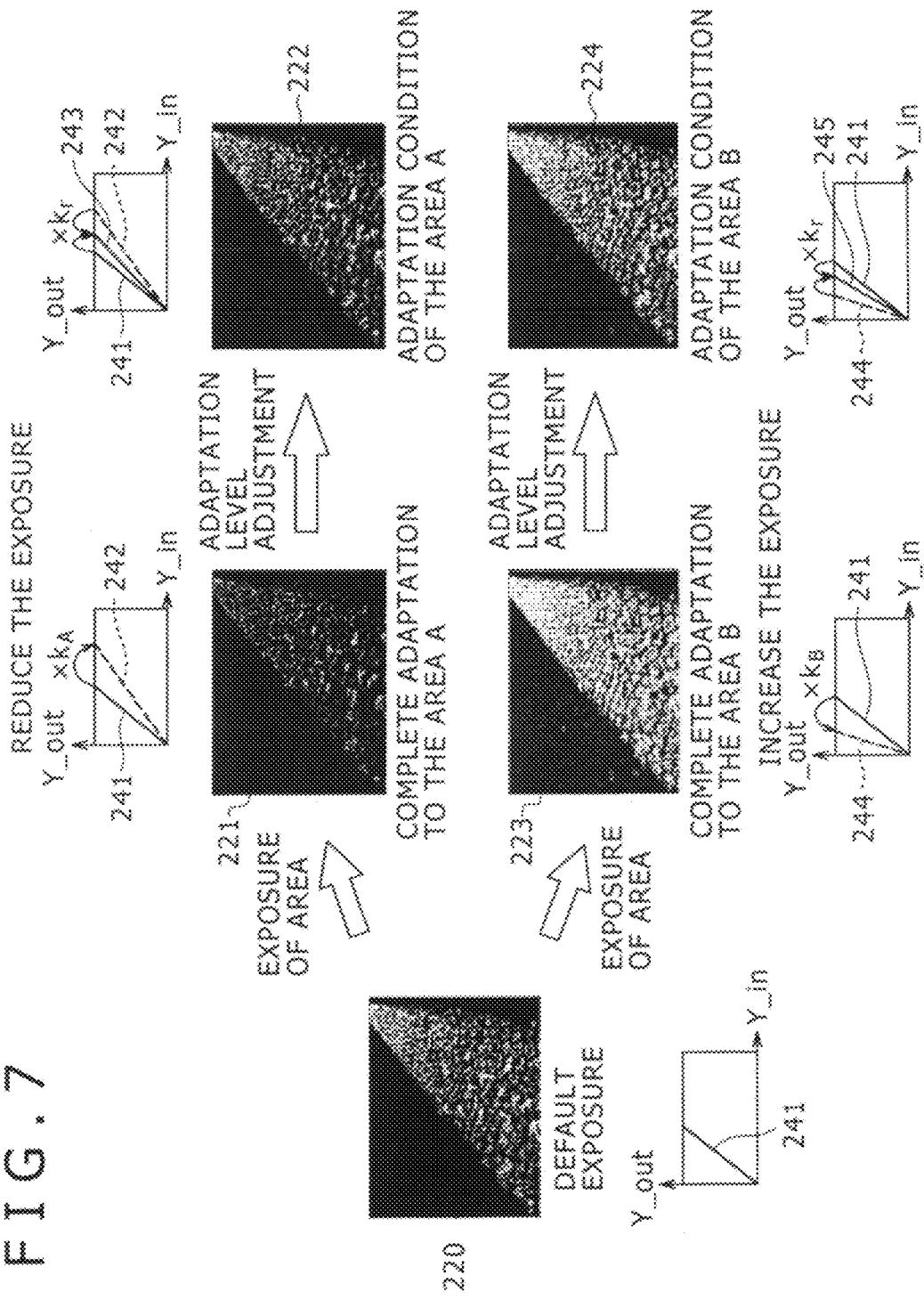
FIG. 7 is a diagram describing an adaptation gain setting.

A further detailed description will be given below with reference to FIG. 7.

We assume that an image 220 is captured using the default exposure value EV0. In the image captured using the default exposure value EV0, a luminance value (Y-out) of the output signal is determined commensurate with a luminance value (Y-in) of the input signal by a line 241 of the graph shown below the image 220.

An image 221 is captured using the exposure value EVh completely adapted to the bright area A of the image 220. In the image captured using the exposure value EVh, the luminance value (Y-out) of the output signal is determined commensurate with the luminance value (Y-in) of the input signal by a line 242 of the graph shown above the image 221. That is, the luminance value (Y-out) is determined by multiplying the value determined by the line 241 by the complete adaptation gain kA.

In other words, the image 221 is reduced in exposure in an across-the-board manner commensurate with the area A of the image 220. Therefore, the image 221 is obtained by globally compressing the grayscale of the image 220 commensurate with the bright area. As far as the object (part of the subject) in the bright area is concerned, on the other hand, it can be said that the image 221 offers improved viewing of the object thanks to appropriate brightness imparted to the pixels of the image 220 that were overexposed.

When the value determined by the line 241 is multiplied by the corrected adaptation gain kAr for the bright area of the image, the luminance value (Y-out) of the output signal is determined commensurate with the luminance value (Y-in) of the input signal by a line 243 of the graph shown above an image 222. As a result, the image 222 is obtained which is adapted to the bright area commensurate with the dynamic range of the image 220.

An image 223 is captured using the exposure value EVl completely adapted to the dark area B of the image 220. In the image captured using the exposure value EVl, the luminance value (Y-out) of the output signal is determined commensurate with the luminance value (Y-in) of the input signal by a line 244 of the graph shown below the image 223. That is, the luminance value (Y-out) is determined by multiplying the value determined by the line 241 by the complete adaptation gain kB.

In other words, the image 223 is increased in exposure in an across-the-board manner commensurate with the area B of the image 220. Therefore, the image 223 is obtained by globally compressing the grayscale of the image 220 commensurate with the dark area. As far as the object in the dark area is concerned, on the other hand, it can be said that the image 223 offers improved viewing of the object thanks to appropriate brightness imparted to the pixels of the image 220 that were underexposed.

When the value determined by the line 241 is multiplied by the corrected adaptation gain kBr for the dark area of the image, the luminance value (Y-out) of the output signal is determined commensurate with the luminance value (Y-in) of the input signal by a line 245 of the graph shown below an image 224. As a result, the image 224 is obtained which is adapted to the dark area commensurate with the dynamic range of the image 220.

As described above, by finding the adaptation gains using the adaptation level Adl identified by the LUT shown in FIG. 6 and multiplying by the adaptation gains commensurate with the intensities of the lighting in the areas of the image, it is possible to obtain images with appropriate exposure values for the bright and dark areas of the image. The images thus obtained have been compressed in dynamic range as a whole and offer improved viewing of the objects in the respective areas of the image. Further, these images are natural looking unlike an image completely adapted to the bright or dark area of the image. Such compression of the dynamic range will be referred, as appropriate, to grayscale compression.

In the imaging device 10, the control MPU 64 finds the adaptation gains kAr and kBr in advance based on the result of the process performed by the detection section 63. Then, the image is subjected to grayscale compression using the adaptation gains kAr and kBr in the subsequent processes performed by the detail adjustment section 67 and tone curve process section 68.

That is, in the imaging device 10, the complete adaptation gain kA for the bright area of the image, and the complete adaptation gain kB for the dark area thereof, are corrected using the adaptation level Adl identified based on the dynamic range of the image to find the adaptation gains kAr and kBr as described with reference to FIG. 6. Then, a correction gain LUT 72 shown in FIG. 2 is generated based on the adaptation gains kAr and kBr. It should be noted that a description will be given later of the correction gain LUT 72 with reference to FIG. 17.

Further, the process performed by the detection section 63 finds the average intensity LA of the lighting of the bright area of the image and the average intensity LB of the lighting of the dark area thereof, and the control MPU 64 finds a threshold ϵ to be supplied to the edge-preserving LPF 65.

The threshold ϵ is found based on the average intensities LA and LB using the equation shown below.

$$\epsilon = R \times |LA - LB|$$

Figure 8:
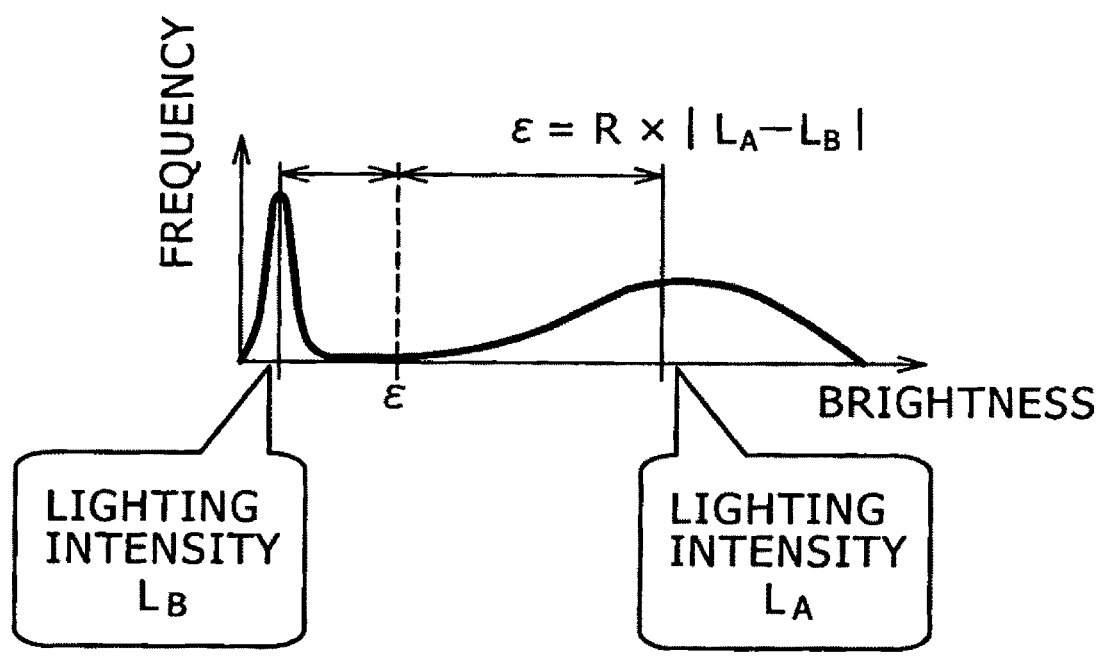
FIG. 8 is a diagram describing an epsilon filter threshold setting.

Here, R, a coefficient adapted to adjust the edge-preserving strength of the filter, is a fixed value. That is, ϵ is identified as illustrated in FIG. 8. FIG. 8 is a histogram of a captured image which shows the frequency (pixel count) on the vertical axis and the brightness (e.g., luminance value) on the horizontal axis.

Figure 9:
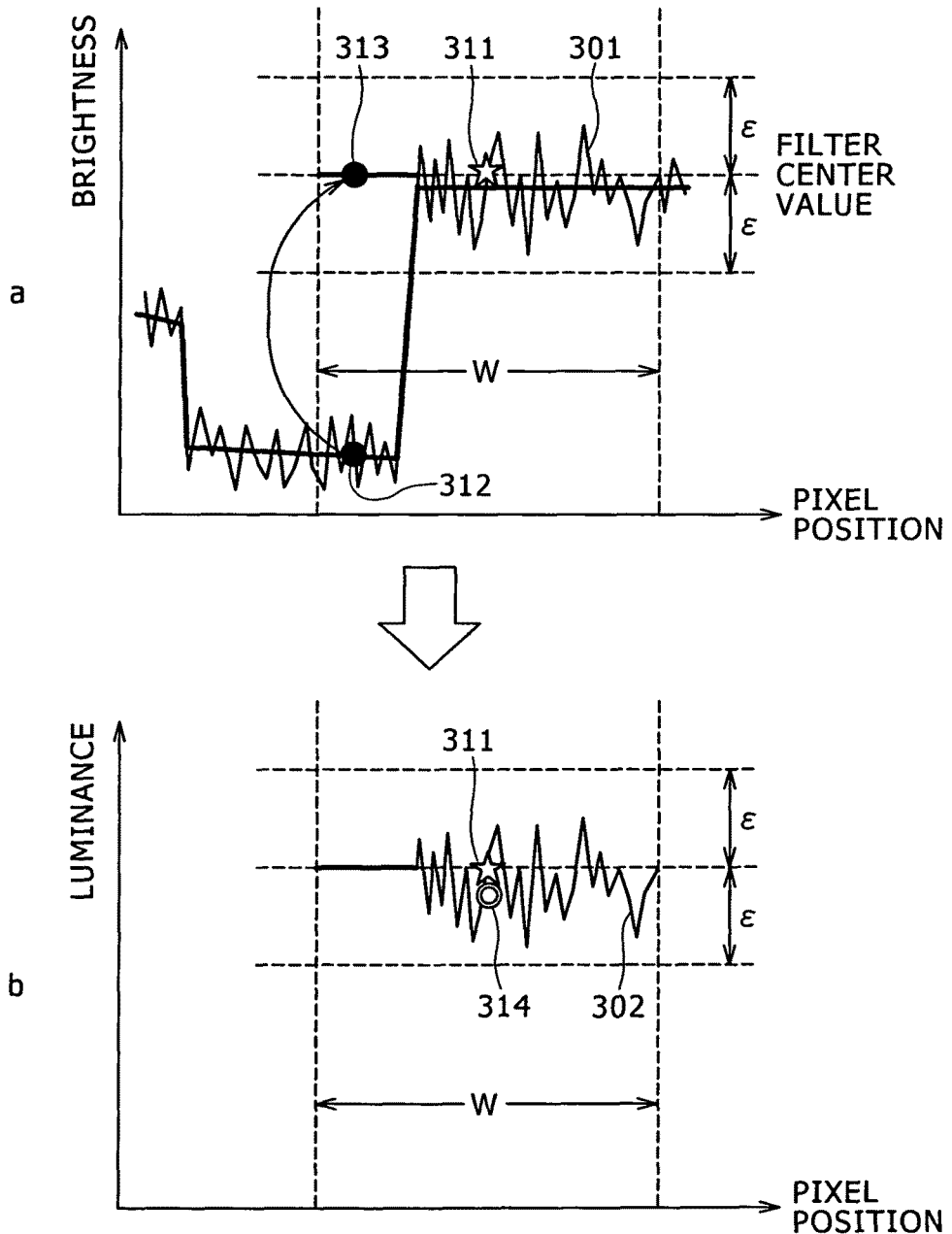
FIGS. 9a and 9b are diagrams describing the operation of the epsilon filter.

The edge-preserving LPF 65 is a nonlinear smoothing filter adapted to replace the pixel values falling outside the range ϵ above and below the reference level by the reference level for smoothing. This filter is a low-pass filter obtained by improving a so-called epsilon filter. A description will be given below of the operation of this low-pass filter with reference to FIGS. 9a and 9b. It should be noted that both FIGS. 9a and 9b show the pixel position on the horizontal axis and the brightness value on the vertical axis. The brightness value of the pixel at each of the pixel positions is shown by a line 301 or 302.

For example, if the brightness value of the pixel at each of the pixel positions is shown by the line 301 in FIG. 9a, the edge-preserving LPF 65 sets, for example, as a process for finding an output value of a filter at a point 311, the filter median, a center value of the filter window, as a reference level. The edge-preserving LPF 65 temporarily replaces, for example, the pixel value at the position shown by a point 312, which falls outside the range ϵ above and below the reference level, by the brightness of a point 313 and calculates the average value of the pixels falling within the filter window range for smoothing. As a result, the brightness of the pixels located within a width W of a pixel position are set to the value shown by a point 314 in FIG. 9b in an across-the-board manner.

Then, the process as described above is repeated while shifting the position of the width W on a pixel-by-pixel basis so that the image is smoothed in such a manner as to divide the image into the bright and dark areas.

Figure 10:
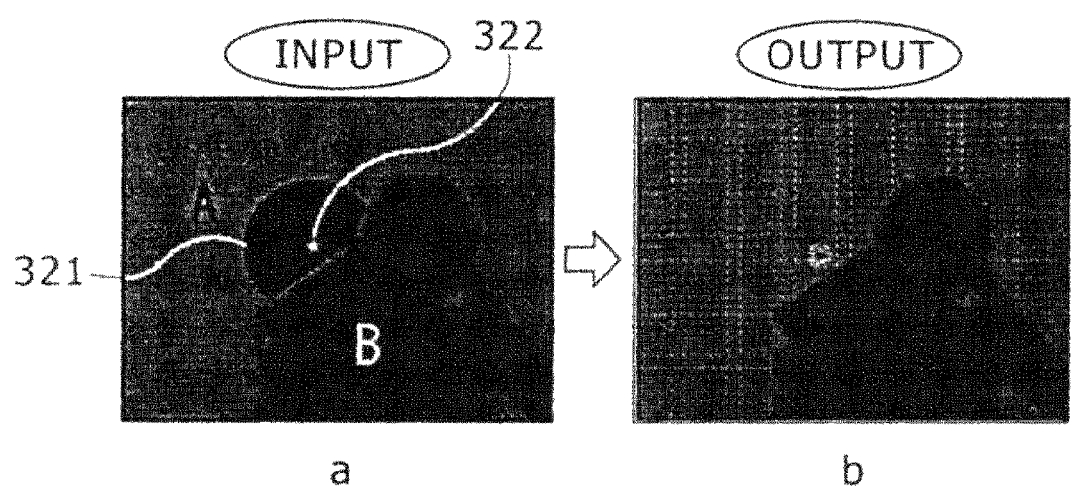
FIGS. 10a and 10b are diagrams describing the process performed by the epsilon filter.

The process of the edge-preserving LPF 65 operating as described above produces, for example, an output image as illustrated in FIG. 10b from an input image as illustrated in FIG. 10a. FIGS. 10a and 10b both illustrate images with a background and black human shadow. The area A (background) of FIG. 10a is a bright area, while the area B (human shadow) of FIG. 10b is a dark area. Then, we assume that a filter window of the edge-preserving LPF 65 is set as illustrated by a circle 321 in FIG. 10a. A pixel 322 shown by a star in the same figure represents a filter median which is a reference brightness level.

As described above, the output image shown in FIG. 10b that has undergone the process of the edge-preserving LPF 65 no longer has a complex background pattern, but retains an edge serving as a boundary between the background and human shadow. That is, the process of the edge-preserving LPF 65 removes the high frequency component from the signal Y', allowing for extraction of the lighting component for each of the areas with high accuracy.

Although it is common to use the pixel value at the center of the filter window as a reference level in an epsilon filter, a specific point in the pixel is not smoothed in this case. For this reason, the edge-preserving LPF 65 includes a low-pass filter that operates with its reference value set to the weighted average value of the pixel at the center of the filter window and a plurality of pixels arranged at predetermined positions adjacent to that pixel. It should be noted that the simple average value of the pixel at the center of the filter window and a plurality of pixels arranged at predetermined positions adjacent to that pixel may be alternatively used as a reference level.

In the process performed by a single epsilon filter, on the other hand, the frequency bands that can be smoothed are biased. Therefore, the signals obtained by the processes of a plurality of low-pass filters having different thresholds from each other are combined for use in the present embodiment.

Figure 11:
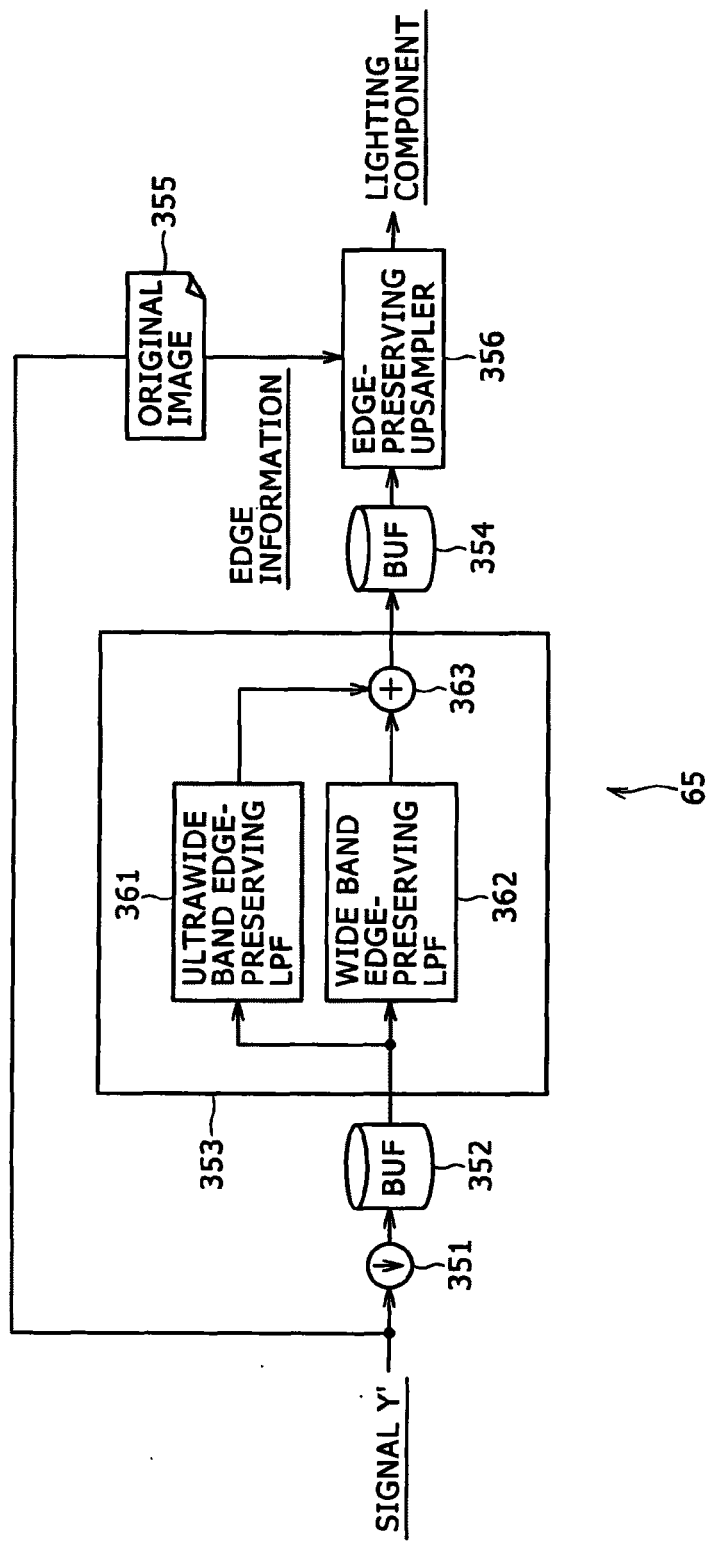
FIG. 11 is a diagram illustrating a detailed configuration example of an edge-preserving LPF shown in FIG. 2.

FIG. 11 is a diagram illustrating a detailed configuration example of the edge-preserving LPF 65. As described above, the edge-preserving LPF 65 is a low-pass filter designed to remove the detail component from the original image of the input signal Y' to properly extract only the lighting component of the original image.

The image of the signal Y' fed to the edge-preserving LPF 65 is thinned out by a downsampler 351 into an image with a smaller number of pixels and stored in a buffer 352. Thus, filtering an image after thinning out the number of pixels provides faster filtering.

At this time, an image as illustrated, for example, in FIG. 12 is generated whose number of pixels has been thinned out to one sixteenth of that of the original image. As a result, an image as illustrated in FIG. 13 is stored in the buffer 352. In this example, the original image shows a clock tower as a subject against the sky as a background. It should be noted that, although the image whose pixels have been thinned out to one sixteenth of that of the original image is shown to be smaller in size than the original image to facilitate the description here, the image is not necessarily reduced in size as a result of the thinning-out process by the downsampler 351.

The image stored in the buffer 352 is supplied to a multiscale filter 353. The multiscale filter 353 includes an ultrawide band edge-preserving LPF 361 and a wide band edge-preserving LPF 362. The wide band edge-preserving LPF 362 has a filter window equal, for example, in size to 2 to 20% of the pixels on the short side of an input image. Here, the term "short side of an input image" refers to the side with a smaller number of pixels when the format of the imaging element is vertically and horizontally asymmetrical. The ultrawide band edge-preserving LPF 361 is an edge-preserving LPF having a filter window, for example, twice to ten times larger than that of the wide band edge-preserving LPF 362.

The signal output from the buffer 352 is supplied to the ultrawide band edge-preserving LPF 361 and wide band edge-preserving LPF 362. The signals that have undergone low-pass filtering by the two LPFs are combined by an adder 363.

The image that has undergone the process of the multiscale filter 353 appears, for example, as shown in FIG. 14 and is stored in a buffer 354.

As compared to the image shown in FIG. 13, the image shown in FIG. 14 no longer has, for example, the clock of the clock tower, pattern on wall, and clouds in the background as a result of the filtering by the multiscale filter 353.

The image stored in the buffer 354 is supplied to an edge-preserving upsampler 356. The edge-preserving upsampler 356 increases the number of pixels in the image stored in the buffer 354 based on the edge information of the original image obtained from the signal Y'. That is, the edge-preserving upsampler 356 restores the image, whose pixels have been thinned out by the downsampler 351, to the image with the original number of pixels.

Figure 15:
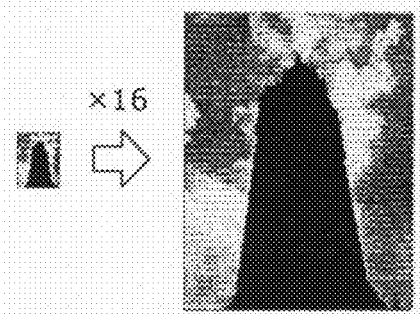
FIG. 15 is a diagram illustrating still another example of an image generated by the process of the edge-preserving LPF shown in FIG. 11.

At this time, an image as illustrated, for example, in FIG. 15 is generated whose number of pixels has been increased sixteen times more than that of the image stored in the buffer 354. The image in FIG. 15 shows a clock tower or subject as a dark object against the sky or background as a bright object. That is, the image no longer has the clock tower or a fine pattern in the sky and is made up of dark and bright areas. Such an image is referred to as a lighting component of the original image in the present embodiment.

Further, the edge-preserving upsampler 356 removes edge bluntness when increasing the number of pixels of the image in the present embodiment.

Figure 16:
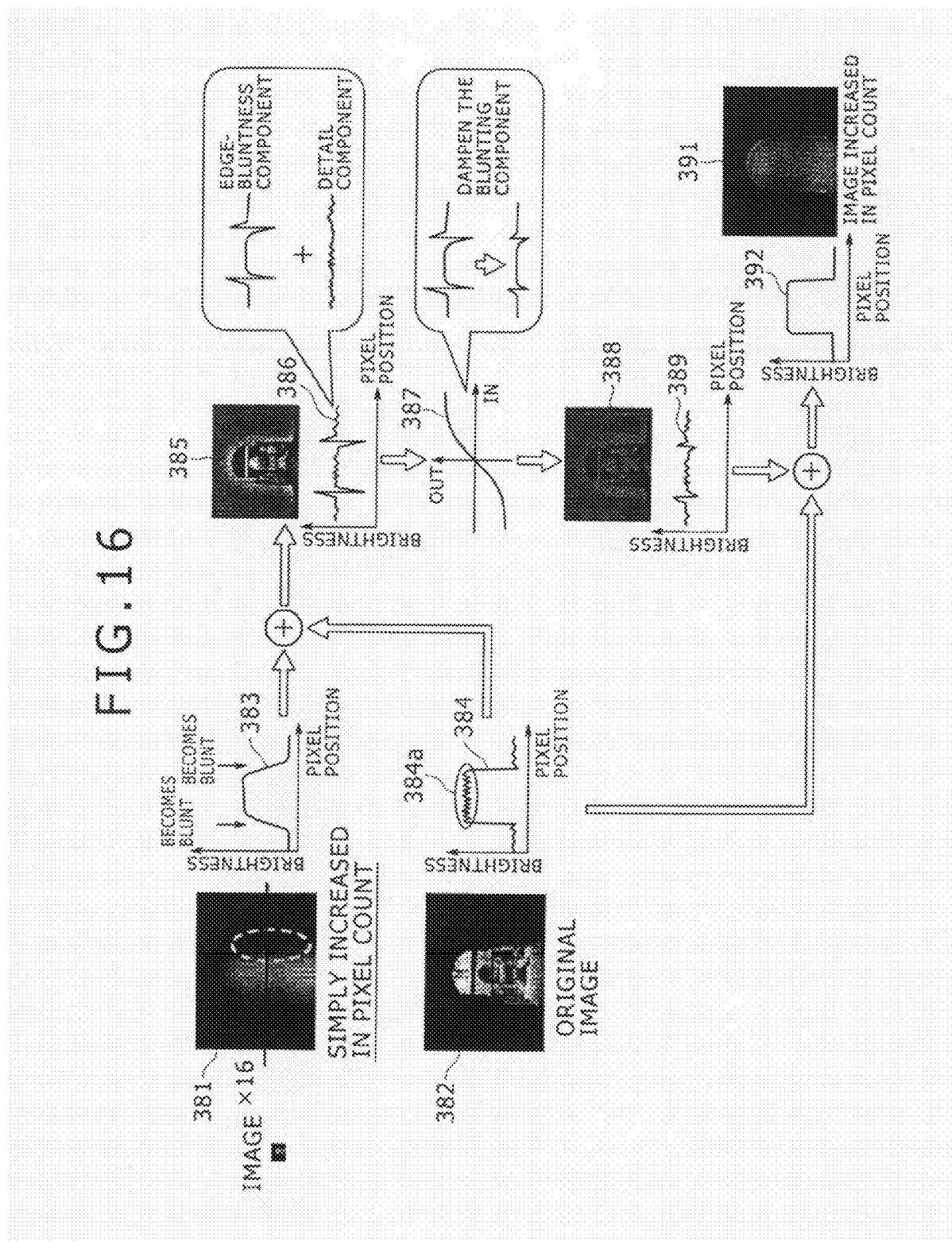
FIG. 16 is a diagram describing the process performed by an edge-preserving upsampler shown in FIG. 12.

A detailed description will be given below of the edge-preserving upsampler with reference to FIG. 16.

Simply increasing 16 times the number of pixels of an image whose number of pixels has been thinned out to one sixteenth of that of its original image (simple increase in pixel count) produces an image as shown in an image 381 having blurred edges or borders between the dark and bright areas of the image. A graph is shown on the right side of the image 381. This graph shows the pixel position on the horizontal axis and the pixel brightness on the vertical axis, with a line 383 representing the brightness of each of the pixels of the image 381.

As a result of the simple increase in pixel count, the line 383 has a shape close to a trapezoid rather than a shape close to a rectangle as it should. That is, the simple increase in pixel count causes the pixel brightness to change slowly rather than steeply as it should. Thus, the edges that are no longer displayed clearly in the image become blunt.

For this reason, the present embodiment extracts the difference between an image with blunt edges as a result of the simple increase in pixel count and the original image, removing edge bluntness from the extracted difference signal for restoration to the original image.

A graph is shown on the right side of an original image 382. This graph shows the pixel position on the horizontal axis and the pixel brightness on the vertical axis, with a line 384 representing the brightness of each of the pixels of the original image 382. The original image shown by the line 384 has no edge bluntness but contains a detail component because it has yet to undergo the filtering process by the multiscale filter 353. In this example, fine amplitudes contained in an area 384a of the line 384 are a detail component.

The image of the signal obtained by extracting the difference between the signal shown by the line 383 and that by the line 384 looks, for example, like an image 385. A graph is shown below the image 385. This graph shows the pixel position on the horizontal axis and the pixel brightness on the vertical axis, with a line 386 representing the brightness of each of the pixels of the image 385. The signal shown by the line 386 contains the edge bluntness component of the image 381 and the detail component of the original image 382.

For this reason, the edge-preserving upsampler multiplies the signal shown by the line 386 by the gain having a characteristic shown by a line 387 to remove the bluntness component. The line 387 represents the characteristic of the gain having the input on the horizontal axis and the output on the vertical axis. This characteristic causes the output signal value to change with change in the input signal value. The line 387 has a characteristic of a so-called S-shape function.

As compared with the detail component of the original image 382 contained in the signal, the edge bluntness component of the image 381 contained in the signal is larger in amplitude. As a result, the signal shown by the line 386 is processed by the S-shape function, providing an image with a reduced bluntness component as shown by an image 388. It should be noted that a fixed value may be used here as the S-shape function. However, if the signal is modulated, for example, so that the S-shape characteristic is intensified in the area where the edges are highly likely to exist, the edges can be more effectively restored.

A graph is shown below the image 388. This graph shows the pixel position on the horizontal axis and the pixel brightness on the vertical axis, with a line 389 representing the brightness of each of the pixels of the image 388. As compared with the signal shown by the line 386, the signal shown by the line 389 is smaller in amplitude resulting from the edge bluntness component.

As described above, combining the signal (signal shown by the line 389) with the signal of the original image 382 (signal shown by the line 384) after reducing the edge bluntness component provides an image increased in pixel count or an image 391. A graph is shown below the image 391. This graph shows the pixel position on the horizontal axis and the pixel brightness on the vertical axis, with a line 392 representing the brightness of each of the pixels of the image 391. Unlike the signal shown by the line 383, the signal shown by the line 392 is free from edge bluntness. Moreover, unlike the signal shown by the line 384, the signal shown by the line 392 is free from fine amplitudes resulting from the detail component.

That is, unlike the image 381 that has been simply increased in pixel count, the image 391 clearly shows the edges in the image with only the lighting component of the image extracted.

It should be noted that the upsampling process may be achieved not only as described in the present embodiment but also by using the method described in J. Kopf and M. Cohen and D. Lischinski and M. Uyttendaele, "Joint Bilateral Upsampling", Proc. SIGGRAPH 07, 2007. However, the above-described method of the present embodiment ensures improved efficiency and higher accuracy in the upsampling process.

As described above, the present embodiment allows for extraction of the lighting and detail components from the image while removing edge bluntness. Further, the filtering parameters (e.g., threshold) of the edge-preserving LPF 65 are automatically set according to the dynamic range of the image, thus requiring no user operation.

Still further, the present invention subjects the image, whose pixels have been thinned out by the downsampler 351, to the filtering process by the multiscale filter 353, followed by the upsampling process by the edge-preserving upsampler 356 to recover the image with the original number of pixels. This contributes to significant reduction in time and cost required for the filtering process.

As described above, processing the signal Y' with the edge-preserving LPF 65 provides a lighting component signal Y'lp of the image of the signal Y'. The lighting component signal Y'lp is supplied to a detail extraction section 66, detail adjustment section 67 and tone curve process section 68.

The detail extraction section 66 computes the difference between the signal Y' and lighting component signal Y'lp, thus extracting a detail component signal Y'de of the image of the signal Y'. The detail component signal Y'de is supplied to the detail adjustment section 67. Thereafter, the lighting component of the signal Y' is subjected to grayscale compression by the tone curve process section 68, while the detail component of the image of the signal Y' is subjected to grayscale compression by the detail adjustment section 67. It should be noted, however, that the grayscale compression by the detail adjustment section 67 is actually designed to provide improved viewing of the detail of the image rather than to compress the dynamic range of the image.

The detail adjustment section 67 multiplies the detail component signal Y'de by the gain obtained based on the correction gain LUT 72, thus correcting the detail component of the image.

Figure 17:
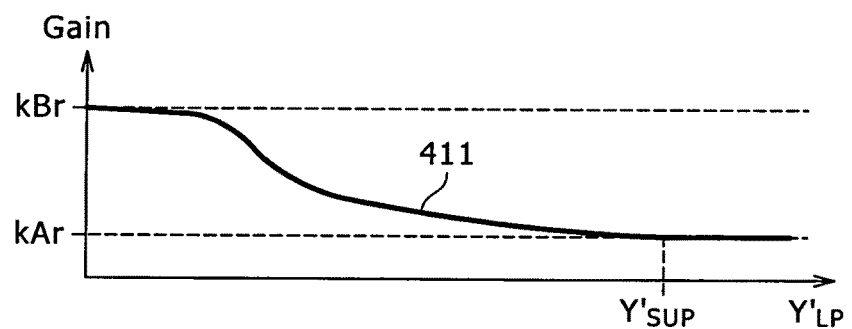
FIG. 17 is a diagram illustrating an example of a correction gain LUT shown in FIG. 2.

FIG. 17 illustrates an example of a correction gain LUT. The correction gain LUT 72 is a table associating the lighting intensity with the gain. In this example, the gain is defined in association with the lighting intensity by a line 411. Using the value of the lighting component signal Y'lp as lighting intensity, the line 411 has a characteristic obtained by interpolating the gain boundary condition with a smooth curve that satisfies the monotonically decreasing condition so that when the lighting intensity is 0, DetailGain(0)=kBr, and that when the lighting intensity is an upper limit Y'sup, DetailGain(Y'sup)= kAr. It should be noted, however, that if the gain is less than 1, the image becomes corrupted in the signal saturated area. Therefore, the gain is limited so as to be always 1 or greater.

The correction gain LUT 72 shown in FIG. 17 is set by the control MPU 64 based on the adaptation gains kAr and kBr found in advance in conjunction with the process performed by the detection section 63.

The image obtained based on the signal thus obtained has fewer overexposed or underexposed pixels in each of the objects in the bright and dark areas, thus providing an image with improved viewing of the detail component (objects) in such a manner that the difference in brightness between the pixels can be properly perceived.

Further, storing the gain in advance in the correction gain LUT 72 makes it possible to readily adjust the extent to which the grayscale compression is performed, for example, by simply rewriting part of the LUT data.

The tone curve process section 68 multiplies the lighting component signal Y'lp by the gain that is determined as a tone curve commensurate with the value of the lighting component signal Y'lp so as to subject the lighting component signal Y'lp to grayscale compression. This tone curve is determined in relation to the correction gain LUT 72, and the value obtained by the equation shown below serves as a gain:

$$\text{ToneCurve}(Y'lp) = Y'LP \times \text{DetailGain}(Y'lp)$$

Here, DetailGain(Y'lp) denotes the gain obtained based on the correction gain LUT 72, and ToneCurve(Y'lp) the gain used by the tone curve process section 68.

The above procedure allows for compression of the dynamic range (grayscale compression) in consideration of the strength of adaptation of human eyes.

On the other hand, if, for example, the process of the tone curve process section 68 is used as an image quality parameter of the imaging device 10, the device designer may, for example, set a desired typical value rather than setting a tone curve in relation to the correction gain LUT 72. In this case, it is only necessary to select a typical value based on the result of the process of the detection section 63. It should be noted, however, that, even in this case, ToneCurve(Y'lp)/Y'LP must be limited so as to be always 1 or greater to prevent the image from becoming corrupted in the signal saturated area.

As described above, using the process of the tone curve process section 68 as an image quality parameter makes it possible, for example, to set a grayscale compression tone curve for the lighting component independently of the adaptation level for each of the areas, thus allowing for image quality design without restraint.

The signals, one subjected to the process of the detail adjustment section 67 and another to the process of the tone curve process section 68, are combined by an adder 69, and the resultant signal is supplied to an RGB modulation section 71 as a signal Y'out. The RGB modulation section 71 also receives an RGBNR signal obtained by subjecting the RGB signal to a noise reduction (NR) process.

In a common noise reduction process, noise is removed by setting a noise intensity based on the ISO speed. However, when an image is subjected to grayscale compression, the viewing of noise in the output image is affected by the gain.

Figure 18:
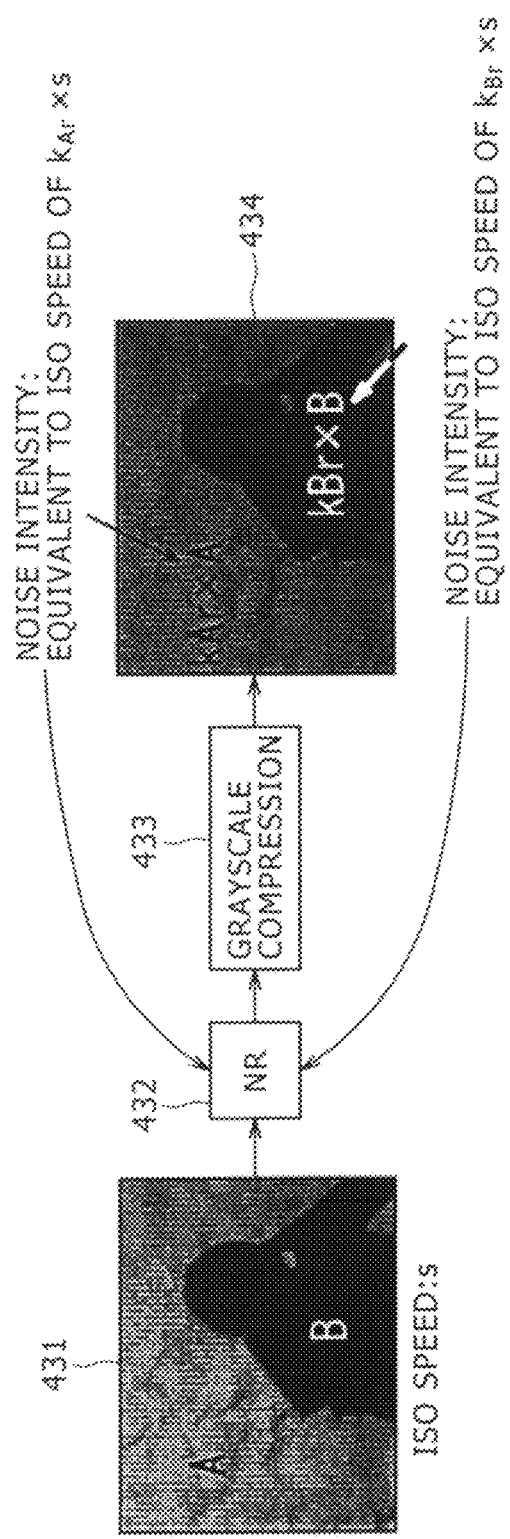
FIG. 18 is a diagram describing an effect of the adaptation gain in an NR process.

For example, if an image 431 shown in FIG. 18 which is captured with the ISO speed s is subjected to a noise reduction process 432 and further to a grayscale compression process 433, the pixel values in the bright area A of the image 431 are multiplied by the gain kAr, and those in the dark area B thereof by the gain kBr as a result of the grayscale compression process.

As a result, when the image devoid of noise thanks to the noise reduction process 432 is subjected to the grayscale compression process 433, noise may be enhanced again by the gains of the areas A and B. In the present embodiment, for this reason, the noise reduction process 432 sets the ISO speed to (kAr×s) for use as noise intensity for the pixels in the area A of the image 431, and the ISO speed to (kBr×s) for use as noise intensity for the pixels in the area B thereof so as to properly remove noise. More specifically, noise is properly removed by setting the thresholds commensurate with the gains determined based on the correction gain LUT 72.

In the NR process, a threshold $\epsilon$NR of the epsilon filter is adjusted on a pixel-by-pixel basis to remove the noise component from the input signal. The threshold $\epsilon$NR is determined based on a noise standard deviation $\sigma$. The noise standard deviation $\sigma$ is found by the function $\sigma$=fs(x) when a pixel charge x and the ISO speed s are determined. It should be noted that the luminance value of that pixel is determined commensurate with the pixel charge x.

Figure 19:
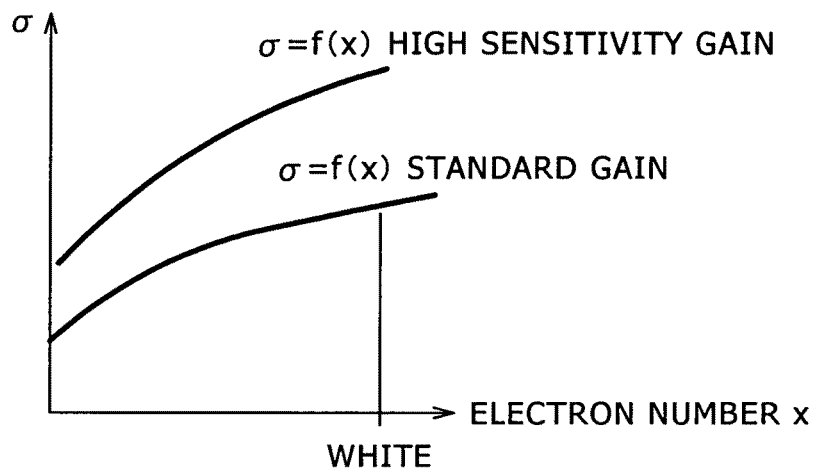
FIG. 19 is a diagram illustrating examples of functions adapted to find a standard deviation a of a noise signal.

FIG. 19 is a diagram illustrating examples of the above function having the standard deviation $\sigma$ of noise on the vertical axis and the electron number x on the horizontal axis. In FIG. 19, two functions, one for a high sensitivity gain and another for a standard gain, are shown as examples.

In the NR process, on the other hand, an image quality factor set by the device designer, for example, is taken into consideration in the calculation of the threshold $\epsilon$NR. Assuming that the image quality factor for the ISO speed s is g(x,s), the threshold of the NR process is calculated by the function $\epsilon$NR=g(x,s)×fs(x).

Figure 20:
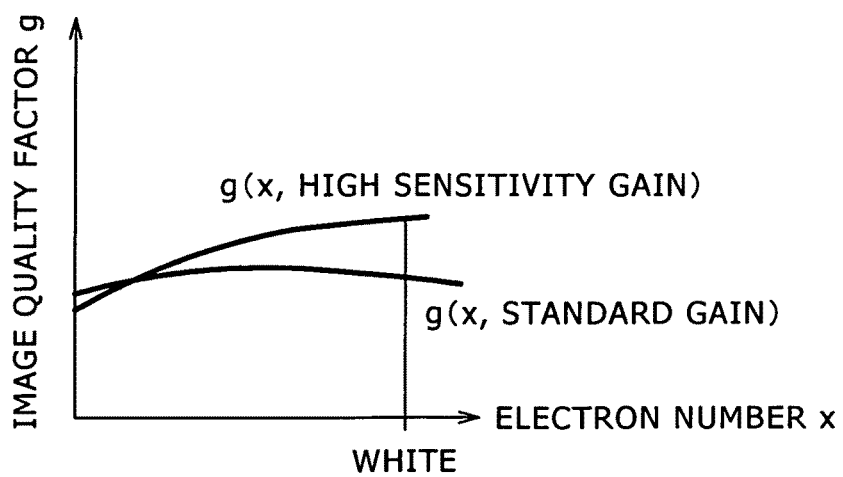
FIG. 20 is a diagram illustrating examples of a function adapted to find an image quality factor.

FIG. 20 is a diagram illustrating examples of the above function g(x,s) having the image quality factor g on the vertical axis and the electron number x on the horizontal axis. In this example, two functions, one for a high sensitivity gain and another for a standard gain, are shown as examples.

In the present embodiment, a threshold $\epsilon$NRmod reflecting the effect of the gain is found by the equation given below to allow the NR process section 70 to proceed with the NR process using the threshold $\epsilon$NRmod.

$$\epsilon\text{NRmod}=g(\text{Gain}\times x,\text{Gain}\times s)/\text{Gain}\times fs(x)$$

Here, a variable Gain is a gain determined based on the correction gain LUT 72.

The above procedure ensures an optimal NR process in consideration of the multiplication by a gain in any area of the image.

The NR process section 70 subjects the RGB signal to an NR process using the threshold $\epsilon$NRmod that is determined as described above, generating a signal RGBNR as an output signal and supplying the signal RGBNR to the RGB modulation section 71.

The RGB modulation section 71 modulates the signal RGBNR from the NR process section 70 based on the signal from the adder 69, outputting a signal RGBNRout obtained by the equation shown below as a signal representing the result of the process performed by the grayscale compression section 34.

$$\text{RGBNRout}=(Yout/Y)\times\text{RGBNR}$$

Here, the signals Yout and Y are linear signals generated respectively by the reverse conversion processes of the non-linear conversion process of the signals Y'out and Y' performed by the perception equalization section 62. That is, the RGB signal of the image fed to the grayscale compression section 34 is converted to the signal Y representing the brightness by a luminance signal generating section 61, and the image is subjected to grayscale compression based on the signal Y. Then, the image subjected to grayscale compression is output from the grayscale compression section 34, serving again as the RGB signal (signal RGBNRout).

A description will be given next of the imaging process of the imaging device 10 with reference to the flowchart shown in FIG. 21.

In step S11, the imaging device 10 captures a preparatory image. This capture of a preparatory image is intended to set a variety of parameters of the imaging device 10 ahead of the capture of a definitive image to be recorded.

In step S12, the imaging device 10 subjects the signal output from the CCD 31 of FIG. 1 following the process in step S11 to the process of the white balance section 32 first. Then, the demosaicing section 33 converts the resultant signal to an RGB signal and outputs the RGB signal to the grayscale compression section 34.

In step S13, the luminance signal generating section 61 shown in FIG. 2 extracts the signal Y that represents the brightness in consideration of the reflectance of the object from the RGB signal fed to the grayscale compression section 34. It should be noted that, at this time, the perception equalization section 62 nonlinearly converts the signal Y to generate a perceptibly equal brightness signal Y' so as to ensure signal processing that matches human perception in the subsequent detection process and low-pass filtering process.

Figure 22:
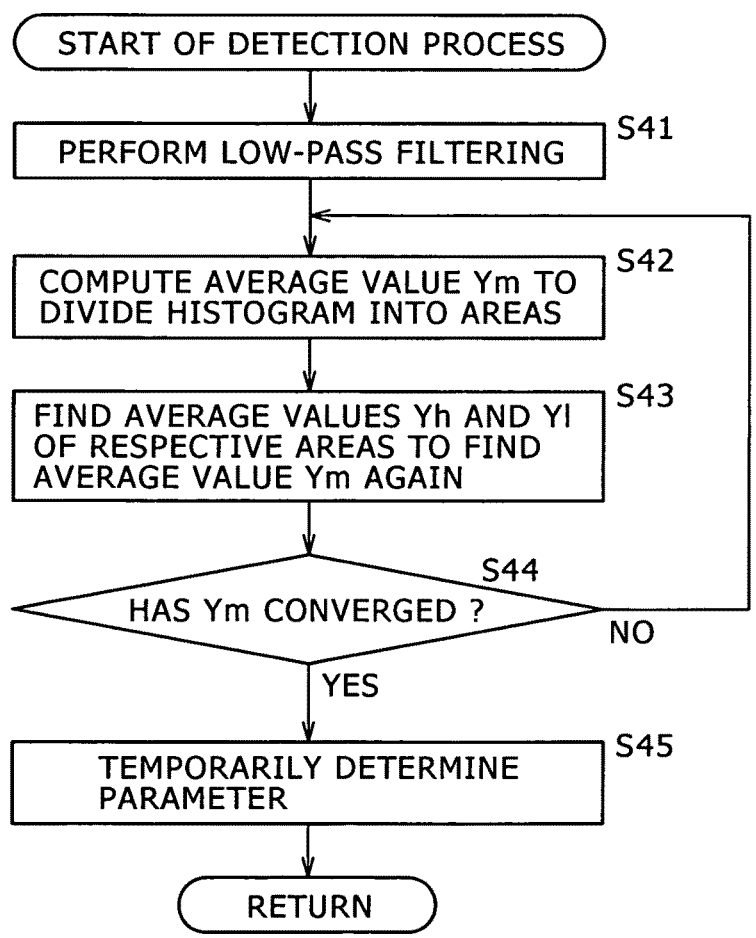
FIG. 22 is a flowchart describing an example of a detection process.

In step S14, the detection section 63 proceeds with the detection process which will be described later with reference to FIG. 22. This allows the detection section 63 to subject the signal Y' to the detection process.

A detailed description will be given, here of the detection process in step S14 of FIG. 21 with reference to the flowchart shown in FIG. 22.

In step S41, the detection section 63 subjects the input signal (signal Y') to a low-pass filtering process. This removes the component higher in frequency than the preset level from the image.

In step S42, the detection section 63 computes the average value Ym to divide the image into two areas. In step S43, the detection section 63 computes the average values Yh and Yl for the two areas to compute the average value Ym again.

In step S44, the detection section 63 determines whether the value Ym has converged. The detection section 63 repeats steps S42 to S44 until the detection section 63 determines that the value Ym has converged.

These process steps are performed as described above with reference to FIG. 3.

If it is determined in step S44 that the value Ym has converged, the process proceeds to step S45.

The detection section 63 temporarily determines the exposure parameter in step S45.

The detection process is performed as described above.

Referring back to FIG. 21, in step S15 following the process in step S14, the control MPU 64 counts the number of pixels having a value equal to or greater than the saturation level and determines, based on this number of pixels, whether the imaging exposure is appropriate.

If it is determined in step S15 that the exposure is not appropriate, the process returns to step S11 where the imaging device 10 is, for example, controlled by the control MPU 64 to reduce the exposure and capture a preparatory image again.

If it is determined in step S15 that the exposure is appropriate, the process proceeds to step S16.

In step S16, the control MPU 64 finally determines the exposure parameters such as the adaptation gains kAr and kBr. At this time, the threshold $\epsilon$ supplied to the edge-preserving LPF 65 is also set as a parameter. At this time, on the other hand, the exposure value EVh obtained based on the average value Yh found by the detection process in step S14 may be set anew as a default exposure value. The reason for this is that if an image is captured using an exposure level commensurate with the bright area, it is possible to prevent noise in the image from becoming excessively enhanced. In this case, the adaptation gains kAr and kBr are found anew to finally determine the exposure parameters.

Thanks to the adaptation gains kAr and kBr obtained, on the other hand, the control MPU 64 sets the correction gain LUT 72 at this time, thus specifically generating, for example, the line 411 shown in FIG. 17. The line 411 associates the lighting intensity with the gain.

The imaging device 10 captures a definitive image in step S17. As a result, the signal output from the CCD 31 undergoes the process of the white balance section 32 first. Then, the resultant signal is converted by the demosaicing section 33 to an RGB signal which is output to the grayscale compression section 34.

Figure 23:
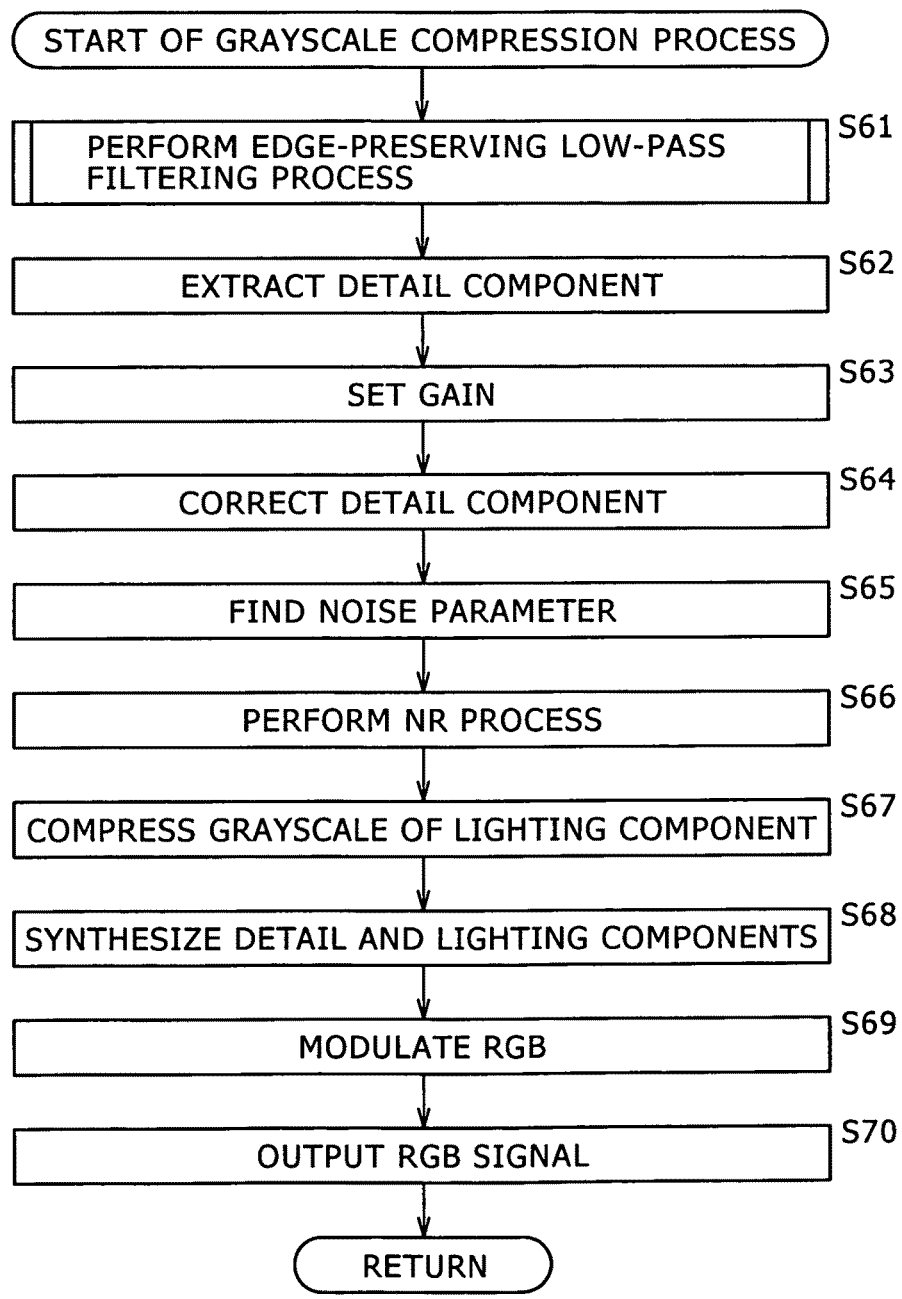
FIG. 23 is a flowchart describing an example of a grayscale compression process.

In step S18, the grayscale compression section 34 proceeds with the grayscale compression process which will be described later with reference to the flowchart shown in FIG. 23.

In step S19, the imaging device 10 performs a variety of predetermined signal processing tasks. These processes are associated with those handled by the linear matrix section 35, RGB gamma correction section 36, BT.601 matrix section 37, Y gamma correction section 38 and color difference matrix section 39 shown in FIG. 1.

In step S20, the device color gamut compression section 40 proceeds with a color gamut compression process, for example, according to the color gamut of the output device. As described above, the color gamut compression process is performed after the grayscale compression (step S18) in the present embodiment, thus preventing problems such as a flat-looking image resulting from loss of part of color grayscale or deviation in tint.

Then, in step S21, the image data output from the device color gamut compression section 40 is stored in the storage file 41.

The imaging process is performed as described above.

A detailed description will be given next of the grayscale compression process in step S18 shown in FIG. 21 with reference to the flowchart shown in FIG. 23.

Figure 24:
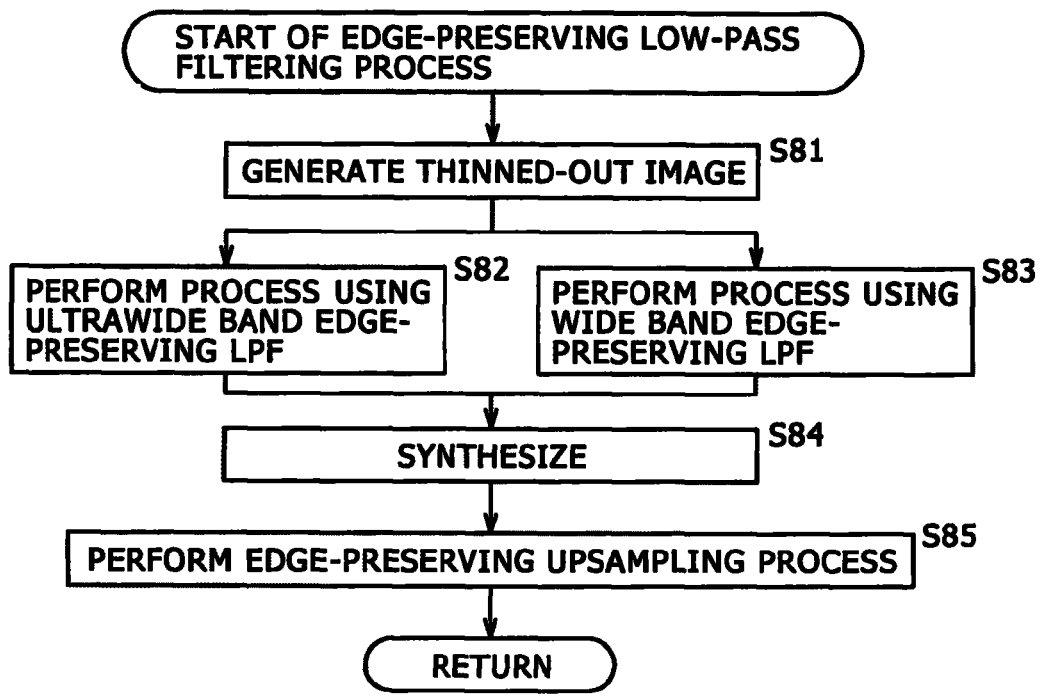
FIG. 24 is a flowchart describing an example of an edge-preserving low-pass filtering process.

In step S61, the process of the edge-preserving LPF 65 is performed which will be described later with reference to FIG. 24.

A detailed description will be given here of the edge-preserving low-pass filtering process in step S61 of FIG. 23 with reference to the flowchart shown in FIG. 24.

In step S81, the downsampler 351 thins out the pixels from the image of the signal Y' fed to the edge-preserving LPF 65, thus producing an image with fewer pixels and storing the image in the buffer 352. At this time, an image as illustrated, for example, in FIG. 12, is generated whose number of pixels has been thinned out to one sixteenth of that of the original image. As a result, an image as illustrated in FIG. 13 is stored in the buffer 352.

In steps S82 and S83, the image stored in the buffer 352 is supplied to the multiscale filter 353 where the image is subjected to the processes of the ultrawide band edge-preserving LPF 361 and wide band edge-preserving LPF 362. Then, in step S84, the two signals, one subjected to the process of the ultrawide band edge-preserving LPF 361 and another to the process of the wide band edge-preserving LPF 362, are combined by the adder 363 and stored in the buffer 354.

In step S85, the image stored in the buffer 354 is supplied to the edge-preserving upsampler 356 where the image undergoes an edge-preserving upsampling process. At this time, as described above with reference to FIG. 16, for example, the difference between two images, the image with edge bluntness as a result of the simple increase in pixel count and the original image, is extracted. The extracted difference signal is subjected to a process adapted to remove the edge bluntness. Then, the resultant signal is combined with the original image to produce an image increased in pixel count.

The edge-preserving low-pass filtering process is performed as described above.

Referring back to FIG. 23, following the process in step S61, the detail extraction section 66 computes the difference between the signal Y' and lighting component signal Y'lp in step S62, thus extracting the detail component signal Y'de of the image of the signal Y' and supplying the detail component signal Y'de to the detail adjustment section 67.

In step S63, the detail adjustment section 67 sets a gain based on the correction gain LUT 72. At this time, the gain is set based on the lighting component signal Y'lp as described above with reference to FIG. 17.

In step S64, the detail adjustment section 67 corrects the detail component of the image by multiplying the detail component signal Y'de by the gain set in the process in step S63.

In step S65, the NR process section 70 finds the threshold ∈NRmod reflecting the effect of the gain as described above and sets a noise parameter based on the threshold ∈NRmod.

In step S66, the NR process is performed based on the noise parameter set in the process in step S65. At this time, the signal RGBNR is supplied to the RGB modulation section 71 as an output signal.

In step S67, the tone curve process section 68 subjects the lighting component signal Y'lp to grayscale compression by multiplying the value of the lighting component signal Y'lp by the gain determined as a tone curve commensurate with the lighting component signal Y'lp.

In step S68, the adder 69 combines two signals, one from the detail adjustment section 67 following the process in step S64 and another from the tone curve process section 68 following the process in step S67, and supplies the resultant signal to the RGB modulation section 71 as the signal Y'out.

In step S69, the RGB modulation section 71 modulates the signal RGBNR supplied from the NR process section 70 based on the signal supplied from the adder 69 following the process in step S68.

In step S70, the signal RGBNRout is output as a signal representing the result of the process in step S69 and also as a signal representing the result of the process performed by the grayscale compression section 34.

The grayscale compression is performed as described above. This ensures proper compression of the input signal contrast, thus providing an image rich in sense of detail both in the bright and dark areas.

Further, if only the detail component is enhanced by the process of the detail adjustment section 67 without performing the process of the tone curve process section 68, it is possible to provide improved viewing of the image on an area-by-area basis while maintaining the input image contrast unchanged.

Incidentally, in the signal processing of a conventional digital still camera, for example, a more or less global grayscale compression is performed by adjusting the grayscale curve in the high luminance area of the RAW signal (imager output signal). The imaging exposure is determined according to the global grayscale compression. If a different grayscale compression process is further added, the relationship between the imaging exposure setting and grayscale curve is disturbed, making it impossible to generate an image as intended. In addition to the above, noise reduction is not as effective as expected, resulting in a poorer sense of noise. If the present invention is applied to an imaging device such as a digital still camera capable of performing a more or less global grayscale compression by adjusting the grayscale curve in the high luminance area of the RAW signal, it is efficient to perform the common camera signal processing and the processes of the present embodiment in relation to each other in the manner described below.

In the conventional camera signal processing, the RGB signal and signal Y (luminance signal) are subjected to gamma correction commensurate with a value DRIN representing the dynamic range of the input signal, thus compressing the dynamic range through knee compression of the high luminance area of the image.

Figure 25:
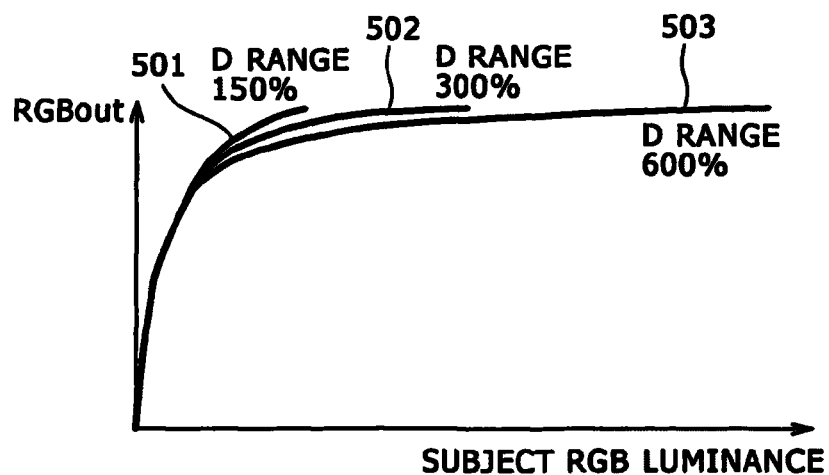
FIG. 25 is a diagram illustrating an example of RGB gamma correction in a conventional grayscale compression process.

FIG. 25 is a diagram illustrating an example of RGB gamma correction in a conventional grayscale compression process. As illustrated in the same figure, lines 501 to 503 illustrate the characteristics of the output value (RGBout) of the RGB signal after the correction commensurate with the subject luminance respectively when the value DRIN representing the dynamic range of the input signal is 150% (D range: 150%), 300% (D range: 300%) and 600% (D range: 600%).

Figure 26:
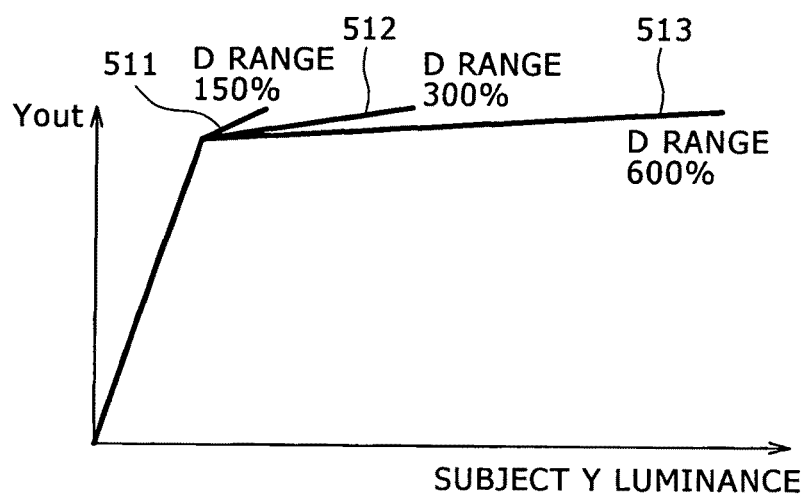
FIG. 26 is a diagram illustrating an example of Y gamma correction in a conventional grayscale compression process.

FIG. 26 is a diagram illustrating an example of Y gamma correction in a conventional grayscale compression process. As illustrated in the same figure, lines 511 to 513 illustrate the characteristics of the output value (Yout) of the signal Y after the correction commensurate with the subject luminance respectively when the value DRIN representing the dynamic range of the input signal is 150% (D range: 150%), 300% (D range: 300%) and 600% (D range: 600%).

Such a signal correction is performed, for example, based on the RGB gamma table and Y gamma table stored in the internal memory of the camera.

In a digital still camera or the like capable of performing a global grayscale compression by adjusting the grayscale curve in the high luminance area when the RAW signal is developed, the input signal is automatically corrected as illustrated in FIGS. 25 and 26.

If the processes described above with reference to FIGS. 1 to 24 are added, for example, to a digital still camera or the like capable of performing a global grayscale compression by adjusting the grayscale curve in the high luminance area when the RAW signal is developed, that is, if the present invention is applied, for example, to a digital still camera adapted to correct the input signal as illustrated in FIGS. 25 and 26 during the process in step S19 of FIG. 21, it is only necessary to set up the RGB gamma and Y gamma tables with the dynamic range set to (kBr/kAr)×DRIN.

Figure 21:
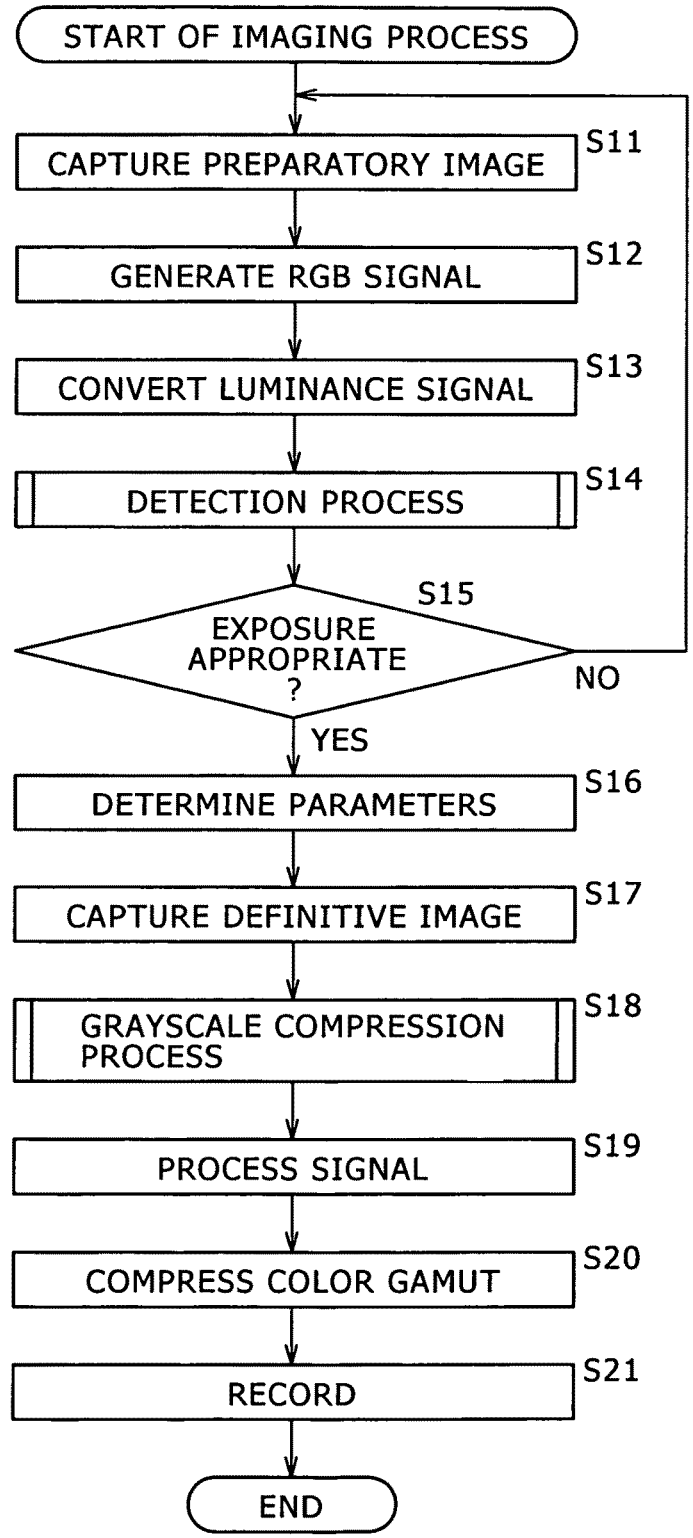
FIG. 21 is a flowchart describing an example of an imaging process.

The reason for this is that the dynamic range DRIN of the input image has been compressed by kBr/kAr-fold as a result of the process in step S18 of FIG. 21.

Figure 27:
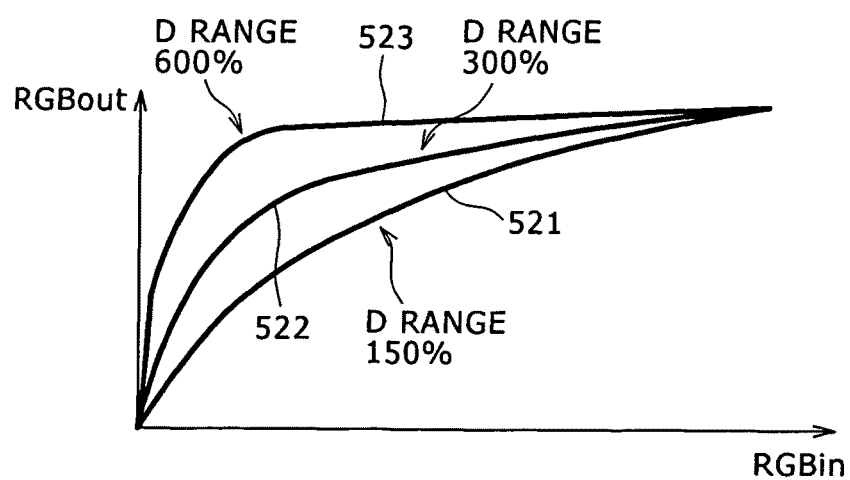
FIG. 27 is a diagram illustrating an example of an RGB gamma table used in the present invention.
Figure 28:
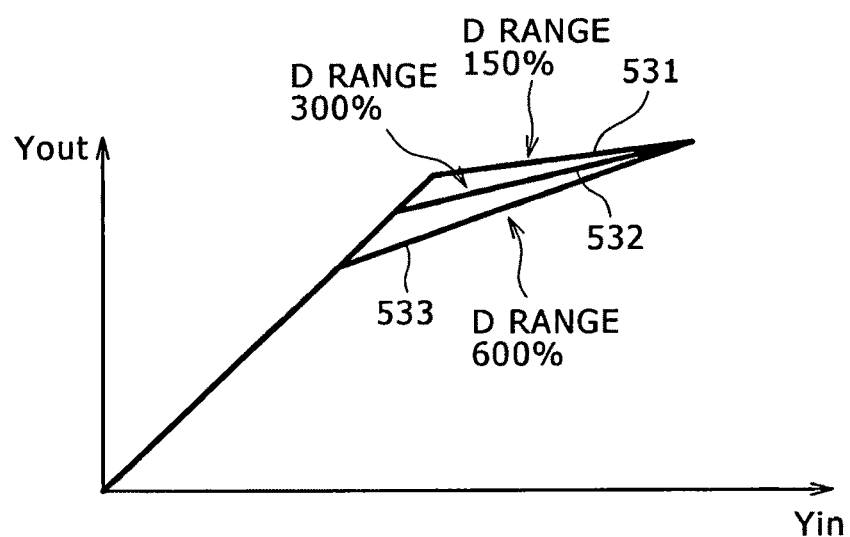
FIG. 28 is a diagram illustrating an example of a Y gamma table used in the present invention.

FIGS. 27 and 28 are diagrams illustrating examples of RGB gamma and Y gamma tables with the dynamic range set to (kBr/kAr)×DRIN.

FIG. 27 shows the input value (RGBin) of the RGB signal on the horizontal axis and the output value (RGBout) of the RGB signal on the vertical axis. Lines 521 to 523 illustrate the characteristics of the output value of the RGB signal after the correction commensurate with the input value of the RGB signal respectively when the value DRIN representing the dynamic range of the input signal is 150% (D range: 150%), 300% (D range: 300%) and 600% (D range: 600%).

FIG. 28 shows the input value (Yin) of the signal Y on the horizontal axis and the output value (Yout) of the signal Y on the vertical axis. Lines 531 to 533 illustrate the characteristics of the output value of the signal Y after the correction commensurate with the input value of the signal Y respectively when the value DRIN representing the dynamic range of the input signal is 150% (D range: 150%), 300% (D range: 300%) and 600% (D range: 600%).

Thus, if the RGB and Y gamma tables are set up again (corrected) based on the adaptation gains kBr and kAr, it is possible to apply the present invention to a conventional digital still camera or the like without significantly modifying the configuration thereof.

Thus, in order to correct the RGB and Y gamma tables, it is only necessary to supply the signals, one representing the adaptation gain kBr and another the adaptation gain kAr, from the grayscale compression section 34 to the RGB gamma correction section 36 and Y gamma correction section 38 via unshown buses of the imaging device 10 so that the RGB and Y gamma tables are corrected respectively by the RGB gamma correction section 36 and Y gamma correction section 38.

Incidentally, the tone curve process section 68 multiplies the lighting component signal Y'lp by the gain that is determined as a tone curve commensurate with the value of the lighting component signal Y'lp so as to subject the lighting component signal Y'lp to grayscale compression, as described above. This tone curve is determined in relation to the correction gain LUT 72.

We assume now that, in a tone curve, the device designer does not set any desired typical value and that the value of the signal, generated by the adder 69 combining two signals, is Y'out, the equation shown below holds.

$$Y\text{out}=\text{ToneCurve}(Y'lp)+\text{DetailGain}(Y'lp)\times Y'de=Y'lp\times \text{DetailGain}(Y'lp)+\text{DetailGain}(Y'lp)\times Y'de=\text{DetailGain}(Y'lp)\times(Y'lp+Y'de)$$

That is, if the tone curve of the tone curve process section 68 is completely related to the correction gain LUT 72, the signal, generated by the adder 69 combining two signals, is obtained by simply multiplying the signal Y' (=Y'lp+Y'de), i.e., the original image, by the gain (DetailGain(Y'lp)) determined by the correction gain LUT 72.

If the tone curve of the tone curve process section 68 is completely related to the correction gain LUT 72, it is possible to commonize the tone curve process section 68 and detail adjustment section 67, thus providing an even simpler configuration of the device.

If the grayscale compression is performed by the grayscale compression section 34 configured as described above with reference to FIG. 2, two difference gains are used as multipliers for the lighting component and detail component of the image. That is, if the characteristic of the signal obtained by the grayscale compression of the lighting component is shown by a line 552 in FIG. 29, the characteristic of the signal obtained by the grayscale compression of the detail component is shown by a line 551 in FIG. 29.

Figure 29:
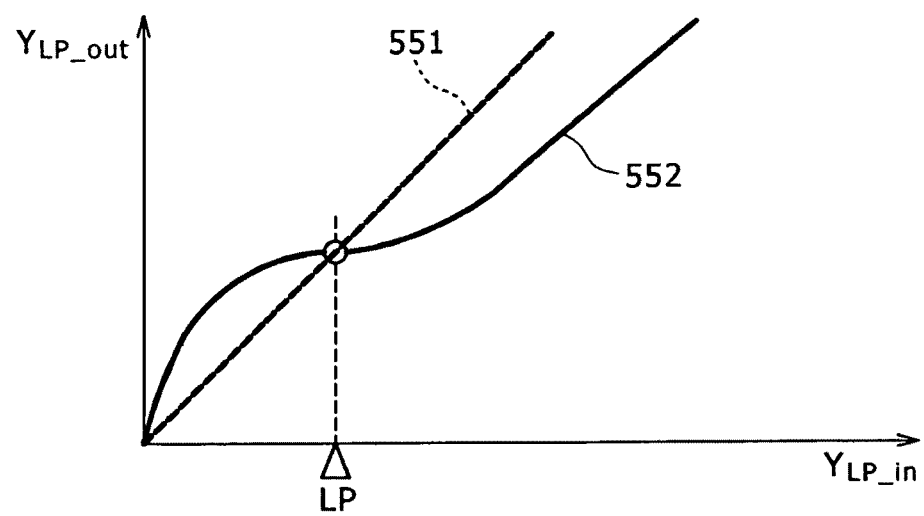
FIG. 29 is a diagram describing grayscale compression of a lighting component and that of a detail component.

FIG. 29 shows an input value Y'lpin of the lighting component signal Y'lp on the horizontal axis and an output value Y'lpout of the lighting component signal Y'lp to be output after grayscale compression on the vertical axis. If a graph showing the input value of the detail component signal on the horizontal axis and the output value of the detail component signal to be output after grayscale compression on the vertical axis is overlaid on the graph of FIG. 29, the characteristic shown by a line 551 is obtained.

The fact that the tone curve of the tone curve process section 68 is completely related to the correction gain LUT 72 means that the characteristic of the output value of the detail component signal originally shown by the line 511 is similar to that shown by the line 552 in FIG. 29.

Figure 30:
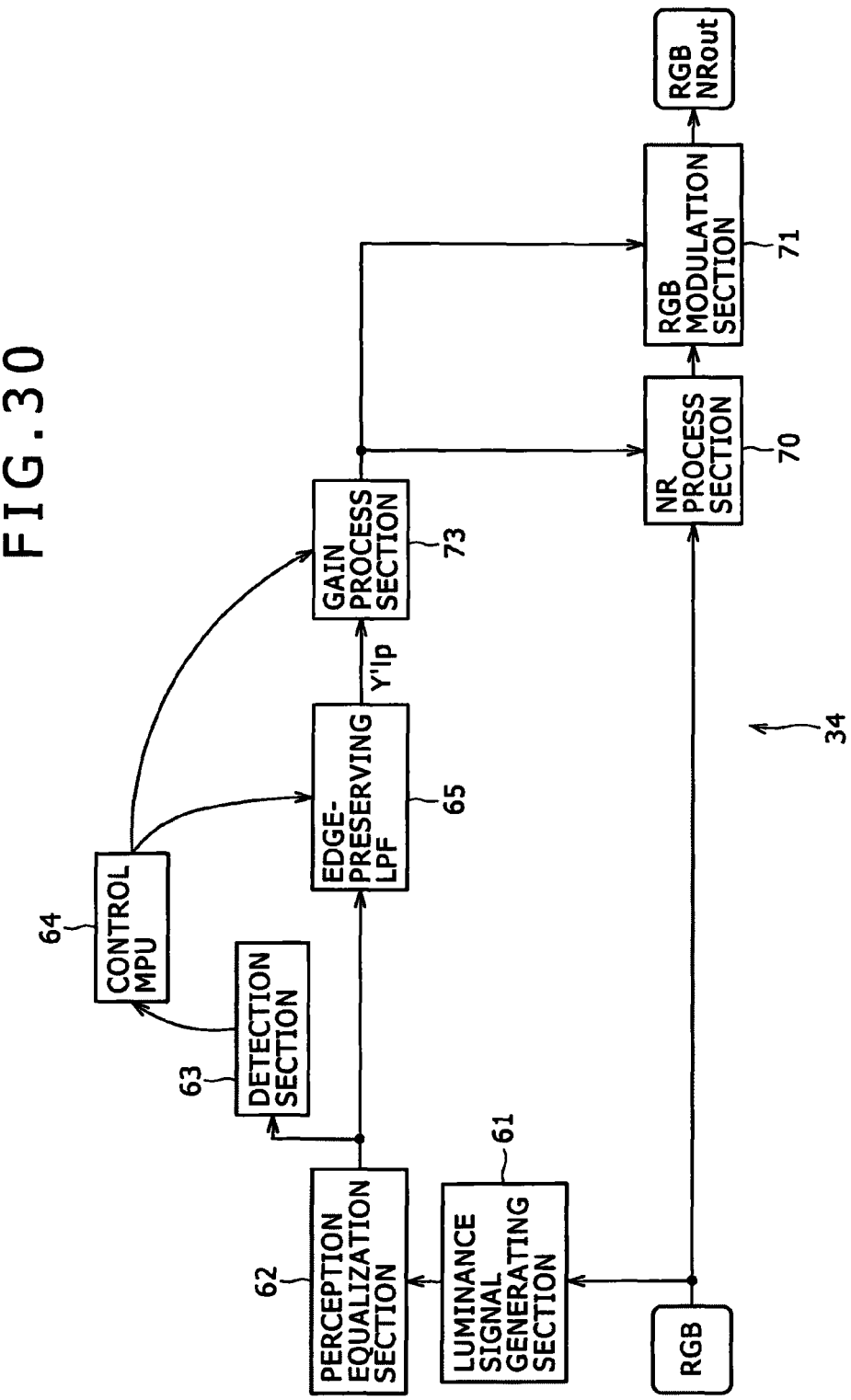
FIG. 30 is a diagram illustrating another detailed configuration example of the grayscale compression section shown in FIG. 1.

FIG. 30 is a diagram illustrating another detailed configuration example of the grayscale compression section 34 shown in FIG. 1. This figure shows an example of the grayscale compression section 34 with a simpler configuration than that shown in FIG. 2.

The detailed description of the luminance signal generating section 61 to edge-preserving LPF 65 in the same figure is omitted because they are the same as those described above with reference to FIG. 2.

Unlike the grayscale compression section 34 shown in FIG. 2, the grayscale compression section 34 shown in FIG. 30 is devoid of the detail adjustment section 67, tone curve process section 68 and adder 69 but has a gain process section 73. Incorporating a LUT similar to the correction gain LUT 72, the gain process section 73 identifies the gain commensurate with the lighting component signal Y'lp output from the edge-preserving LPF 65 based on the LUT and outputs the gain to the NR process section 70 and RGB modulation section 71.

In the example shown in FIG. 30, the output signal (gain) of the gain process section 73 is supplied to the NR process section 70. The NR process section 70 subjects the RGB signal to an NR process using the threshold εNRmod that is determined as described above, generating the signal RGBNR as an output signal and supplying the signal RGBNR to the RGB modulation section 71.

The RGB modulation section 71 multiplies the RGB signal by the gain from the gain process section 73. The RGB modulation section 71 also modulates the signal RGBNR from the NR process section 70, outputting the signal RGBNRout obtained by the equation shown below as a signal representing the result of the process performed by the grayscale compression section 34. In the case of the example shown in FIG. 30, the signal RGBNRout is expressed by the equation shown below.

$$RGBNRout = \{DetailGain(Y'lp)\}^{1/\gamma} \times RGBNR$$

where $\{\ \}^{1/\gamma}$ is the nonlinear-to-linear conversion.

Figure 31:
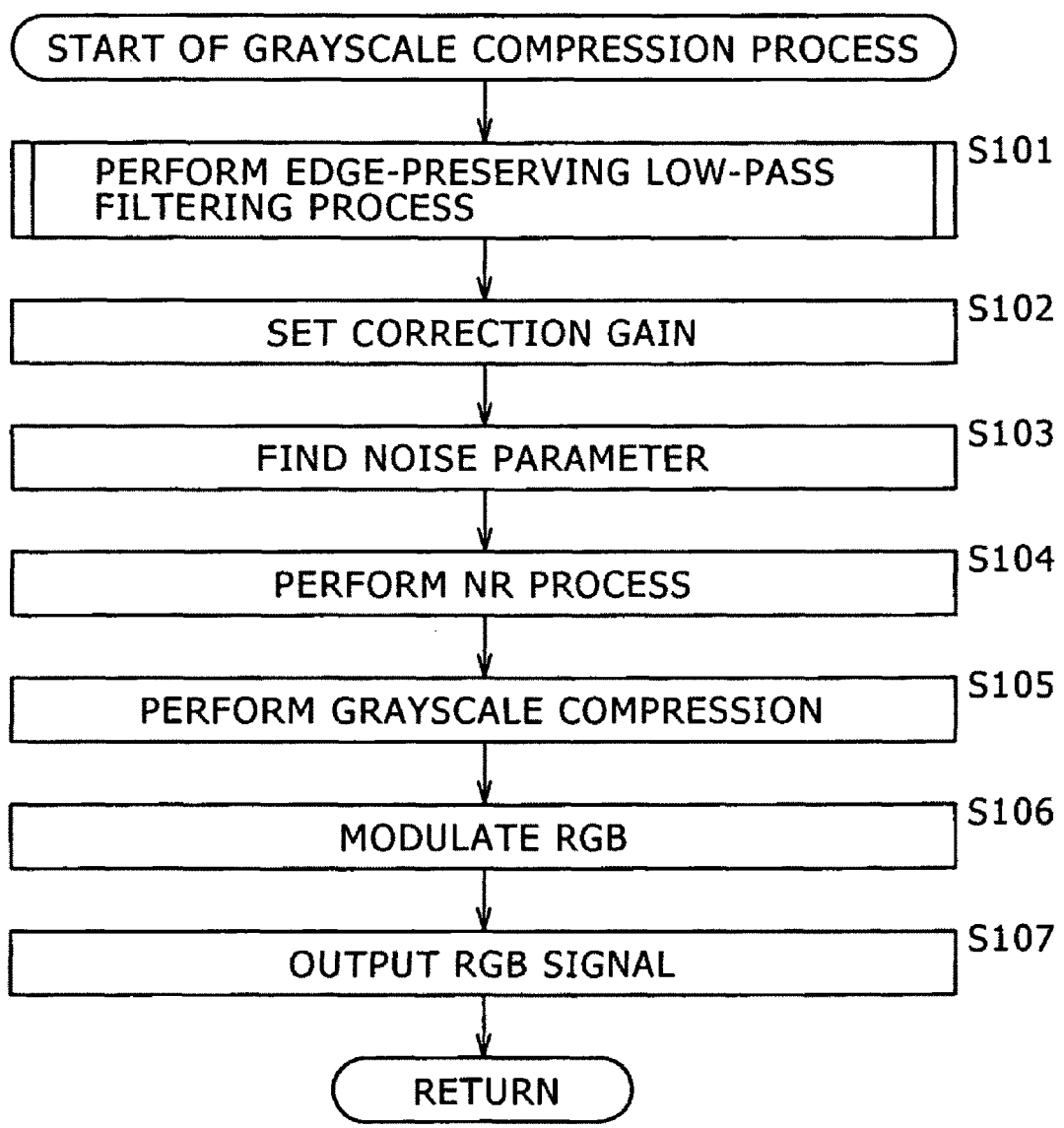
FIG. 31 is a flowchart describing an example of a grayscale compression process performed by the grayscale compression section shown in FIG. 30.

A description will be given next of an example of the grayscale compression process when the grayscale compression section 34 is configured as illustrated in FIG. 30 with reference to the flowchart illustrated in FIG. 31.

In step S101, the edge-preserving LPF 65 proceeds with the process. This process is identical to that described above with reference to the flowchart shown in FIG. 24. Therefore, the detailed description thereof is omitted.

In step S102, the gain process section 73 sets a gain based on the internal LUT. At this time, the gain is set based on the value of the lighting component signal Y'lp as described above with reference to FIG. 17.

In step S103, the NR process section 70 finds the threshold εNRmod reflecting the effect of the gain as described above and sets a noise parameter based on the threshold εNRmod.

In step S104, the NR process is performed based on the noise parameter set in the process in step S103. At this time, the signal RGBNR is supplied to the RGB modulation section 71 as an output signal.

In step S105, the RGB modulation section 71 multiplies the RGB signal (i.e., lighting component signal Y'lp+detail component signal Y'de) by the gain set in the process in step S102, thus performing grayscale compression.

In step S106, the RGB modulation section 71 modulates the signal RGBNR from the NR process section 70 based on the signal from the gain process section 73.

Then, in step S107, the signal RGBNRout is output as a signal representing the result of the process performed by the grayscale compression section 34.

The grayscale compression process is performed as described above. This ensures proper compression of the input signal contrast, thus providing an image rich in sense of detail across the entire grayscale and simplifying the process as compared to the case shown in FIG. 23.

Further, the present embodiment provides improved quality of the image obtained, for example, by a conventional RGB tone curve process. A conventional RGB tone curve process may lead, for example, to loss of detail as a result of a global grayscale compression or deviation in tint as a result of nonlinear processing of the RGB signal, thus resulting in degraded image quality.

For example, the lighting and detail components are extracted from an image using the edge-preserving LPF 65 and detail extraction section 66 according to the present embodiment. Then, a local process is performed in which the lighting and detail components of the image are subjected to different tone curve processes (grayscale correction processes) based on a preset tone curve in a conventional RGB tone curve process. This provides improved quality of the image as compared to a conventional RGB tone curve process.

In this case, when the gain of the preset tone curve given in a conventional RGB tone curve process is denoted by UserToneCurve(Y'), the gain DetailGain(Y'lp) by which the detail component is to be multiplied is found by the equation shown below.

$$DetailGain(Y'lp) = UserToneCurve(Y'lp)/Y'lp$$

Then, the gain ToneCurve(Y'lp) by which the lighting component is to be multiplied need only be found by the equation shown below.

$$ToneCurve(Y'lp) = UserToneCurve(Y'lp)$$

This readily provides improved quality of the image obtained by the tone curve process.

In FIG. 1, on the other hand, a description was given to the effect that the demosaicing section 33 converted (demosaiced) a mosaiced image into an RGB signal and output the RGB signal to the grayscale compression section 34. Alternatively, however, the mosaiced image signal, i.e., Bayer RAW signal, may be output 'as-is' to the grayscale compression section 34.

In this case, the luminance signal generating section 61 of the grayscale compression section 34 uses the RGB signal, obtained by interpolating the Bayer RAW signal, to generate the signal Y. The NR process section 70 proceeds with the NR process of the Bayer RAW signal. Then, the RGB modulation section 71 need only modulate the Bayer RAW signal rather than the RGB signal.

Figure 32:
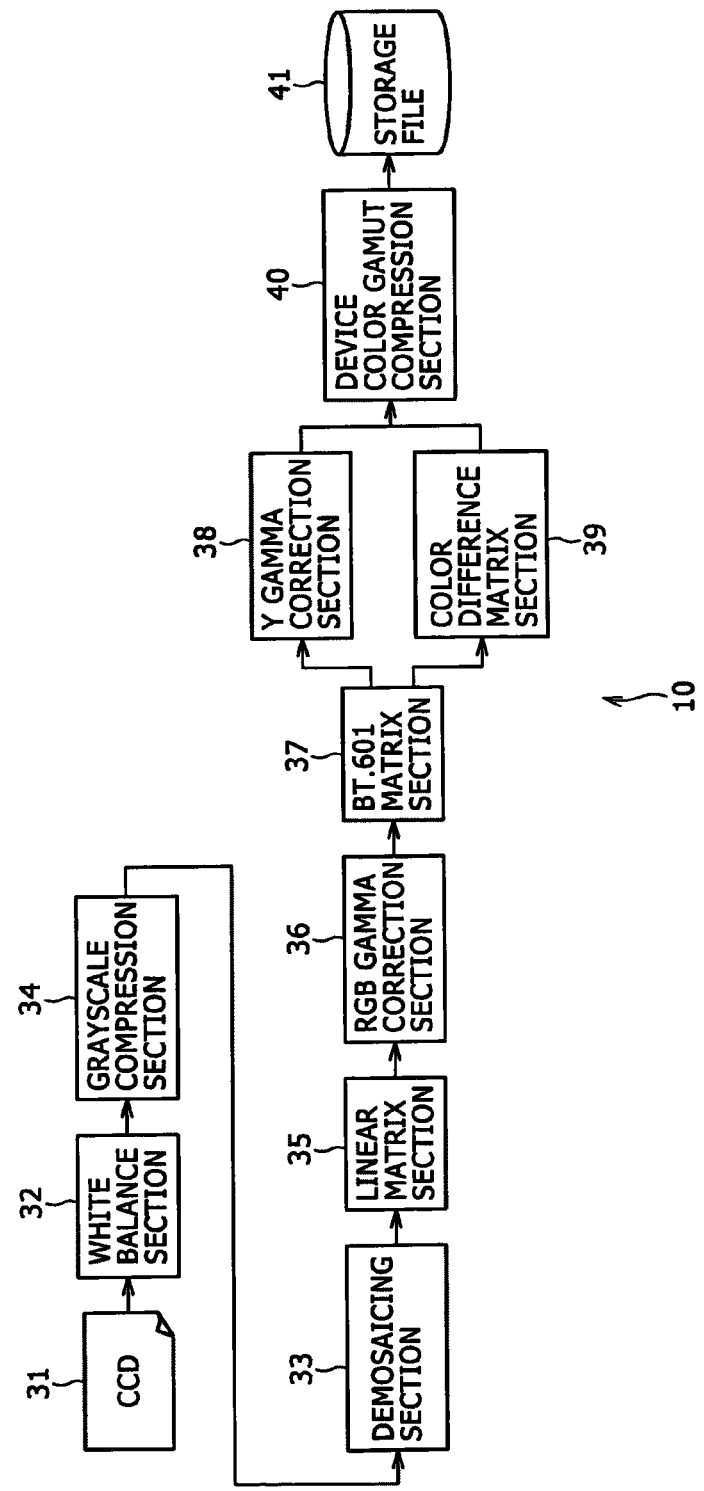
FIG. 32 is a diagram illustrating another configuration example of the imaging device according to the present invention.

If the Bayer RAW signal is output 'as-is' to the grayscale compression section 34, the imaging device 10 is configured as illustrated in FIG. 32. In FIG. 32, like parts as those in FIG. 1 are denoted by like reference numerals. In the example shown in FIG. 32, the grayscale compression section 34 is provided between the white balance section 32 and demosaicing section 33. The imaging device 10 shown in FIG. 32 is identical to that shown in FIG. 1 in all other respects.

Figure 33:
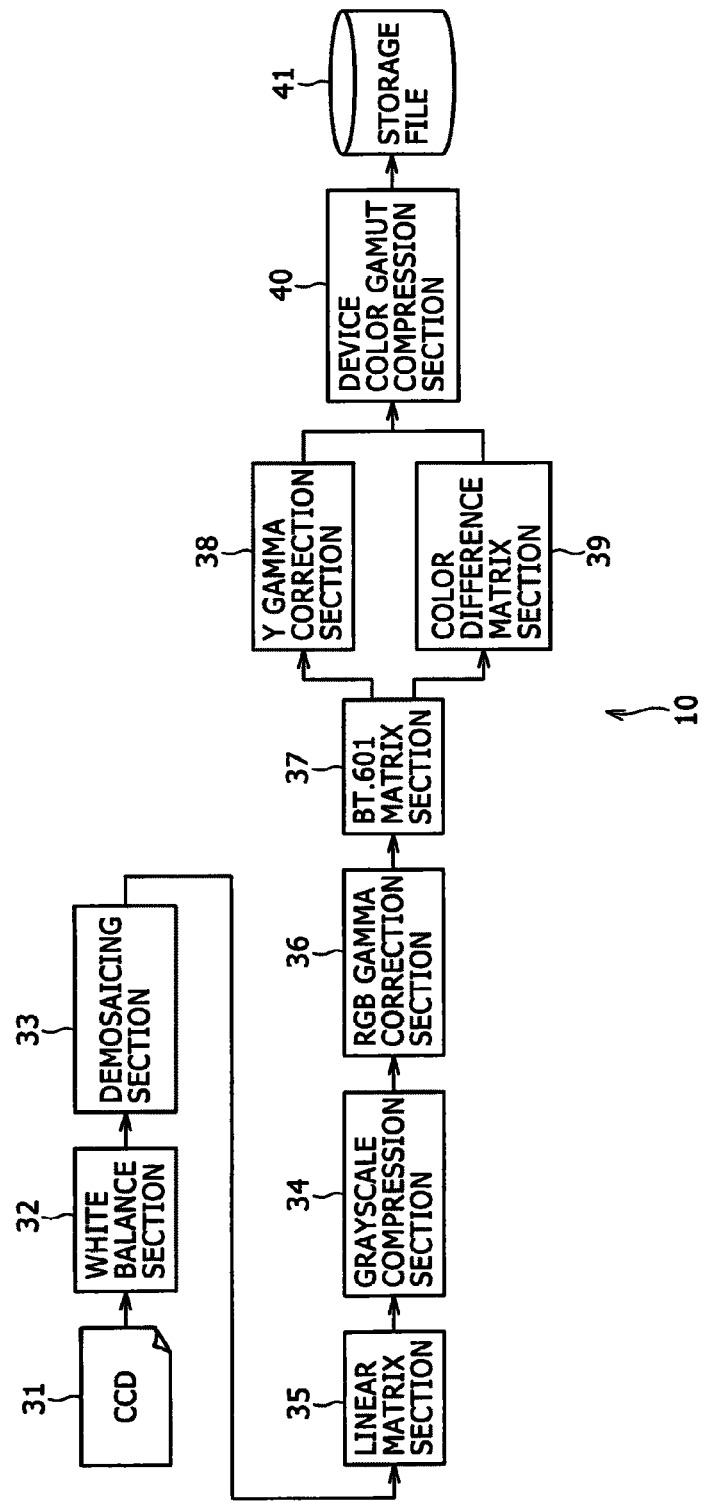
FIG. 33 is a diagram illustrating still another configuration example of the imaging device according to the present invention.

Alternatively, the imaging device 10 may be configured as illustrated in FIG. 33. In FIG. 33, like parts as those in FIG. 1 are denoted by like reference numerals. In the example shown in FIG. 33, the grayscale compression section 34 is provided between the linear matrix section 35 and RGB gamma correction section 36. The imaging device 10 shown in FIG. 33 is identical to that shown in FIG. 1 in all other respects.

Further, the imaging device 10 can be configured to perform the grayscale compression after the gamma correction. In this case, an ideal sRGB gamma correction is performed prior to the grayscale compression, and after that, the grayscale compression is performed. Then, following the grayscale compression, the gamma image quality and knee-compressed components are subjected to the correction by an RGB delta/gamma correction section.

Figure 34:
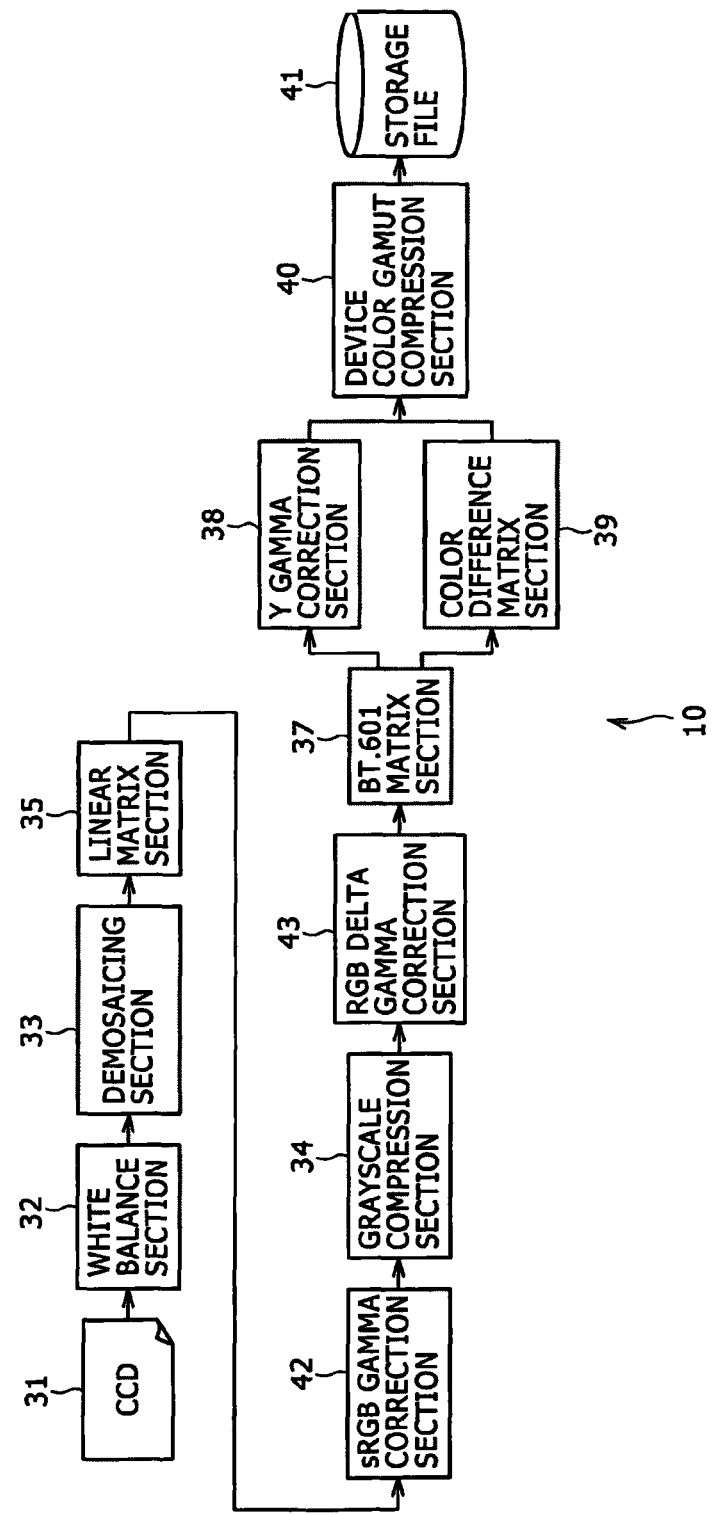
FIG. 34 is a diagram illustrating still another configuration example of the imaging device according to the present invention.

FIG. 34 is a diagram illustrating a configuration example of the imaging device 10 adapted to perform the grayscale compression after the gamma correction process. In FIG. 34, like parts as those in FIG. 1 are denoted by like reference numerals. Unlike the imaging device shown in FIG. 1, the imaging device 10 shown in the example of FIG. 34 is devoid of the RGB gamma correction section 36, but has an sRGB gamma correction section 42 and RGB delta/gamma correction section 43. The sRGB gamma correction section 42 performs an ideal sRGB gamma correction process. The RGB delta/gamma correction section 43 corrects the gamma image quality and knee-compressed components. In FIG. 34, the grayscale compression section 34 is provided between the sRGB gamma correction section 42 and RGB delta/gamma correction section 43. The imaging device 10 shown in FIG. 34 is identical to that shown in FIG. 1 in all other respects.

Figure 35:
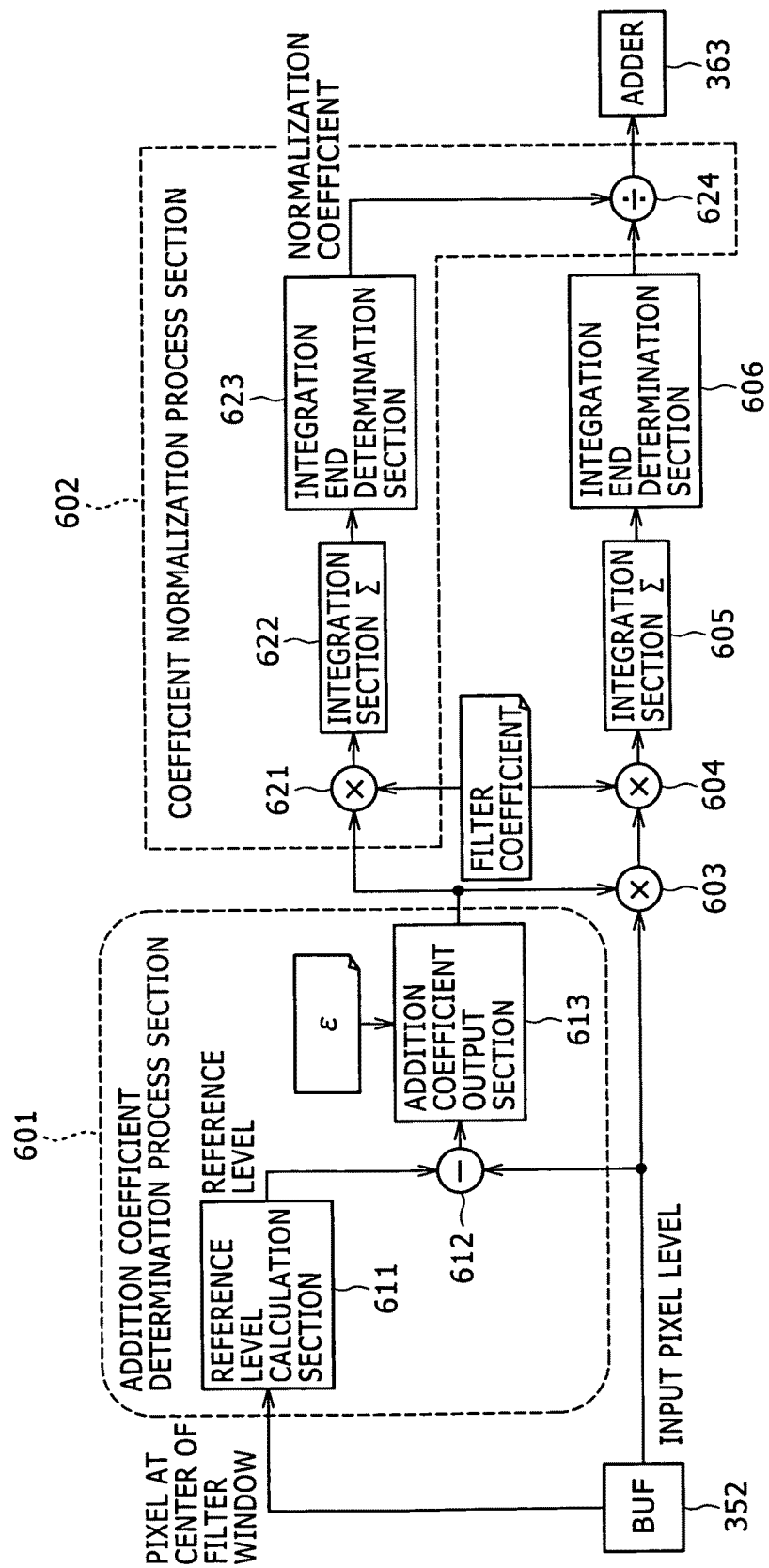
FIG. 35 is a block diagram illustrating a configuration example of the edge-preserving low-pass filter.

FIG. 35 is a block diagram illustrating a detailed configuration example of the ultrawide band edge-preserving LPF 361 or wide band edge-preserving LPF 362 shown in FIG. 11. As described above, the output signal from the buffer 352 is supplied to the ultrawide band edge-preserving LPF 361 or wide band edge-preserving LPF 362. The signal that has undergone the edge-preserving low-pass filtering process in one of these filters is output to the adder 363. These filters are designed to smooth all areas of the image other than the edges while keeping the edges intact.

It should be noted that, in the case of the edge-preserving LPF 65 shown in the block diagram of FIG. 2, a functional block including, for example, the downsampler 351 and edge-preserving upsampler 356, is called an edge-preserving LPF, for convenience of description as shown in FIG. 11. However, a filter is also called an edge-preserving LPF if the filter is capable of adjusting the proportion of the effect of the input value in the filter window on the output of the filtering process according to the difference between the input value and a given reference level (e.g., center value of the filter window), in addition to the functions of a common linear low-pass filter (LPF). That is, each of the filters configured as the ultrawide band edge-preserving LPF 361 or wide band edge-preserving LPF 362 in FIG. 11 may be called an edge-preserving LPF.

As illustrated in FIG. 35, the ultrawide band edge-preserving LPF 361 or wide band edge-preserving LPF 362 in FIG. 11 (simply referred to as the edge-preserving LPF here) includes an addition coefficient determination process section 601, coefficient normalization process section 602, multipliers 603 and 604, integration section 605 and integration end determination section 606.

The pixel at the center of the filter window in the image stored in the buffer 352 is supplied to a reference level calculation section 611 of the addition coefficient determination process section 601. The reference level calculation section 611 calculates the reference level based on the value of the supplied pixel. For example, the pixel value at the center of the filter window is used 'as-is' as a reference level as described above with reference to FIG. 9.

The reference level output from the reference level calculation section 611 is supplied to a subtractor 612. The subtractor 612 calculates the difference between each of the pixel values fed to this edge-preserving LPF and the reference level and supplies the calculation result to an addition coefficient output section 613.

The addition coefficient output section 613 outputs an addition coefficient based on the output value of the subtractor 612 and the threshold E supplied from the control MPU 64 shown in FIG. 2. The addition coefficient is a weight in the signal direction for use in the filtering process of the edge-preserving LPF. Put another way, this coefficient is a range filter coefficient. At this time, the addition coefficient is output, for example, as illustrated in FIG. 36.

Figure 36:
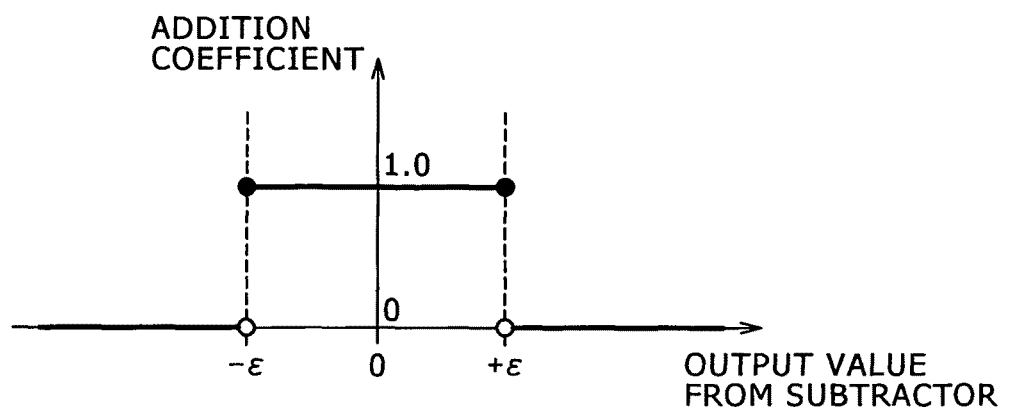
FIG. 36 is a diagram describing an addition coefficient.

FIG. 36 is a graph showing the output value from the subtractor 612 on the horizontal axis and the addition coefficient output from the addition coefficient output section 613 on the vertical axis. As illustrated in the same figure, the addition coefficient output section 613 outputs a value of 1 as an addition coefficient when the output value from the subtractor 612 (i.e., difference between each of the pixel values and the reference level) falls within the range between $+\epsilon$ and $-\epsilon$. On the other hand, the addition coefficient output section 613 outputs a value of 0 as an addition coefficient when the output value from the subtractor 612 falls outside the range between $+\epsilon$ and $-\epsilon$.

The multiplier 603 multiplies the addition coefficient output from the addition coefficient output section 613 and each of the pixel values fed to the edge-preserving LPF. The multiplication of the addition coefficient by the multiplier 603 prevents the pixel values, the difference between which and the reference level, does not fall within the range between $+\epsilon$ and $-\epsilon$, from being supplied to the multiplier 604.

The multiplier 604 multiplies the output value from the multiplier 603 and a filter coefficient. The filter coefficient is a weight in the spatial direction for use in the filtering process of the edge-preserving LPF. Put another way, this coefficient is a domain filter coefficient. Here, the filter coefficient to be multiplied is determined commensurate with the distance between the pixel of interest and the pixel at the center of the filter window.

Figure 37:
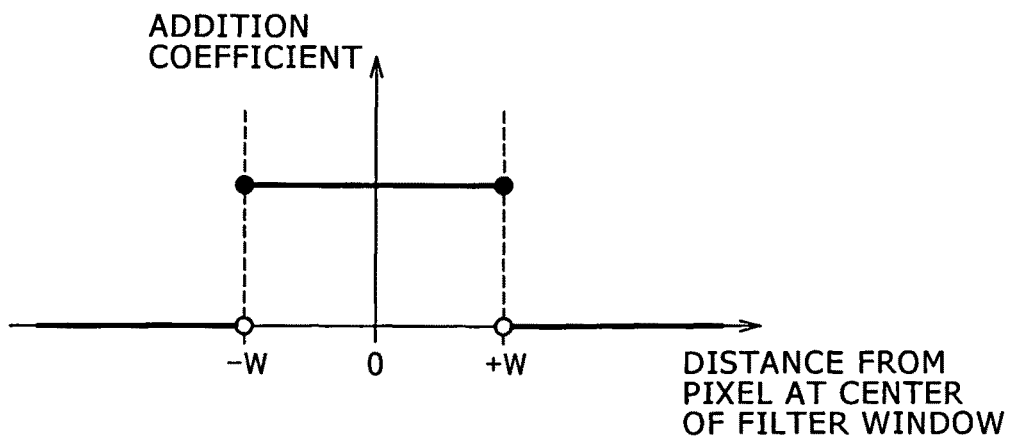
FIG. 37 is a diagram describing a filter coefficient.

FIG. 37 is a diagram describing the filter coefficient. The same figure illustrates the distance between the pixel of interest and the pixel at the center of the filter window on the horizontal axis and the filter coefficient on the vertical axis. As illustrated in the same figure, when the distance between the pixel to be processed (pixel of interest) and the pixel at the center of the filter window falls within the range +W and −W, a given filter coefficient is supplied. On the other hand, if the distance between the pixel to be processed (pixel of interest) and the pixel at the center of the filter window falls outside the range +W and −W, a filter coefficient of 0 is supplied. Further, when the distance between the pixel of interest and the pixel at the center of the filter window falls within the range +W and −W, the integral of the filter coefficient is 1. Here, the reference numeral W is the value associated with the pixel position width W described above with reference to FIG. 9 and set in advance in the edge-preserving LPF.

Thanks to the multiplication of the filter coefficient by the multiplier 603 and the normalization which will be described later, the average pixel value in the filter window can be obtained by summation.

The values output from the multiplier 604 are each supplied to an integration section 605 for summation. When all the values output from the multiplier 604 for the pixels located within the filter window are supplied to the integration section 605 and summed, the integration end determination section 606 outputs the summation result to a divider 624.

On the other hand, a multiplier 621 multiplies the addition coefficient output from the addition coefficient output section 613 and the filter coefficient described above. The values output from the multiplier 621 are each supplied to an integration section 622 for summation. When all the values output from the multiplier 621 for the pixels located within the filter window are supplied to the integration section 622 and summed, an integration end determination section 623 outputs the summation result to the divider 624 as a normalized coefficient. This makes it possible to find the average luminance value of the pixels, the difference between which and the reference level, falls within the range between +ϵ and −ϵ, of all the pixels in the filter window.

The output of the divider 624 is the pixel value that has undergone the process of the edge-preserving LPF. As a result, the pixel values that have undergone the process of the edge-preserving LPF are replaced by the average luminance value of the pixels, the difference between which and the reference level, falls within the range between +ϵ and −ϵ, of all the pixels in the filter window.

That is, the edge-preserving LPF determines, based on the reference pixel value (reference level) associated with the target pixel to be processed and the threshold ϵ, whether the difference between the value of each of the pixels adjacent to the target pixel to be processed and the reference level falls within the range between +ϵ and −ϵ. Then, only those pixels, the difference between whose value and the reference level, falls within the range between +ϵ and −ϵ, are determined to be valid and used to calculate the average value described above for smoothing.

It should be noted that a description was given to the effect that FIG. 35 showed a detailed configuration example of the ultrawide band edge-preserving LPF 361 or wide band edge-preserving LPF 362 in FIG. 11, the multiscale filter in FIG. 11 may be configured as illustrated in FIG. 35. That is, the functional block shown as the edge-preserving LPF 65 in FIG. 2 need not necessarily include both the ultrawide band edge-preserving LPF 361 and wide band edge-preserving LPF 362.

Figure 38:
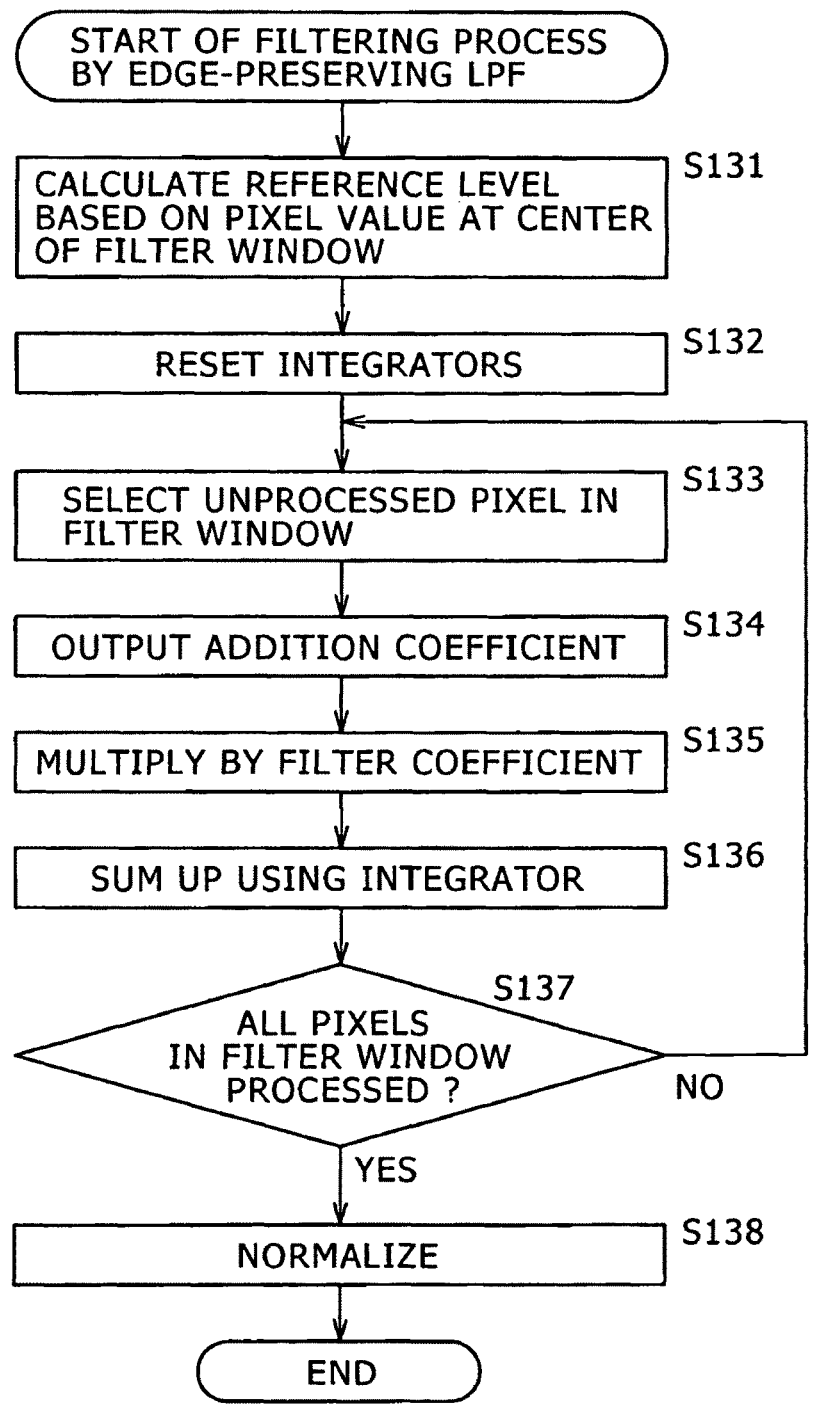
FIG. 38 is a flowchart describing a filtering process performed by the edge-preserving low-pass filter.

A description will be given below of the filtering process of the edge-preserving LPF shown in FIG. 35 with reference to the flowchart shown in FIG. 38. This process is performed, for example, as the process in step S82 or S83 of FIG. 24.

In step S131, the reference level calculation section 611 calculates the reference level based on the supplied pixel value. For example, the pixel value at the center of the filter window is used 'as-is' as a reference level as described above with reference to FIG. 9.

In step S132, the integrators 605 and 622 are reset.

In step S133, an unprocessed pixel in the filter window is selected and supplied to the subtractor 612.

In step S134, the addition coefficient output section 613 outputs an addition coefficient based on the output value from the subtractor 612 and the threshold ϵ supplied from the control MPU 64 shown in FIG. 2. At this time, the addition coefficient output section 613 outputs a value of 1 as an addition coefficient as illustrated in FIG. 36 when the output value from the subtractor 612 falls within the range between +ϵ and −ϵ. On the other hand, the addition coefficient output section 613 outputs a value of 0 as an addition coefficient when the output value from the subtractor 612 falls outside the range between +ϵ and −ϵ.

Then, the multiplier 603 multiplies the addition coefficient output from the addition coefficient output section 613 and each of the pixel values fed to this edge-preserving LPF.

In step S135, the multiplier 604 multiplies the value output from the multiplier 603 and the filter coefficient. On the other hand, the multiplier 621 multiplies the addition coefficient output from the addition coefficient output section 613 and the filter coefficient. At this time, a value of 1 is supplied as a filter coefficient, for example, when the distance between the pixel selected in the process of step S133 (pixel of interest) and the pixel at the center of the filter window falls within the range between +W and −W as illustrated in FIG. 37. On the other hand, a value of 0 is supplied as a filter coefficient when the distance between the pixel of interest and the pixel at the center of the filter window falls outside the range between +W and −W.

In step S136, the integration section 605 sums up (adds up) the values produced as the result of the process in step S135.

In step S137, the integration end determination sections 606 and 623 determine whether the values of all the pixels in the filter window have been summed up. If the integration end determination sections 606 and 623 determine that the values of all the pixels have yet to be summed up, the process returns to step S133.

When the integration end determination sections 606 and 623 determine in step S137 that the values of all the pixels in the filter window have been summed up, the integration end determination sections 606 and 623 output the summation results to the divider 624.

In step S138, the divider 624 performs a division and outputs a normalized value.

The filtering process of the edge-preserving LPF is performed as described above.

Figure 39:
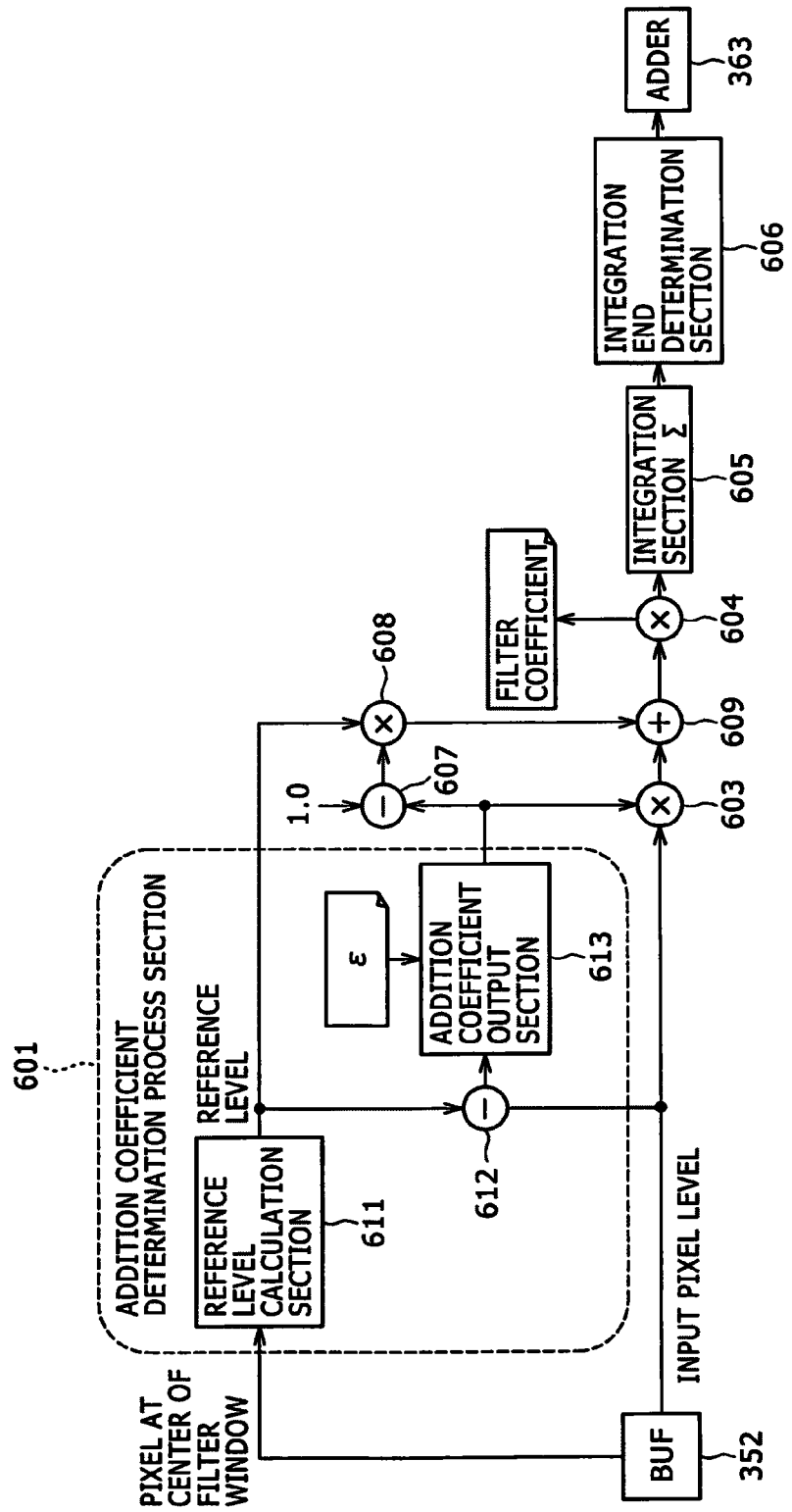
FIG. 39 is a block diagram illustrating another configuration example of the edge-preserving low-pass filter.

FIG. 39 is a block diagram illustrating another configuration example of the edge-preserving LPF. In FIG. 39, like functional blocks as those in FIG. 35 are denoted by like reference numerals, and the detailed description thereof is omitted.

In the example shown in FIG. 39, the output of the addition coefficient output section 613 is supplied to the multiplier 603 and subtractor 607. Then, the subtractor 607 calculates the difference between the addition coefficient output from the addition coefficient output section 613 and the value of 1.0. The output of the subtractor 607 is supplied to a multiplier 608. The multiplier 608 multiplies the difference output from the subtractor 607 and the reference level output from the reference level calculation section 611 and supplies the product to an adder 609. The adder 609 adds together the value supplied from the multiplier 603 and that from the multiplier 608 and supplies the sum to the multiplier 604.

In the edge-preserving LPF configured as shown in FIG. 39, the coefficient normalization process section 602 shown in FIG. 35 need not be provided (can be omitted).

Figure 40:
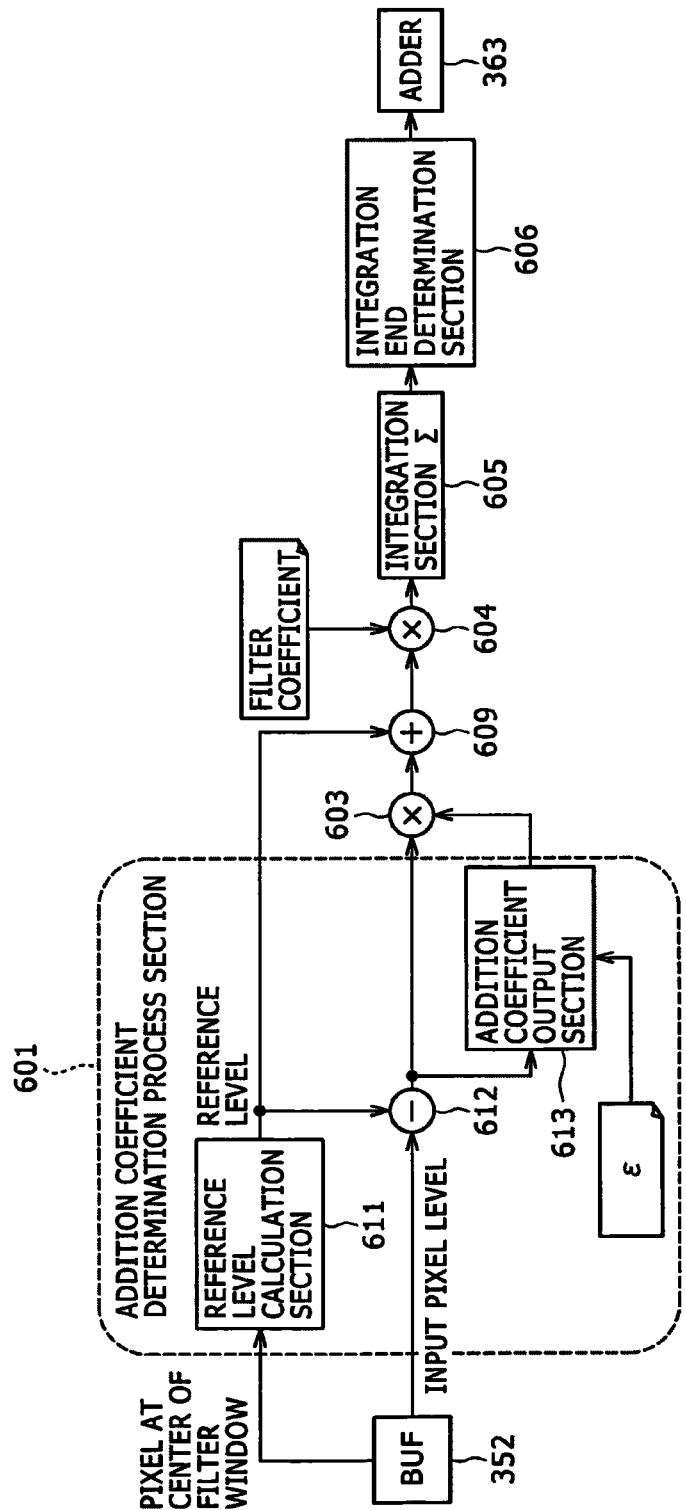
FIG. 40 is a block diagram illustrating still another configuration example of the edge-preserving low-pass filter.

FIG. 40 is a block diagram illustrating still another configuration example of the edge-preserving LPF. This figure illustrates an edge-preserving LPF that is even simpler in configuration than that shown in FIG. 39. In FIG. 40, like functional blocks as those in FIG. 35 or FIG. 39 are denoted by like reference numerals, and the detailed description thereof is omitted.

In the example shown in FIG. 40, the output of the subtractor 612 is supplied to the multiplier 603 together with the output of the addition coefficient output section 613. Then, the adder 609 adds together the value supplied from the multiplier 603 and the reference level output from the reference level calculation section 611 and supplies the sum to the multiplier 604.

Here, the cases were described in which the edge-preserving LPF included an epsilon filter, i.e., a nonlinear digital filter, in the examples. Alternatively, however, the edge-preserving LPF may include a bilateral filter that is a nonlinear digital filter with a higher degree of freedom in adjustment. The edge-preserving LPF including a bilateral filter is configured in the same manner as described above with reference to FIGS. 35, 39 and 40. It should be noted, however, that the edge-preserving LPF including a bilateral filter differs from that including an epsilon filter in the addition coefficient output from the addition coefficient output section 613 and the filter coefficient supplied to the multiplier 604 or 621.

Figure 41:
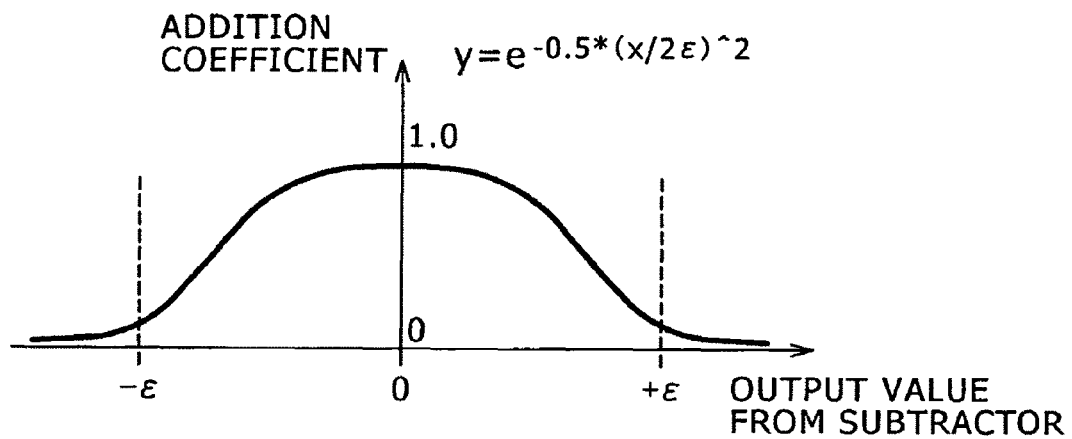
FIG. 41 is a diagram describing another example of the addition coefficient.

FIG. 41 is a diagram describing the addition coefficient when the edge-preserving LPF includes a bilateral filter. As with FIG. 36, FIG. 41 is a graph showing the output value from the subtractor 612 on the horizontal axis and the addition coefficient output from the addition coefficient output section 613 on the vertical axis. As illustrated in the same figure, the addition coefficient output section 613 outputs a value of 1 as an addition coefficient when the output value of the subtractor 612 (i.e., difference between each of the pixel values and the reference level) is 0. The addition coefficient output section 613 outputs a value roughly close to 0 when the output value of the subtractor 612 falls outside the range between $-\epsilon$ and $-\epsilon$.

Unlike the addition coefficient shown in FIG. 36, that shown in the example of FIG. 41 changes continuously with change in the output value from the subtractor 612. For example, the characteristic of the addition coefficient as a result of the change in the output value from the subtractor 612 is given by the equation shown at top right of FIG. 41. It should be noted that a variable y in the equation is the addition coefficient, and a variable x the output value from the subtractor 612.

Figure 42:
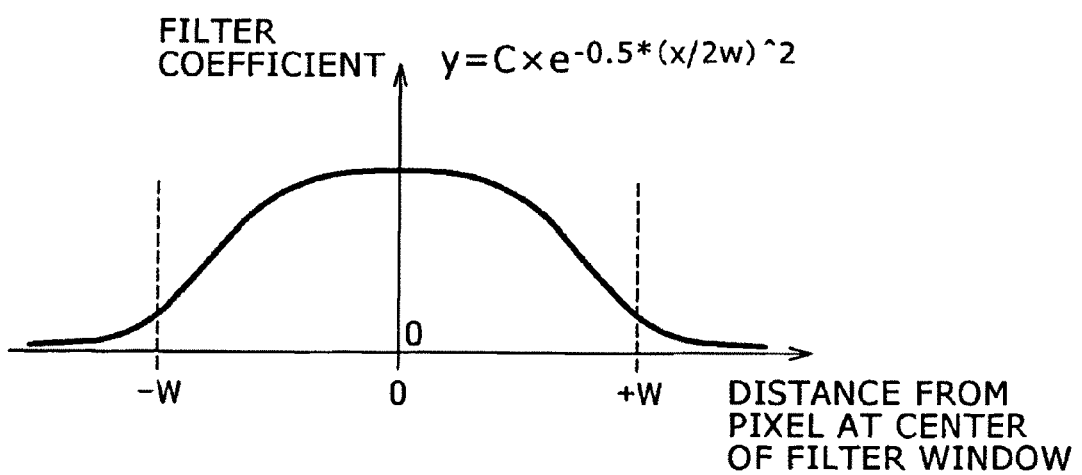
FIG. 42 is a diagram describing another example of the filter coefficient.

FIG. 42 is a diagram describing the filter coefficient when the edge-preserving LPF includes a bilateral filter. As with FIG. 37, FIG. 42 shows the distance between the pixel of interest and the pixel at the center of the filter window on the horizontal axis and the filter coefficient on the vertical axis. As illustrated in the same figure, when the distance between the pixel of interest and the pixel at the center of the filter window is 0, the highest filter coefficient is supplied. When the distance between the pixel of interest and the pixel at the center of the filter window falls outside the range between $+W$ and $-W$, a value roughly close to 0 is supplied as a filter coefficient. On the other hand, when the distance between the pixel of interest and the pixel at the center of the filter window falls within the range between $+W$ and $-W$, the integral of the filter coefficient is 1.

Unlike the filter coefficient shown in FIG. 37, that shown in the example of FIG. 42 changes continuously with change in the distance between the pixel of interest and the pixel at the center of the filter window. For example, the characteristic of the filter coefficient as a result of the change in the distance between the pixel of interest and the pixel at the center of the filter window is given by the equation shown at top right of FIG. 42. It should be noted that the variable y in the equation is the filter coefficient, the variable x the distance between the pixel of interest and the pixel at the center of the filter window, and reference numeral C the given constant.

If the control MPU 64 shown in FIG. 2 properly computes the threshold $\epsilon$ to be supplied to the addition coefficient output section 613 of the edge-preserving LPF in FIG. 35, 39 or 40, the lighting and detail components are properly extracted from the image after the filtering process of the edge-preserving LPF 65.

Figure 43:
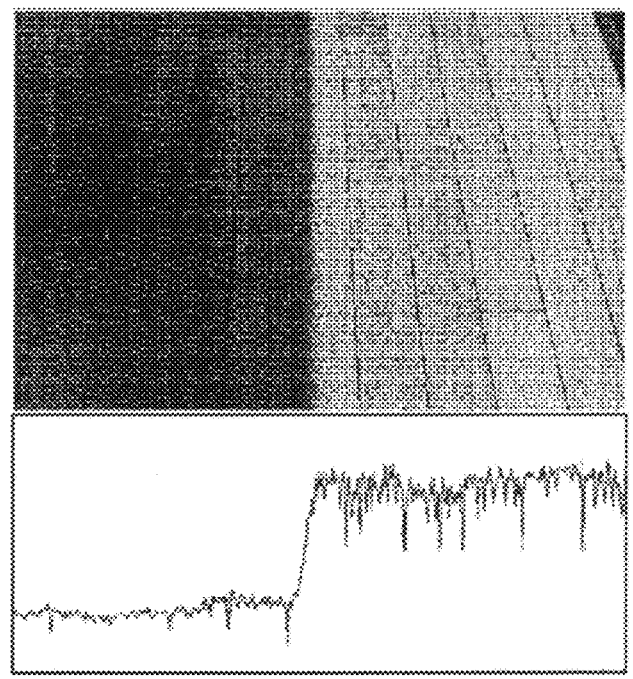
FIG. 43 is a diagram illustrating an example of an image fed to the edge-preserving low-pass filter.

A further description will be given next of the effect produced by the fact that the proper threshold $\epsilon$ is supplied to the edge-preserving LPF. We assume that the image shown in FIG. 43 is fed to the edge-preserving LPF 65 shown in FIG. 2. The image on top in the same figure illustrates a wooden floor, with the area on the left being dark and the area on the right being bright.

The graph on bottom in FIG. 43 illustrates the change in luminance value of the pixels in the center row of the image, showing the pixel position on the horizontal axis and the luminance value on the vertical axis. As illustrated in the graph of FIG. 43, the pixels in the dark area on the left are low in luminance value as a whole with small amplitudes in the graph. That is, each of the pixels in the dark area on the left changes in luminance value only to a small extent. On the other hand, the pixels in the bright area on the right are high in luminance value as a whole with large amplitudes in the graph. That is, each of the pixels in the bright area on the right changes in luminance value to a large extent. In the meantime, the boundary between the bright and dark areas of the image on top of the same figure is located close to the horizontal center of the figure. As a result, the pixel luminance value changes steeply near the horizontal center in the graph on bottom of the figure.

As described above with reference to FIGS. 12 to 15, the image that has undergone the filtering process of the edge-preserving LPF 65 should preferably be devoid of a fine pattern in the image and made up of dark and bright areas (lighting component of the original image).

Figure 44:
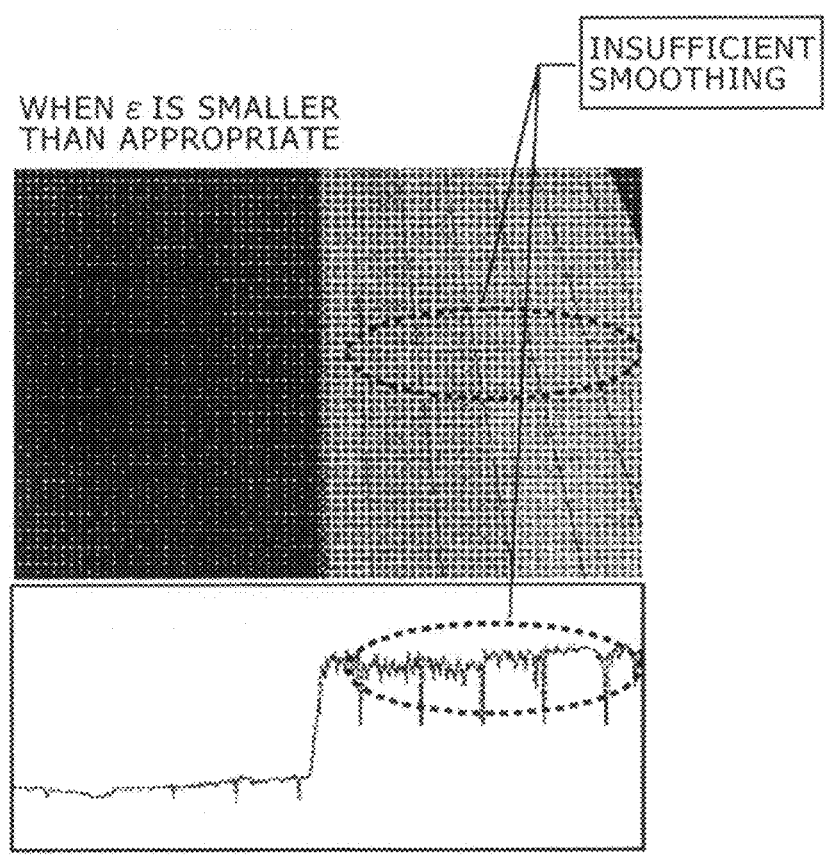
FIG. 44 is a diagram illustrating an image output from the edge-preserving low-pass filter when the threshold is smaller than an appropriate value.
Figure 45:
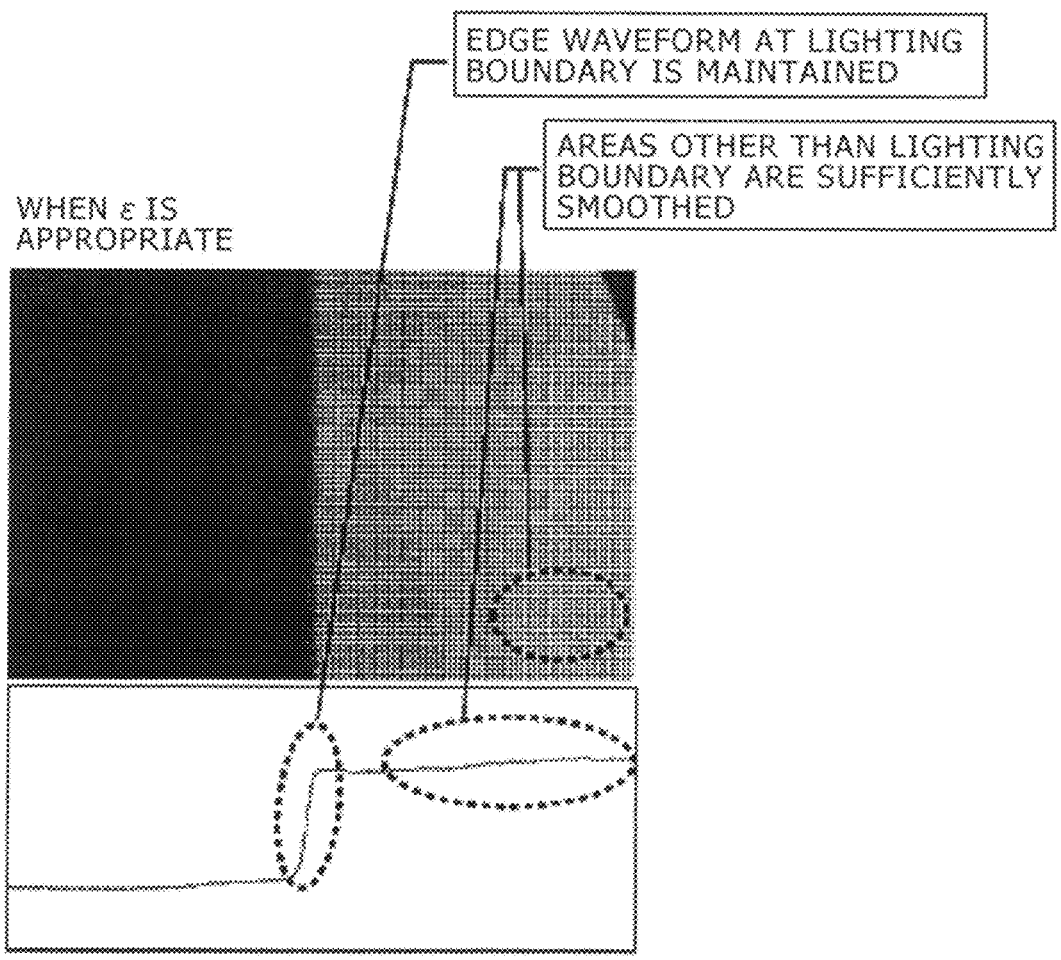
FIG. 45 is a diagram illustrating an image output from the edge-preserving low-pass filter when the threshold is appropriate.
Figure 46:
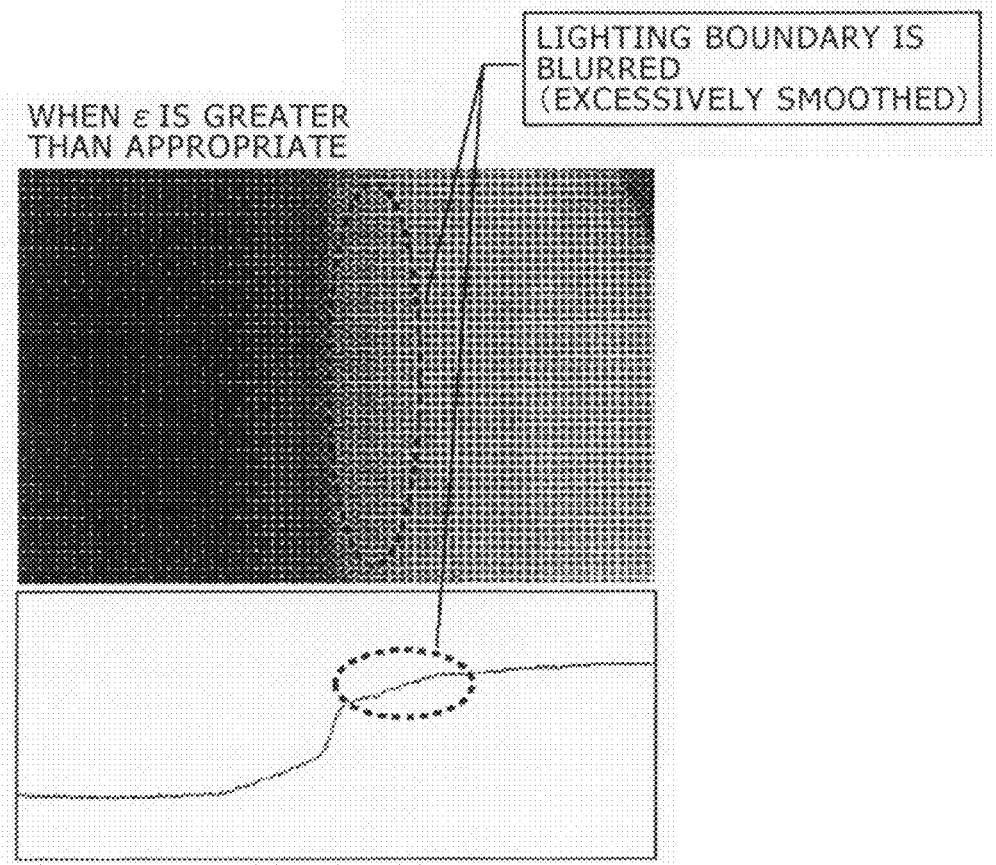
FIG. 46 is a diagram illustrating an image output from the edge-preserving low-pass filter when the threshold is greater than the appropriate value.

FIGS. 44 to 46 are diagrams illustrating an example of the image output from the edge-preserving LPF 65 shown in FIG. 43 following the filtering process of the edge-preserving LPF 65.

FIG. 44 is a diagram illustrating, as an example, a case in which the threshold $\epsilon$ smaller than the appropriate value is supplied to (set in) the edge-preserving LPF 65. It should be noted that the graph shown on bottom illustrates the change in luminance value of the pixels in the center row of the image in FIG. 44, as in FIG. 43.

As illustrated in the image on top in FIG. 44, the dark area on the left no longer has a fine pattern, but the bright area on the right still has a fine pattern. That is, as illustrated in the graph on bottom in FIG. 44, the amplitudes in the graph are sufficiently small in the dark area on the left. In the bright area on the right, however, the amplitudes in the graph are not very small. In other words, in the case of FIG. 44, the luminance value has not been smoothed sufficiently in the bright area.

FIG. 45 is a diagram illustrating, as an example, a case in which the appropriate threshold $\epsilon$ is supplied to the edge-preserving LPF 65. It should be noted that the graph shown on bottom illustrates the change in luminance value of the pixels in the center row of the image in FIG. 45, as in FIG. 43.

As illustrated in the image on top in FIG. 45, the dark area on the left and the bright area on the right no longer have a fine pattern in the image, with the boundary therebetween being clearly identifiable. That is, as illustrated in the graph on bottom in FIG. 45, the amplitudes in the graph are sufficiently small in both the dark area on the left and the bright area on the right. The pixel luminance value changes steeply and to a large extent near the horizontal center in the figure. In other words, in the case of FIG. 45, the luminance value has been smoothed sufficiently both in the bright and dark areas, with the edges of the boundary of the lighting component preserved properly.

FIG. 46 is a diagram illustrating, as an example, a case in which the threshold $\epsilon$ larger than the appropriate value is supplied to the edge-preserving LPF 65. It should be noted that the graph shown on bottom illustrates the change in luminance value of the pixels in the center row of the image in FIG. 46, as in FIG. 43.

As illustrated in the image on top in FIG. 46, the dark area on the left and the bright area on the right no longer have a fine pattern in the image. However, the boundary between the dark and bright areas is not clear (blurred). That is, as illustrated in the graph on bottom in FIG. 46, the amplitudes in the graph are sufficiently small in both the dark area on the left and the bright area on the right. However, the pixel luminance value changes less steeply near the horizontal center of the figure. In other words, in the case of FIG. 46, the luminance value has been smoothed sufficiently both in the bright and dark areas.

However, the edges of the boundary of the lighting component are not preserved properly.

As described above with reference to FIGS. 35 and 36, the pixel values that have undergone the process of the edge-preserving LPF are replaced by the average luminance value of the pixels, the difference between which and the reference level, falls within the range between $+\epsilon$ and $-\epsilon$, of all the pixels in the filter window. As a result, if the threshold $\epsilon$ is 0, the pixel value remains unchanged even after the process of the edge-preserving LPF. Therefore, if the threshold $\epsilon$ smaller than the appropriate value is supplied as illustrated in FIG. 44, the area with a large luminance value change in the original image (bright area in FIG. 44) is not smoothed sufficiently.

On the other hand, if the threshold $\epsilon$ is infinitely large, the pixel values that have undergone the process of the edge-preserving LPF are all replaced by a given value. As a result, if the threshold $\epsilon$ larger than the appropriate value is supplied as illustrated in FIG. 46, the boundary between the bright and dark areas in the original image is blurred.

Figure 47:
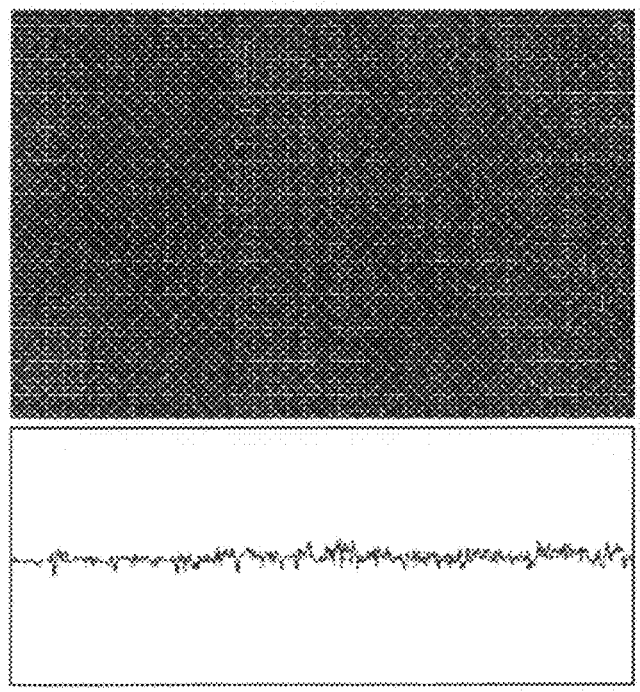
FIG. 47, which is associated with FIG. 44, is a diagram illustrating an example of an image output from a detail extraction section 66.
Figure 48:
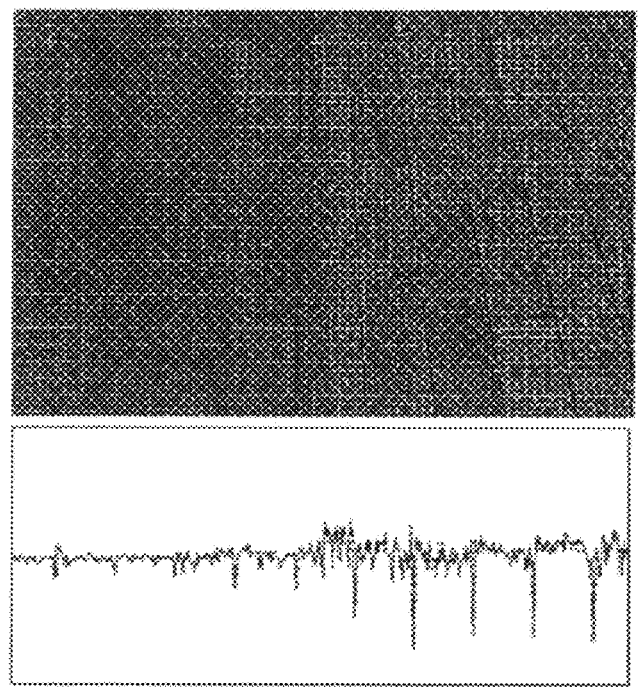
FIG. 48, which is associated with FIG. 45, is a diagram illustrating an example of the image output from the detail extraction section 66.
Figure 49:
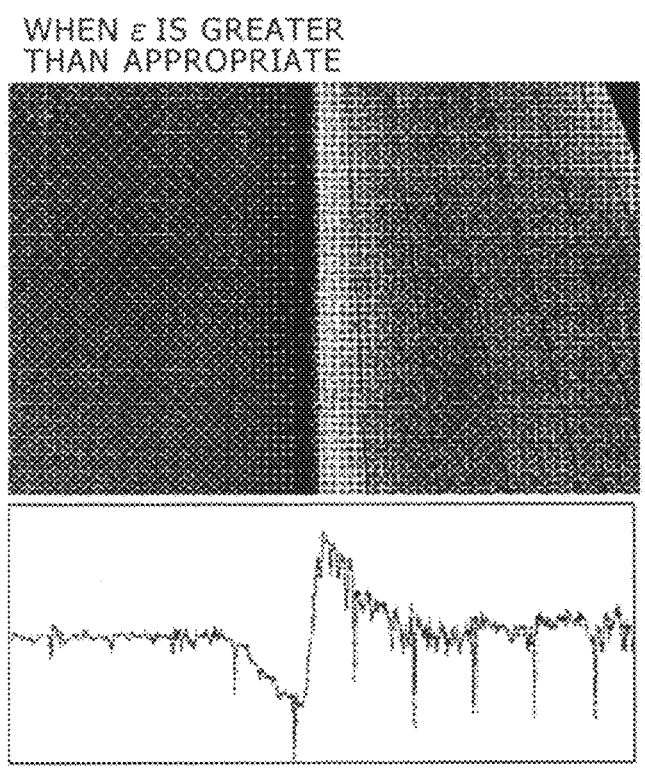
FIG. 49, which is associated with FIG. 46, is a diagram illustrating an example of the image output from the detail extraction section 66.

FIGS. 47 to 49 are diagrams illustrating examples of the images output from the detail extraction section 66 respectively when the images shown in FIGS. 44 to 46 are output from the edge-preserving LPF 65 in FIG. 2.

FIG. 47 illustrates an example of the image output from the detail extraction section 66 when the image shown in FIG. 44 is output from the edge-preserving LPF 65 in FIG. 2. In FIG. 47, the graph shown on bottom illustrates the change in luminance value of the pixels in the center row of the image, as in FIG. 43. As illustrated in the image on top and in the graph on bottom of the same figure, a fine pattern, for example, is not shown clearly in the image, and the amplitudes are small in the graph.

FIG. 48 illustrates an example of the image output from the detail extraction section 66 when the image shown in FIG. 45 is output from the edge-preserving LPF 65 in FIG. 2. In FIG. 48, the graph shown on bottom illustrates the change in luminance value of the pixels in the center row of the image, as in FIG. 43. As illustrated in the image on top and in the graph on bottom of the same figure, a fine pattern, for example, is shown clearly in the image, and the amplitudes are relatively large in the graph.

FIG. 49 illustrates an example of the image output from the detail extraction section 66 when the image shown in FIG. 46 is output from the edge-preserving LPF 65 in FIG. 2. In FIG. 49, the graph shown on bottom illustrates the change in luminance value of the pixels in the center row of the image, as in FIG. 43. As illustrated in the image on top and in the graph on bottom of the same figure, a fine pattern, for example, is shown clearly in the image, and the amplitudes are relatively large in the graph. However, a change in luminance value which should be removed takes place in the boundary between the bright and dark areas of the original image.

Thus, unless the appropriate threshold $\epsilon$ is set in the edge-preserving LPF 65, it is impossible to remove the high frequency component from the signal Y' for extraction of the lighting component for each area with high accuracy, thus making it impossible to extract the detail component with high accuracy.

The appropriate threshold $\epsilon$ varies from one input image to another. FIG. 50 is a diagram illustrating an example of an image fed to the edge-preserving LPF 65. It should be noted that the graph shown on bottom illustrates the change in luminance value of the pixels in the center row of the image in FIG. 50, as in FIG. 43. The length of the vertical arrow in the graph on bottom of the same figure indicates the appropriate threshold $\epsilon$ which is determined commensurate with the image on top of the same figure.

FIG. 51 is a diagram illustrating another example of an image fed to the edge-preserving. LPF 65. It should be noted that the graph shown on bottom illustrates the change in luminance value of the pixels in the center row of the image in FIG. 51, as in FIG. 43. The length of the vertical arrow in the graph on bottom of the same figure indicates the appropriate threshold $\epsilon$ which is determined commensurate with the image on top of the same figure. The image in FIG. 51 is smaller in difference in luminance value between the bright and dark areas than the image in FIG. 50. In the graph shown on bottom of the same figure, therefore, the change in luminance value near the center is also relatively smaller than in FIG. 50. As a result, the appropriate threshold $\epsilon$ is also smaller.

FIG. 52 is a diagram illustrating still another example of an image fed to the edge-preserving LPF 65. It should be noted that the graph shown on bottom illustrates the change in luminance value of the pixels in the center row of the image in FIG. 52, as in FIG. 43. The length of the vertical arrow in the graph on bottom of the same figure indicates the appropriate threshold $\epsilon$ which is determined commensurate with the image on top of the same figure. The image in FIG. 52 is larger in difference in luminance value between the bright and dark areas than the image in FIG. 50. In the graph shown on bottom of the same figure, therefore, the change in luminance value near the center is also relatively larger than in FIG. 50. As a result, the appropriate threshold $\epsilon$ is also larger.

FIG. 53 is a diagram illustrating still another example of an image fed to the edge-preserving LPF 65. It should be noted that the graph shown on bottom illustrates the change in luminance value of the pixels in the center row of the image in FIG. 53, as in FIG. 43. The length of the vertical arrow in the graph on bottom of the same figure indicates the appropriate threshold $\epsilon$ which is determined commensurate with the image on top of the same figure. The image in FIG. 53 is brighter as a whole than the image in FIG. 50, but identical in difference in luminance value between the bright and dark areas to the image in FIG. 50. Therefore, although located more upward as a whole than the graph in FIG. 50, the graph shown on bottom in FIG. 53 has the same waveform as that of the graph in FIG. 50 including the change in luminance value near the center. In this case, the appropriate threshold $\epsilon$ is the same as in FIG. 50.

Thus, in order to supply the appropriate threshold $\epsilon$ commensurate with the input image, the average intensities LA and LB of the lighting of the bright and dark areas of the image are found by the process of the detection section 63. Then, the control MPU 64 finds the threshold $\epsilon$ based on these average intensities. As is clear from the graphs on bottom of FIGS. 50 to 53, the appropriate threshold $\epsilon$ should preferably be smaller than the difference in luminance value between the bright and dark areas and larger than the amplitudes of the luminance value in each of the areas. Therefore, the control MPU 64 computes the threshold $\epsilon$ by multiplying the absolute difference between the average intensities LA and LB by a fixed value R.

Incidentally, a description was given to the effect that the detail adjustment section 67 in FIG. 2 corrected the detail component of the image by multiplying the detail component signal Y'de by the gain obtained based on the correction gain LUT 72 and shown in FIG. 17. However, the adaptation gains for the bright and dark areas of the image can be found without using the gain identified by the LUT shown in FIG. 17. That is, the gain by which the detail component is to be multiplied is set without using the adaptation level identified by FIG. 6.

A description will be given below of the effect of correcting the detail component of the image by multiplying the detail component signal by the gain with reference to FIGS. 54 to 56.

Figure 54:
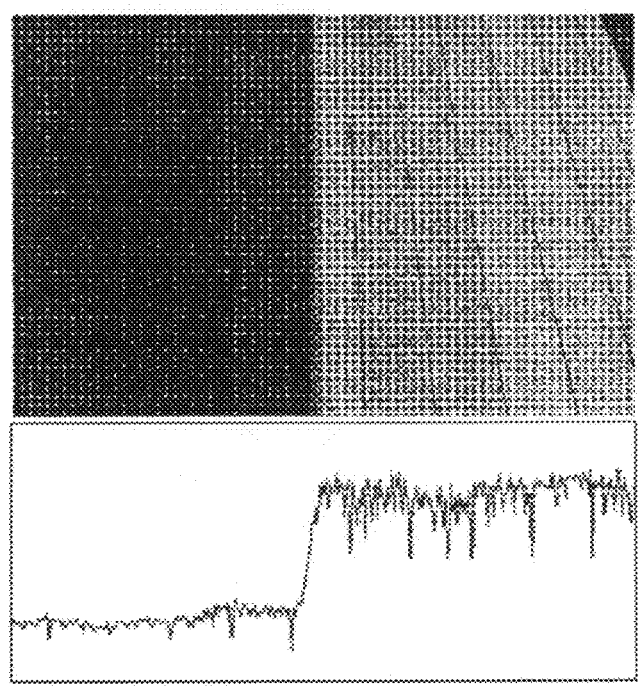
FIG. 54 is a diagram illustrating an effect of correcting the detail component of an image.

FIG. 54 is a diagram illustrating an example of an image output from the perception equalization section 62 shown in FIG. 2. The image on top in the same figure illustrates a wooden floor, with the area on the left being dark and the area on the right being bright. The graph on bottom in FIG. 54 illustrates the change in luminance value of the pixels in the center row of the image, showing the pixel position on the horizontal axis and the luminance value on the vertical axis. As illustrated in the graph of FIG. 54, the pixels in the dark area on the left are low in luminance value as a whole with small amplitudes in the graph.

Figure 55:
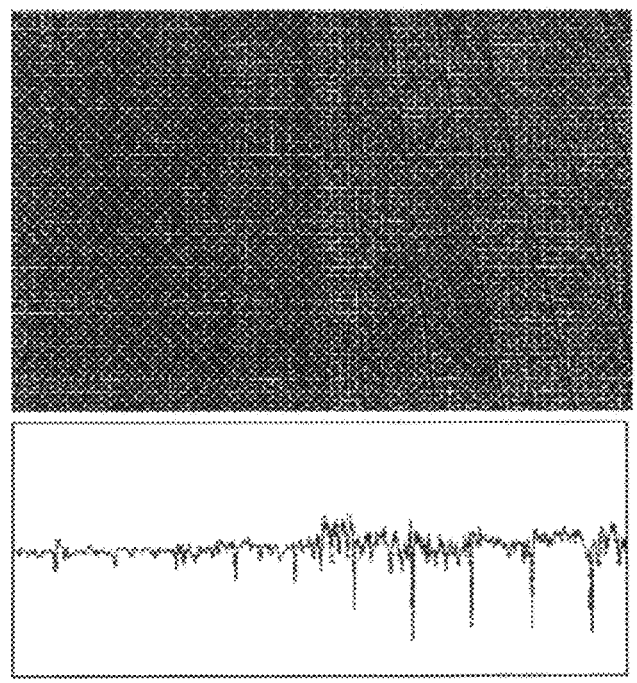
FIG. 55 is a diagram illustrating an effect of correcting the detail component of an image.
Figure 56:
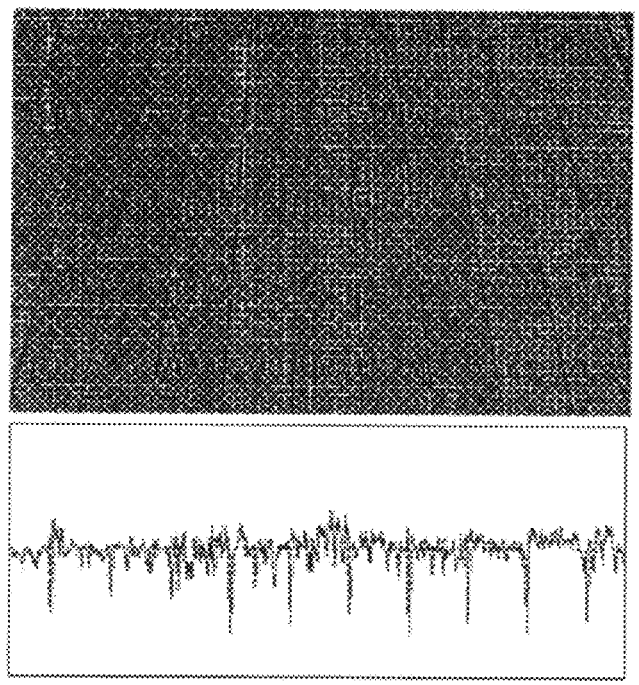
FIG. 56 is a diagram illustrating an effect of correcting the detail component of an image.

FIGS. 55 and 56 respectively illustrate examples of images shown in FIG. 54 output from the detail adjustment section 67 following the processes of the edge-preserving LPF 65 and detail extraction section 66 shown in FIG. 2. Each of the graphs on bottom in FIGS. 55 and 56 illustrates the change in luminance value of the pixels in the center row of the image, showing the pixel position on the horizontal axis and the luminance value on the vertical axis.

FIG. 55 illustrates, as an example, a case in which the detail adjustment section 67 does not multiply the detail component by any gain. Because the detail component is not multiplied by any gain in this example, the pixels in the area on the left have small amplitudes as illustrated in the graph on bottom of the same figure. As a result, a fine pattern, for example, is not shown clearly in the area on the left as illustrated in the image on top of the same figure.

FIG. 56 illustrates, as an example, a case in which the detail adjustment section 67 multiplies the detail component by the complete adaptation gain. Because the detail component is multiplied by the complete adaptation gain in this example, the pixels in the area on the left have large amplitudes as the pixels in the area on the right, as illustrated in the graph on bottom of the same figure. As a result, a fine pattern in the image, for example, is shown clearly in the area on the left as in the area on the right, as illustrated in the image on top of the same figure.

If the images, one completely adapted to the bright area and another to the dark area, are displayed, there is absolutely no difference in contrast between the bright and dark areas in these images, making them look unnatural as described earlier. For this reason, the gains are corrected using the adaptation level identified by FIG. 6. In the LUT described with reference to FIG. 17, the gain is kBr, that is, the upper limit of the gain is kBr, when the value of the lighting component signal Y'lp (lighting intensity) is 0. On the other hand, the gain is kAr, that is, the lower limit of the gain is kAr, when the lighting intensity is the upper limit Y'sup. In order to provide clearer viewing of the detail component, however, the detail component should preferably be multiplied by the complete adaptation gain.

If the detail component is multiplied by the gain adapted to provide clearer viewing of the detail component, the correction gain LUT 72 shown in FIG. 2 may be set so that the upper limit of the gain is the complete adaptation gain kB, and the lower limit thereof the complete adaptation gain kA.

It should be noted that the complete adaptation gains kA and kB are found by computation respectively based on the exposure value EVh completely adapted to the bright area of the image and the exposure value EVl completely adapted to the dark area thereof, as described earlier. On the other hand, the exposure values EVh and EVl are found by computation respectively based on the average value Yh of the pixels in the bright area of the image and the average value Yl of the pixels in the dark area thereof. The average values Yh and Yl are obtained by the process of the detection section 63. That is, if the average value Yh of the pixels in the bright area of the image and the average value Yl of the pixels in the dark area thereof are identified, it is possible to derive the complete adaptation gains kA and kB through computation using the control MPU 64.

Figure 57:
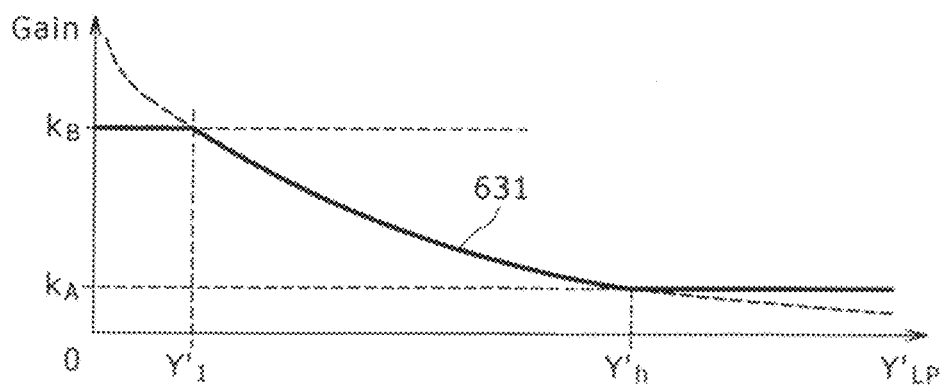
FIG. 57 is a diagram illustrating another example of the correction gain LUT shown in FIG. 2.

FIG. 57 is a diagram illustrating an example of the correction gain LUT 72 when the detail component is multiplied by the gain adapted to provide clearer viewing of the detail component. In this example, the gain is defined in association with the lighting intensity by a line 631. That is, using the value of the lighting component signal Y'lp as lighting intensity, DetailGain(Y'l)=kB when the lighting intensity is Y'l, and DetailGain(Y'h)=kA when the lighting intensity is Y'h.

The line 631 is identified by the equations shown below.

DetailGain(Y'lp)=kB×(Y'lp/Y'l)

or

DetailGain(Y'lp)=kA×(Y'lp/Y'h)

where kA≦DetailGain(Y'lp)≦kB

It should be noted that Y'l and Y'h are the values obtained respectively by the nonlinear conversion of the average values Yh and Yl of the pixels in the bright and dark areas of the image described above with reference to FIG. 3.

The correction gain LUT 72 varies from one image to be processed to another. That is, the shape of the line 631 changes with change in the average values Yh and Yl of the pixels in the bright and dark areas of the image.

Figure 58:
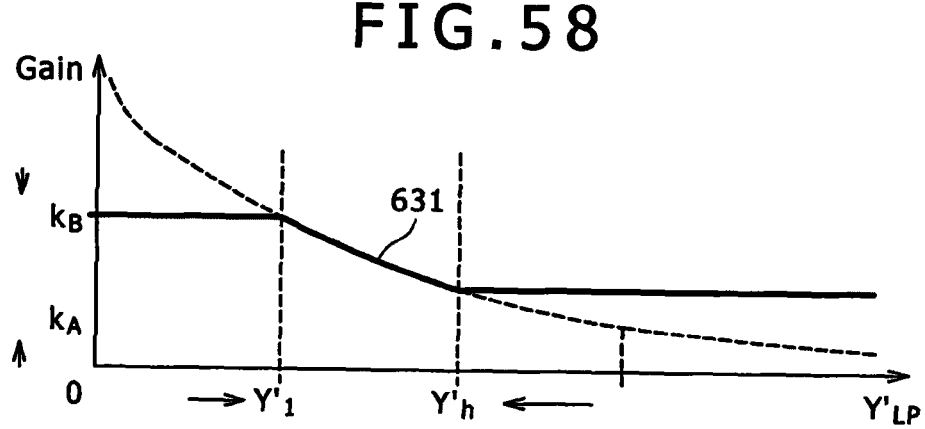
FIG. 58 is a diagram illustrating still another example of the correction gain. LUT shown in FIG. 2.

FIG. 58 is a diagram illustrating another example of the correction gain LUT 72 when the detail component is multiplied by the gain adapted to provide clearer viewing of the detail component. In the example shown in the same figure, the image to be processed has a smaller difference in contrast than in the example shown in FIG. 58.

In the example shown in FIG. 58, the difference between Y'l and Y'h on the horizontal axis is smaller than in the example shown in FIG. 57. The difference between kA and kB on the vertical axis is also smaller than in the example shown in FIG. 57.

Figure 59:
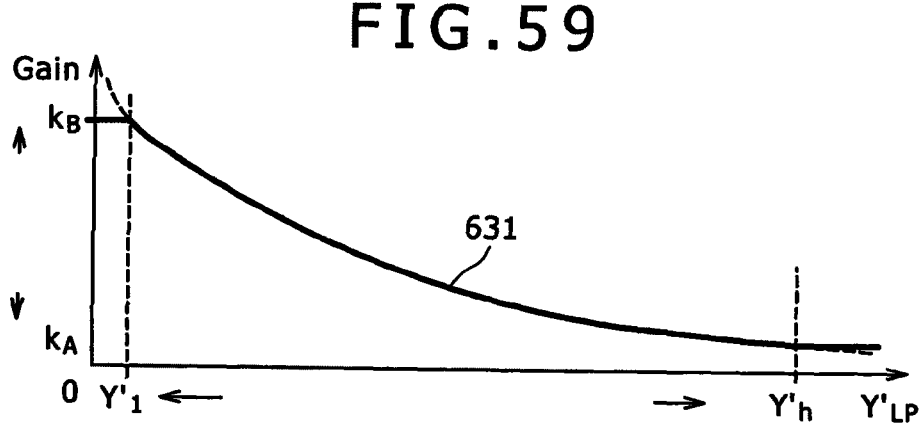
FIG. 59 is a diagram illustrating still another example of the correction gain LUT shown in FIG. 2.

FIG. 59 is a diagram illustrating still another example of the correction gain LUT 72 when the detail component is multiplied by the gain adapted to provide clearer viewing of the detail component. In the example shown in the same figure, the image to be processed has a larger difference in contrast than in the example shown in FIG. 58.

In the example shown in FIG. 59, the difference between Y'l and Y'h on the horizontal axis is larger than in the example shown in FIG. 57. The difference between kA and kB on the vertical axis is also larger than in the example shown in FIG. 57.

Figure 60:
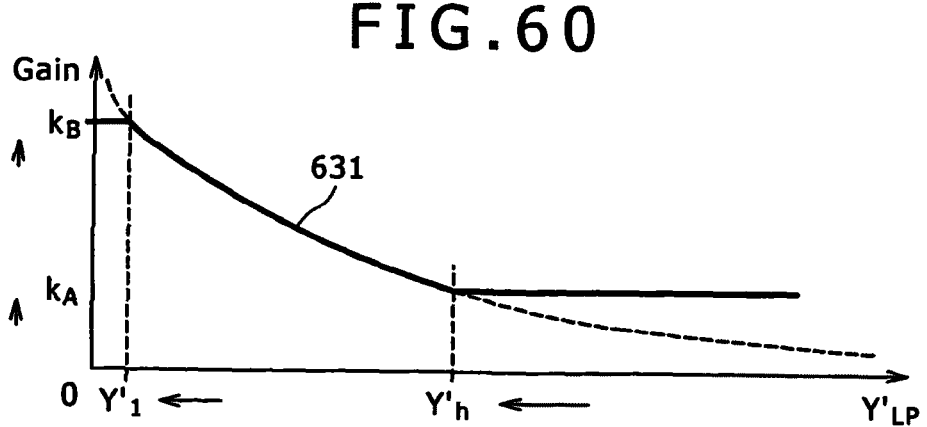
FIG. 60 is a diagram illustrating still another example of the correction gain LUT shown in FIG. 2.

FIG. 60 is a diagram illustrating still another example of the correction gain LUT 72 when the detail component is multiplied by the gain adapted to provide clearer viewing of the detail component. In the example shown in the same figure, the image to be processed is darker as a whole than in the example shown in FIG. 58.

In the example shown in FIG. 60, the difference between Y'l and Y'h on the horizontal axis is the same as in the example shown in FIG. 57. However, the positions of Y'l and Y'h on the horizontal axis have moved to the left in the figure. On the other hand, the difference between kA and kB on the vertical axis is also the same as in the example shown in FIG. 57. However, the positions of kA and kB on the vertical axis have moved up in the figure.

Although the upper limit of the gain is set to the complete adaptation gain kB and the lower limit thereof to the complete adaptation gain kA in the examples shown in FIGS. 57 to 60, the upper and lower limits of the gain may be set to values different from the complete adaptation gains.

Thus, the practical correction gain LUT 72 varies depending on the extent to which the detail component should be viewable, and further according to the image to be processed.

Figure 61:
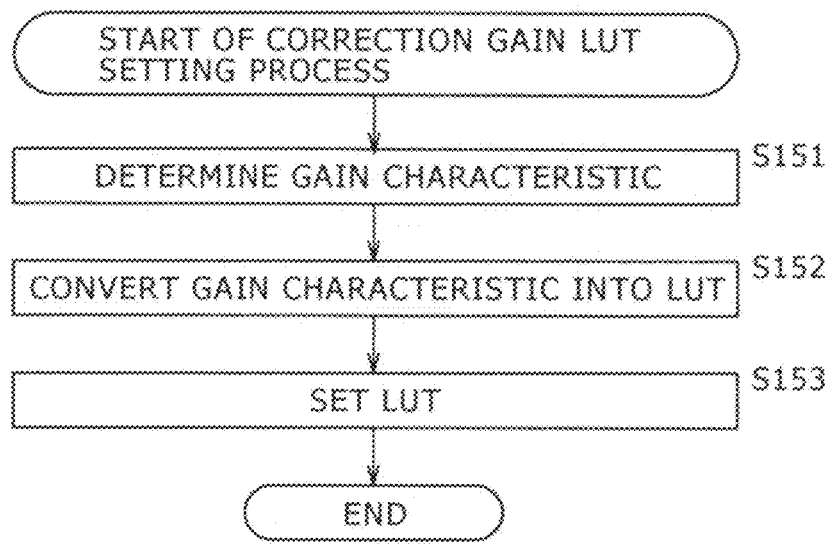
FIG. 61 is a flowchart describing a correction gain LUT setting process.

A description will be given next of the setting process of the correction gain LUT with reference to the flowchart shown in FIG. 61. This process is performed, for example, together with the process in step S16 of FIG. 21.

In step S151, the control MPU 64 determines the characteristic of the gain by which the detail component signal is to be multiplied. At this time, the average values Yh and Yl of the pixels in the bright and dark areas of the image are used to determine the characteristic of the gain. The average values Yh and Yl are obtained by the detection process in step S14 of FIG. 21. Then, the characteristic shown, for example, by the line 631 in FIGS. 57 to 60 is determined.

In step S152, the control MPU 64 converts the gain characteristic, determined by the process in step S151, to an LUT.

In step S153, the control MPU 64 sets the LUT, obtained by the process in step S152, in the correction gain LUT 72.

The correction gain LUT 72 is set as described above.

It should be noted that although a description was given above to the effect that the gain by which the detail component signal was to be multiplied was set based on the correction gain LUT 72, the gain may alternatively be set, for example, by computation, as occasion demands, without using the correction gain LUT 72. As a result, the process in step S153 of FIG. 61 may be skipped.

Figure 62:
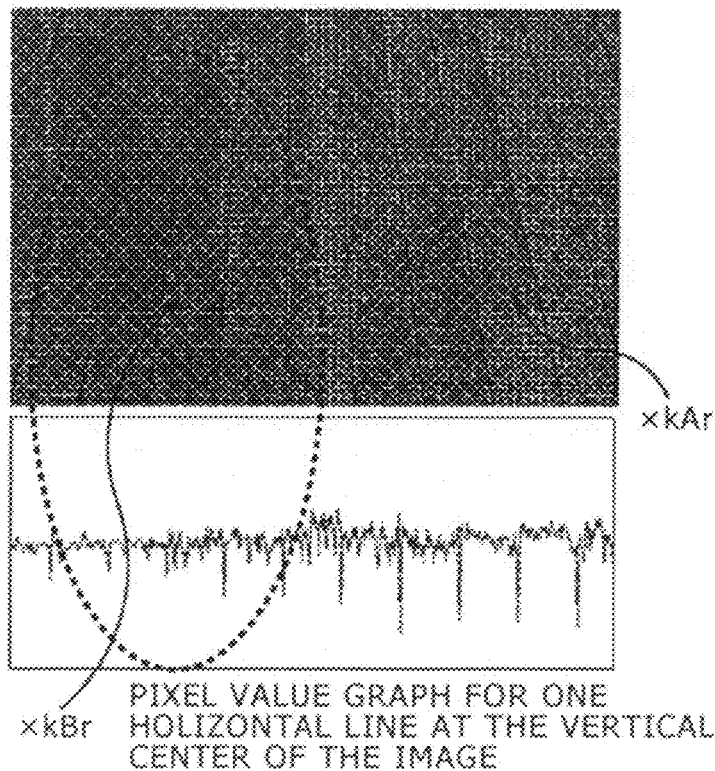
FIG. 62 is a diagram illustrating an example of an image output from a detail adjustment section when a gain by which the detail component is multiplied is set using an adaptation level.

Naturally, the image is more natural looking when the gain by which the detail component is to be multiplied is set using the adaptation level as described with reference to FIG. 6. FIG. 62 illustrates an example of an image of FIG. 54 output from the detail adjustment section 67 following the processes of the edge-preserving LPF 65 and detail extraction section 66 shown in FIG. 2 when the gain by which the detail component is to be multiplied is set using the adaptation level. The graph on bottom in FIG. 62 illustrates the change in luminance value of the pixels in the center row of the image, showing the pixel position on the horizontal axis and the luminance value on the vertical axis.

Although, in the example shown in the same figure, the fine pattern, for example, in the area on the left is somewhat less clear than in the area on the right, it can be said that the image has a sense of detail as a whole. Thus, correcting the gain using the adaptation level prevents, for example, the display of a fine pattern in an unclear manner in the area on the left as illustrated in FIG. 55. Correcting the gain using the adaptation level also prevents the absolute lack of difference in contrast between the bright and dark areas of the image as illustrated in FIG. 56.

The adaptation level is set, for example, as illustrated in FIG. 6 so as to prevent the display of a fine pattern in an unclear manner in the dark area and the absolute lack of difference in contrast between the bright and dark areas of the image. That is, the larger the image dynamic range, the closer the adaptation level, shown by the line 201 in FIG. 6, is to 1, so that a strong adaptation is applied.

The line 201 in FIG. 6 is set, for example, so that when the dynamic range is less than 2, the adaptation level is 0. When the dynamic range is sufficiently small, that is, when the difference in average intensity of lighting between the bright and dark areas of the image is sufficiently small, fine patterns in the dark and bright areas of the image, for example, are displayed almost in the same manner even without any multiplication by a gain.

On the other hand, the line 201 in FIG. 6 is set, for example, so that when the dynamic range is 4 or greater, the adaptation level is constant. The reason for this is that the multiplication by a large gain in proportion to the dynamic range leads to absolute lack of difference in contrast between the bright and dark areas of the image, for example, when the difference in average intensity of lighting between the bright and dark areas of the image is sufficiently large.

Further, the line 201 in FIG. 6 is set so that when the dynamic range is between 2 and 4, the adaptation level increases in proportion to the dynamic range.

The control MPU 64 corrects the complete adaptation gain kA for the bright area of the image and the complete adaptation gain kB for the dark area thereof using the adaptation level set as described above, thus finding the corrected adaptation gain kAr for the bright area of the image and the corrected adaptation gain kBr for the dark area thereof. The corrected adaptation gains kAr and kBr for the bright and dark areas of the image are used respectively as the upper and lower limits of the gain in the correction gain LUT 72 as will be described later.

It should be noted that the line 201 in FIG. 6 is an example of an adaptation level. The shape of the line 201 may be determined at will.

The correction gain LUT 72 obtained based on the corrected adaptation gains kAr and kBr is illustrated in FIG. 17. As described earlier, using the value of the lighting component signal Y'lp as lighting intensity, the line 411 in FIG. 17 has a characteristic obtained by interpolating the gain boundary condition with a smooth curve that satisfies the monotonically decreasing condition so that when the lighting intensity is 0, DetailGain(0)=kBr, and that when the lighting intensity is the upper limit Y'sup, DetailGain(Y'sup)=kAr.

The line 411 is identified, for example, by the equation shown below.

$$\text{DetailGain}(Y'lp)=(kBr-kAr)/(kB-kA)\times(\text{Gain}(Y'lp)-kA)+kAr$$

where kAr≦DetailGain(Y'lp)≦kBr

It should be noted that Gain(Y'lp) is the gain before the adaptation gain is used.

Figure 63:
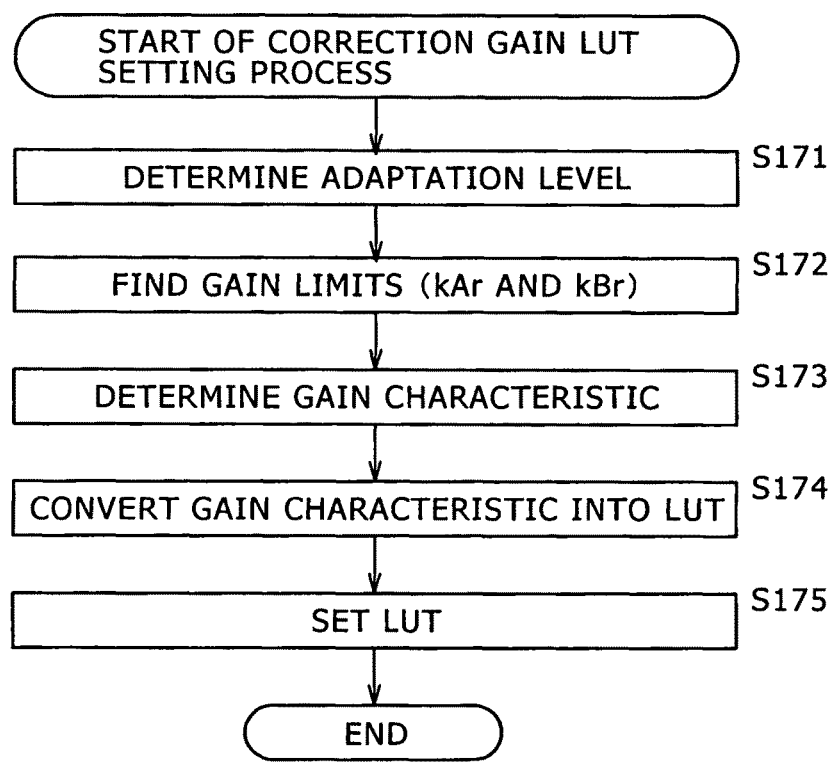
FIG. 63 is a flowchart describing another example of the correction gain LUT setting process.

A description will be given next of another example of the setting process of the correction gain LUT with reference to the flowchart shown in FIG. 63. This process is performed, for example, together with the process in step S16 of FIG. 21. The flowchart shown in FIG. 63 describes the setting process of the correction gain LUT when the gain by which the detail component is to be multiplied is set using the adaptation level.

In step S171, the control MPU 64 determines the adaptation level commensurate with the dynamic range of the image. At this time, the adaptation level is determined using the average values Yh and Yl of the pixels in the bright and dark areas of the image. The average values Yh and Yl are obtained by the detection process in step S14 of FIG. 21. Then, the adaptation level is determined, for example, as described above with reference to FIG. 6.

In step S172, the control MPU 64 finds by computation the upper and lower limits kBr and kAr of the gain by which the detail component is to be multiplied.

In step S173, the control MPU 64 identifies the characteristic of the gain by which the detail component signal is to be multiplied. At this time, the average values Yh and Yl of the pixels in the bright and dark areas of the image, obtained by the detection process in step S14 of FIG. 21, are used to determine the characteristic of the gain. Then, the characteristic shown, for example, by the line 411 in FIG. 17 is determined.

In step S174, the control MPU 64 converts the gain characteristic, determined by the process in step S173, to an LUT.

In step S175, the control MPU 64 sets the LUT, obtained by the process in step S174, in the correction gain LUT 72.

The correction gain LUT 72 is set as described above.

It should be noted that the gain may alternatively be set, for example, by computation, as occasion demands, without using the correction gain LUT 72. As a result, the process in step S175 of FIG. 63 may be skipped.

Although the cases were described above in which the embodiment according to the present invention was configured as an imaging device, the embodiment may be configured as a device other than imaging device. For example, the above processes may be performed by an image processing device. This image processing device is designed to process an image captured in advance by a conventional imaging device such as digital still camera. Alternatively, the present invention is applicable to a program such as RAW developing application software that is executed, for example, by a general-purpose computer.

It should be noted that the above series of processes may be performed by hardware or software. If the series of processes are performed by software, the program making up the software is installed from a network or recording medium to a computer incorporated in dedicated hardware or to, for example, a general-purpose personal computer 700 as illustrated in FIG. 64 capable of performing various functions when installed with various programs.

Figure 64:
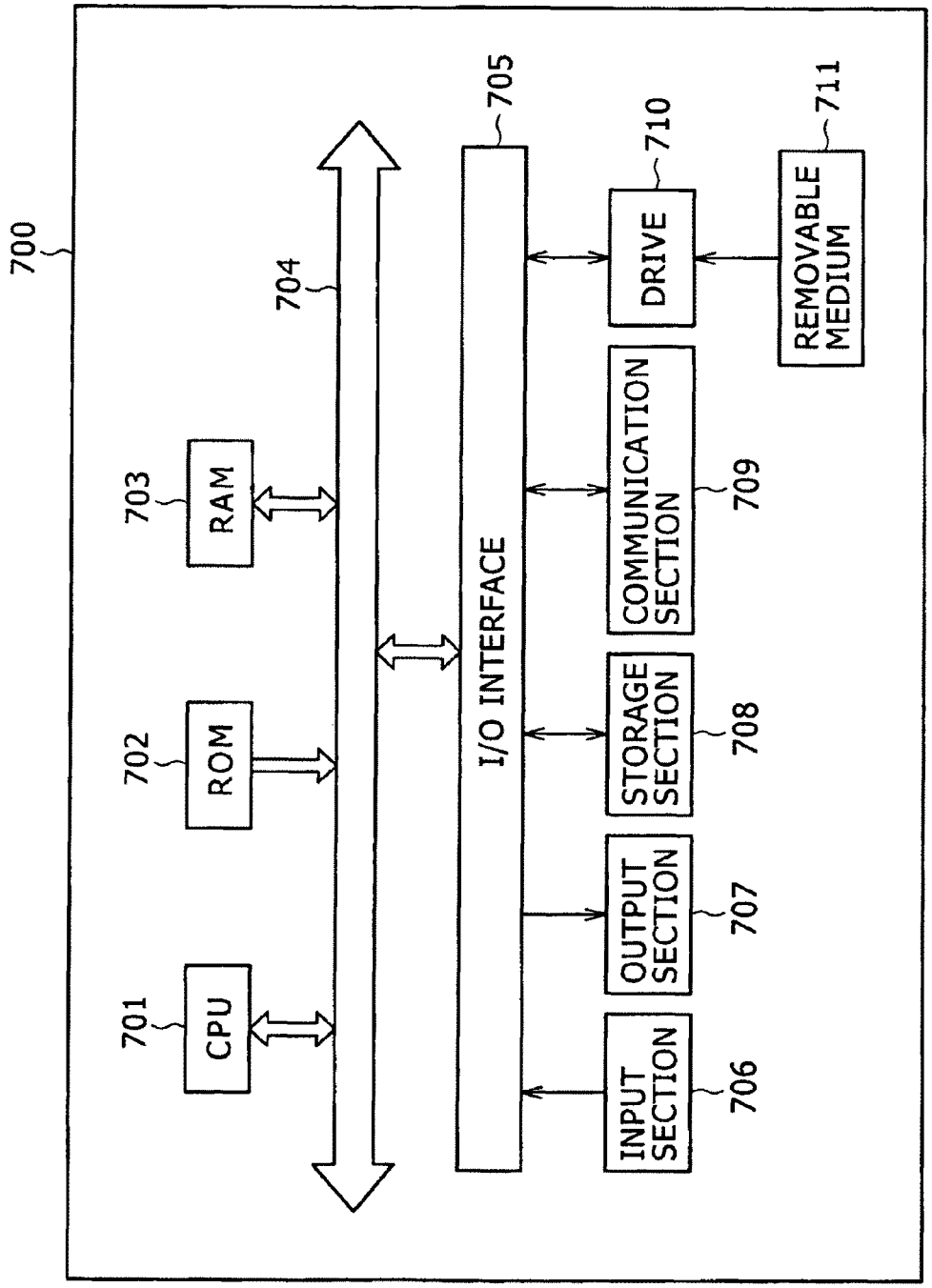
FIG. 64 is a block diagram illustrating a configuration example of a personal computer.

In FIG. 64, a CPU (Central Processing Unit) 701 performs various processes according to the program stored in a ROM (Read Only Memory) 702 or loaded from a storage section 708 into a RAM (Random Access Memory) 703. The RAM 703 also stores, as appropriate, data required for the CPU 701 to perform various processes.

The CPU 701, ROM 702 and RAM 703 are connected to each other via a bus 704. An I/O interface 705 is also connected to the bus 704.

An input section 706 and output section 707 are connected to the I/O interface 705. The input section 706 includes, for example, a keyboard and mouse. The output section 707 includes, for example, a display and speaker. The display includes, for example, a CRT (Cathode Ray Tube) or LCD (Liquid Crystal Display). Further, a storage section 708 and communication section 709 are connected to the I/O interface 705. The storage section 708 includes, for example, a hard disk. The communication section 709 includes, for example, a modem and a network interface card such as a LAN card. The communication section 709 communicates via networks including the Internet.

A drive 710 is also connected, as necessary, to the I/O interface 705. A removable medium 711 such as magnetic disk, optical disk, magneto-optical disk or semiconductor memory is inserted into the drive 710 as appropriate. The computer program read from the removable medium 711 is installed to the storage section 708 as necessary.

If the series of processes are performed by software, the program making up the software is installed from a network such as the Internet or from a recording medium such as the removable medium 711.

It should be noted that this recording medium includes those made up of the removable medium 711 such as a magnetic disk (including floppy disk (registered trademark)), optical disk (including CD-ROM (Compact Disk-Read Only Memory) and DVD (Digital Versatile Disk)), magneto-optical disk (including MD (Mini-Disk) (registered trademark)) or semiconductor memory in which the program is stored and that are distributed separately from the device itself for delivery of the program to users. This recording medium also includes others made up of the ROM 702 in which the program is stored or the hard disk contained in the storage section 708 that are incorporated in advance in the device itself and delivered to users.

It should be noted that the steps adapted to perform the series of processes described above in the present specification include not only those processes performed chronologically according to the described sequence but also others that are not necessarily performed chronologically but concurrently or individually.

The invention claimed is:

1. An imaging processing device comprising:
    an edge-preserving low-pass filter adapted to determine whether each of pixels adjacent to a target pixel to be processed in an input image is valid based on a reference pixel value determined for the target pixel to be processed and a threshold, the edge-preserving low-pass filter also adapted to perform smoothing using the values of the adjacent pixels that have been determined to be valid;
    average luminance calculation means for dividing the input image into a plurality of areas based on a luminance distribution of the input image to calculate an average luminance value for each of the areas; and
    threshold calculation means for calculating the threshold to be set in the edge-preserving low-pass filter based on the average luminance value for each of the areas calculated by the average luminance calculation means.

2. The imaging processing device of claim 1, wherein
    the threshold calculation means calculates the threshold by multiplying an absolute difference between average luminance values, one for each of the areas, by a predetermined fixed value.

3. The imaging processing device of claim 1 further comprising:
    extraction means for extracting a lighting component having a large amplitude periodicity of a luminance signal from the input image using the edge-preserving low-pass filter to extract a detail component as a difference between the luminance signal of the input image and the lighting component;
    identification means for identifying a gain which is determined commensurate with the lighting component; and
    detail component correction means for multiplying the detail component by the gain identified by the identification means to correct the detail component.

4. The imaging processing device of claim 3, wherein
    the identification means identifies each of the plurality of areas associated with the luminance values of the image based on a gain characteristic, the gain characteristic obtained based on a complete adaptation gain, the complete adaptation gain found by an arithmetic operation based on the average luminance value for each of the areas, the complete adaptation gain being a multiplier for complete adaptation.

5. The imaging processing device of claim 3, wherein
    the identification means identifies each of the plurality of areas associated with the luminance values of the image based on a gain characteristic, the gain characteristic obtained based on a correction gain, the correction gain found by performing a predetermined arithmetic operation on a complete adaptation gain, the complete adaptation gain, found by an arithmetic operation based on the average luminance value for each of the areas, the complete adaptation gain being a multiplier for complete adaptation.

6. The imaging processing device of claim 5, wherein
in the arithmetic operation adapted to find the correction gain, an adaptation level is used, the adaptation level identified based on a preset adaptation level characteristic which is determined according to a dynamic range value, the dynamic range value calculated based on the average luminance value for each of the plurality of areas associated with the luminance values of the image.

7. The imaging processing device of claim 6, wherein
the identification means determines the gain characteristic by setting a first value as an upper limit of the correction gain and a second value as a lower limit of the correction gain, the first value obtained by correcting a complete adaptation gain associated with the darkest of all the plurality of areas based on the adaptation level, the second value obtained by correcting a complete adaptation gain associated with the brightest of all the plurality of areas based on the adaptation level.

8. The imaging processing device of claim 1 further comprising:
thinning-out means for thinning out the number of pixels in the input image; and
increasing means for increasing the number of pixels of the image whose pixels have been thinned out by the thinning-out means to the original number, wherein
the image whose pixels have been thinned out by the thinning-out means is fed to the edge-preserving low-pass filter, and wherein
an image associated with a signal output from the edge-preserving low-pass filter is fed to the increasing means.

9. An image processing method comprising the steps of:
determining whether each of pixels adjacent to a target pixel to be processed in an input image is valid based on a reference pixel value determined for the target pixel to be processed and a threshold;
performing smoothing using the values of the adjacent pixels that have been determined to be valid;
dividing the input image into a plurality of areas based on a luminance distribution of the input image to calculate an average luminance value for each of the areas; and
calculating the threshold based on the average luminance value for each of the areas.

10. A non-transitory computer-readable recording medium on which a program is recorded, the program causing a computer to execute image processing, the image processing comprising the steps of:
determining whether each of pixels adjacent to a target pixel to be processed in an input image is valid based on a reference pixel value determined for the target pixel to be processed and a threshold;
performing smoothing using the values of the adjacent pixels that have been determined to be valid;
dividing the input image into a plurality of areas based on a luminance distribution of the input image to calculate an average luminance value for each of the areas; and
calculating the threshold based on the average luminance value for each of the areas.

* * * * *

UNITED STATES PATENT AND TRADEMARK OFFICE
CERTIFICATE OF CORRECTION

PATENT NO. : 8,417,064 B2
APPLICATION NO. : 12/734878
DATED : April 9, 2013
INVENTOR(S) : Masafumi Wakazono, Naoya Katoh and Nobuyuki Matsushita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this
Fourth Day of June, 2013

Teresa Stanek Rea
*Acting Director of the United States Patent and Trademark Office*